(12) United States Patent
Narita

(10) Patent No.: US 8,133,595 B2
(45) Date of Patent: Mar. 13, 2012

(54) MULTILAYER ALLOY COATING FILM, HEAT-RESISTANT METAL MEMBER HAVING THE SAME, AND METHOD FOR PRODUCING MULTILAYER ALLOY COATING FILM

(75) Inventor: Toshio Narita, Sapporo (JP)

(73) Assignee: National University Corporation Hokkaido University, Hokkaido (JP)

( * ) Notice: Subject to any disclaimer, the term of this patent is extended or adjusted under 35 U.S.C. 154(b) by 426 days.

(21) Appl. No.: 12/312,556

(22) PCT Filed: Nov. 16, 2007

(86) PCT No.: PCT/JP2007/072319
§ 371 (c)(1),
(2), (4) Date: May 15, 2009

(87) PCT Pub. No.: WO2008/059971
PCT Pub. Date: May 22, 2008

(65) Prior Publication Data
US 2009/0274927 A1    Nov. 5, 2009

(30) Foreign Application Priority Data
Nov. 16, 2006  (JP) ................................ 2006-310798

(51) Int. Cl.
*B32B 15/01*  (2006.01)
*B05D 1/36*  (2006.01)
*C23C 14/34*  (2006.01)
*C25D 5/10*  (2006.01)

(52) U.S. Cl. ........ 428/651; 428/650; 428/660; 428/635; 428/652; 428/680; 427/405; 427/456; 427/252; 205/170

(58) Field of Classification Search ........................ None
See application file for complete search history.

(56) References Cited

U.S. PATENT DOCUMENTS
6,306,524 B1   10/2001   Spitsberg et al.
(Continued)

FOREIGN PATENT DOCUMENTS
JP         2001-323332 A    11/2001
(Continued)

OTHER PUBLICATIONS

Toshio Narita et al., "Rhenium coating as a diffusion barrier on a nickel-based superalloy in high temperature oxidation," Materials At High Temperatures, 2001, pp. 245-251, vol. 18(S), Science Reviews.

(Continued)

*Primary Examiner* — Aaron Austin
(74) *Attorney, Agent, or Firm* — The Nath Law Group; Tanya E. Harkins; Mihsuhn Koh

(57) ABSTRACT

Disclosed is a multilayer alloy coating film capable of maintaining heat resistance, high-temperature oxidation resistance and creep resistance for a long time even in an ultra high temperature environment. The multilayer alloy coating film comprises a barrier layer formed on a base surface, and an aluminum reservoir layer formed on the barrier layer and composed of an alloy containing Al. The barrier layer comprises an inner sacrificial barrier layer composed of an alloy containing Re, an inner stabilization layer formed on the inner sacrificial barrier layer, a diffusion barrier layer formed on the inner stabilization layer and composed of an alloy containing Re, an outer stabilization layer formed on the diffusion barrier layer, and an outer sacrificial barrier layer formed on the outer stabilization layer and composed of an alloy containing Re.

24 Claims, 22 Drawing Sheets

U.S. PATENT DOCUMENTS

| | | |
|---|---|---|
| 6,746,782 B2 | 6/2004 | Zhao et al. |
| 6,830,827 B2 | 12/2004 | Narita et al. |
| 7,247,393 B2 | 7/2007 | Hazel et al. |
| 7,250,225 B2 | 7/2007 | Hazel et al. |
| 7,273,662 B2 | 9/2007 | Gleeson et al. |
| 2009/0317658 A1 * | 12/2009 | Narita .......... 428/650 |

FOREIGN PATENT DOCUMENTS

| | | |
|---|---|---|
| JP | 2003-055756 A | 2/2003 |
| JP | 2004-035902 A | 2/2003 |
| JP | 2003-213479 A | 7/2003 |
| JP | 2003-213480 A | 7/2003 |
| JP | 2003-213481 A | 7/2003 |
| JP | 2003-213482 A | 7/2003 |
| JP | 2003-213483 A | 7/2003 |
| JP | 2003-253423 A | 9/2003 |
| JP | 2004-035911 A | 2/2004 |
| JP | 2004-039315 A | 2/2004 |
| JP | 2006-193830 A | 7/2006 |
| WO | WO 03/038150 A1 | 5/2003 |
| WO | WO 03/038151 A1 | 5/2003 |
| WO | WO 03/038152 A1 | 5/2003 |
| WO | WO 2005/068685 A1 | 7/2005 |

OTHER PUBLICATIONS

Toshio Narita et al., "Development of Re-Based Diffusion Barrier Coatings on Nb-Based Alloys for High Temperature Applications," Niobium for High Temperature Applications, 2004, pp. 99-112, TMS (The Minerals, Metals & Materials Society).

Y. Matsumura et al., "Oxidation Behavior of a Re-Base Diffusion-Barrier / β-NiAl Coating on Nb-5Mo-15W at High Temperatures," Oxidation of Metals, Feb. 2004, pp. 105-124, vol. 61 (1/2), Plenum Publishing Corporation.

Akihiro Sato, et al., "Effect of Aluminide Coating on Creep Properties of Ni-Base Single Crystal Superalloys," J. Japan Inst. Metals, pp. 320-325, 2007, vol. 71 (3), The Japan Institute of Metals.

* cited by examiner

MULTILAYER ALLOY COATING FILM, HEAT-RESISTANT METAL MEMBER HAVING THE SAME, AND METHOD FOR PRODUCING MULTILAYER ALLOY COATING FILM

CROSS-REFERENCE:

This is a National Phase Application filed under 35 U.S.C. 371 of International Application No PCT/JP2007/072319, filed Nov. 16, 2007, the entire content of which is hereby incorporated by reference in its entirety.

TECHNICAL FIELD

The present invention relates to a multilayer alloy film including a barrier layer, a heat-resistant metal member having the same, and a method for producing the multilayer alloy film.

BACKGROUND ART

A member for a high-temperature apparatus such as a moving blade or a stationary blade of a jet engine or a gas turbine, and a boiler tube often has a surface subjected to coating in order to enhance heat resistance and corrosion resistance.

Generally, in order to enhance the heat resistance of a base material (alloy), the base material is subjected to ceramic coating referred to as thermal barrier coating (hereinafter, referred to as "TBC"). In this process, a ceramic layer having a thermal expansion coefficient significantly different from that of the base material is easily exfoliated from the surface of the base material according to temperature change. Therefore, an alloy layer referred to as an undercoat layer (bond coat layer) is inserted between the ceramic layer and the base material in order to enhance the adhesion of the ceramic layer and base material. However, since atoms move (diffuse) between the undercoat layer and the base material under an ultrahigh temperature environment of 800 to 1200° C., the undercoat layer will lose its characteristics over time. As a result, an $Al_2O_3+NiAl_2O_4$ layer having low protection performance is formed near the interface between the undercoat layer and the base material, and an internal corrosion layer which have internal oxide and internal nitride and an Al depleted layer are formed inside the base material. Thus, the TBC causes a problem that the characteristics of the undercoat layer are lost over time under an ultrahigh temperature environment and the mechanical characteristics (strength, creep resistance, fatigue resistance) of the base material are also lost.

On the other hand, in order to enhance corrosion resistance, an oxide film protecting the base material is formed by diffusion coating of Al, Cr, Si or the like or overlay coating of a high Ni-high Cr alloy, a MCrAlY (M=Ni, Co, Fe) alloy or the like. However, since the diffusion of atoms contributing to corrosion resistance is remarkably fast under an ultrahigh temperature environment of 800 to 1200° C., the oxide film protecting the base material is lost over time. Thus, the diffusion coating or the overlay coating causes a problem that the oxide film protecting the base material is lost over time under an ultrahigh temperature environment and thereby the mechanical characteristics of the base material are also lost.

As means for eliminating these problems, alloy films containing a Re-based alloy layer are disclosed (Patent Documents 1 to 13, Non-patent Documents 1 to 3). Since a Re-based alloy can suppress the diffusion of atoms constituting a base material and an alloy film, the Re-based alloy functions as a diffusion barrier which can eliminate the problems. For example, when the TBC is applied to the surface of the base material, the insertion of a film (barrier layer 30) made of a Re-based alloy between base material 10 and undercoat layer 20, as shown in FIG. 1, can prevent the atoms of undercoat layer 20 from moving into base material 10 and the atoms of base material 10 from moving into undercoat layer 20. As a result, the characteristics of the undercoat layer and the base material can be maintained even under an ultrahigh temperature environment for some amount of time.

Patent Document 1: U.S. Pat. No. 6,306,524
Patent Document 2: U.S. Pat. No. 6,746,782
Patent Document 3: U.S. Pat. No. 6,830,827
Patent Document 4: Japanese Patent No. 3708909
Patent Document 5: Japanese Patent No. 3765292
Patent Document 6: Japanese Patent No. 3810330
Patent Document 7: Japanese Patent Application Laid-Open No. 2001-323332
Patent Document 8: Japanese Patent Application Laid-Open No. 2003-213479
Patent Document 9: Japanese Patent Application Laid-Open No. 2003-213480
Patent Document 10: Japanese Patent Application Laid-Open No. 2003-213481
Patent Document 11: Japanese Patent Application Laid-Open No. 2003-213482
Patent Document 12: Japanese Patent Application Laid-Open No. 2003-213483
Patent Document 13: Japanese Patent Application Laid-Open No. 2004-039315
Non-patent Document 1: T. Narita, M. Shoji, Y. Hisamatsu, D. Yoshida, M. Fukumoto, and S. Hayashi, "Rhenium coating as a diffusion barrier on a nickel-based superalloy in high temperature oxidation", MATERIALS AT HIGH TEMPERATURES, 18 (S), (2001), 245-251.
Non-patent Document 2: T. Narita, M. Fukumoto, Y. Matsumura, S. Hayashi, A. Kasama, I. Iwanaga, and R. Tanaka, "Development of Re-Based Diffusion Barrier Coatings on Nb-Based Alloys for High Temperature Applications", NIOBIUM for High Temperature Applications, edited by Y-Won Kim and T. Carneiro, TMS (2004), pp. 99-112.
Non-patent Document 3: Y. Matsumura, M. Fukumoto, S. Hayashi, A. Kasama, I. Iwanaga, R. Tanaka, and T. Narita, "Oxidation Behavior of a Re-Base Diffusion Barrier/β-NiAl Coating on Nb-5Mo-15W at High Temperatures", Oxidation of Metals, Vol. 61, Nos. 1/2, (2004), 105-124.

DISCLOSURE OF INVENTION

Problems to be solved by the Invention

However, there is a problem that the conventional alloy film cannot maintain heat resistance, high-temperature oxidation resistance and creep resistance under an ultrahigh temperature environment over a long period of time.

That is, the conventional alloy film cannot maintain heat resistance, high-temperature oxidation resistance and creep resistance which are important properties of the alloy film over a long period of time since the Re-based alloy layer is decomposed over time when the Re-based alloy layer (barrier layer) which functions as the diffusion barrier is thin. On the other hand, the conventional alloy film cannot maintain heat resistance, high-temperature oxidation resistance and creep resistance over a long period of time since the Re-based alloy layer is mechanically destructed when the Re-based alloy layer is thick.

Since the Re-based alloy layer which functions as the diffusion barrier has different elemental composition and structure from those of the base material and undercoat layer, the Re-based alloy layer reacts respectively with the base material and the undercoat layer under an ultrahigh temperature environment, and is decomposed over time. Therefore, the conventional alloy film cannot maintain the characteristics of the undercoat layer under an ultrahigh temperature environment over a long period of time, and cannot maintain heat resistance, high-temperature oxidation resistance and creep resistance which are important properties of the alloy film.

Since the Re-based alloy layer of the conventional alloy film has different mechanical properties (for example, thermal expansion coefficient, hardness, brittleness or the like) from those of the base material and undercoat layer, not only the alloy film but the base material is also destructed by a heat stress, an external force or the like. FIG. 2 is a cross-sectional schematic view showing the destructive behavior of the conventional alloy film. When base material 10 is transformed by an external force, vertical cracks 40 occur in undercoat layer 20 and barrier layer 30 of the conventional alloy film. When a heat stress and an external force are applied to the alloy film, horizontal cracks 50 occur in barrier layer 30 and in the interfaces between barrier layer 30 and undercoat layer 20 or between barrier layer 30 and base material 10. When stress is further concentrated on these cracks, the cracks propagate, and the alloy film is destructed, finally resulting in rupture of the base material.

Thus, there is a problem that the conventional alloy film cannot maintain heat resistance, high-temperature oxidation resistance and creep resistance under an ultrahigh temperature environment over a long period of time.

It is an object of the present invention to provide a multilayer alloy film which can maintain heat resistance, high-temperature oxidation resistance and creep resistance even under an ultrahigh temperature environment over a long period of time, a heat-resistant metal member to which the multilayer alloy film is applied, and a method for producing the multilayer alloy film.

Means for Solving the Problem

[1] A multilayer alloy film of the present invention includes: a barrier layer formed on a surface of a base material; and an aluminum reservoir layer formed on the barrier layer, the aluminum reservoir layer made of an alloy containing Al, wherein the barrier layer includes: an inner sacrificial barrier layer made of an alloy containing Re; an inner stabilizing layer formed on the inner sacrificial barrier layer; a diffusion barrier layer formed on the inner stabilizing layer, the diffusion barrier layer made of an alloy containing Re; an outer stabilizing layer formed on the diffusion barrier layer; and an outer sacrificial barrier layer formed on the outer stabilizing layer, the outer sacrificial barrier layer made of an alloy containing Re.

[2] A heat-resistant metal member of the present invention includes: a metal base material; and the multilayer alloy film described in the item [1] formed on a surface of the metal base material.

[3] A method for producing a multilayer alloy film of the present invention includes the steps of: forming an inner sacrificial barrier layer made of an alloy containing Re on a surface of a base material; forming an inner stabilizing layer on the inner sacrificial barrier layer; forming a diffusion barrier layer made of an alloy containing Re on the inner stabilizing layer; forming an outer stabilizing layer on the diffusion barrier layer; forming an outer sacrificial barrier layer made of an alloy containing Re on the outer stabilizing layer; and forming an aluminum reservoir layer made of an alloy containing Al on the outer sacrificial barrier layer.

Effect Of The Invention

Since the present invention can maintain heat resistance, high-temperature oxidation resistance and creep resistance even under an ultrahigh temperature environment over a long period of time, the present invention can enhance the reliability of a member for a high-temperature apparatus operating under the ultrahigh temperature environment and can prolong the life thereof.

BEST MODE FOR CARRYING OUT THE INVENTION

Figure 1:
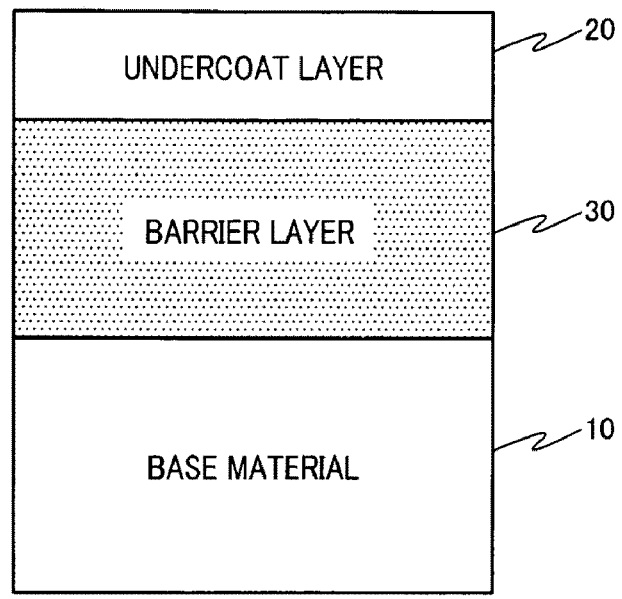
FIG. 1 is a cross-sectional schematic view of a conventional alloy film.

1. Multilayer Alloy Film of the Present Invention

A multilayer alloy film of the present invention contains barrier layer (2) formed on the surface of base material (1) and aluminum reservoir layer (3) formed on the barrier layer and made of an alloy containing Al.

Preferably, base material (1) is, without limitation, an alloy having heat resistance such as a Ni-based single crystal superalloy, a Ni-based superalloy, a Ni-based heat-resistant alloy, a Co-based heat-resistant alloy and stainless steel (for example, austenitic stainless steel). As will be described below, it is preferable that the base material contains the same phase as that of the aluminum reservoir layer. For example, it is preferable that the base material contains a γ phase, a γ' phase or a β phase.

Aluminum reservoir layer (3), which is made of an alloy containing Al, forms an oxidation resistant film. The aluminum reservoir layer may also function as an undercoat layer. An alloy forming the aluminum reservoir layer is, without limitation, for example, nickel aluminide, a MCrAlY (M=Ni, Co, Fe) alloy or the like.

The composition of the alloy forming aluminum reservoir layer (3) is not particularly limited. However, it is preferable that the composition is suitably specified depending on the base material. As will be described below, it is particularly preferable that the composition contains the same phase as that of the alloy as the base material.

For example, when the base material is a Ni-based single crystal superalloy, a Ni-based superalloy or a Ni-based heat-resistant alloy, the alloy forming the aluminum reservoir layer may be (1) a mixed phase of a γ' phase and a β phase, the γ' phase having an $L1_2$ crystal structure of a Ni-based alloy containing 16 to 25 atom % of Al and 1 to 10 atom % of Cr, the β phase having a bcc crystal structure of a Ni-based alloy containing 26 to 50 atom % of Al and 1 to 10 atom % of Cr.

In addition, the alloy forming the aluminum reservoir layer may be (2) a mixed phase of a γ' phase and a γ phase, the γ' phase having an $L1_2$ crystal structure of a Ni-based alloy containing 16 to 25 atom % of Al and 1 to 10 atom % of Cr, the γ phase having an fcc crystal structure of a Ni-based alloy containing 5 to 16 atom % of Al and 1 to 25 atom % of Cr, (3) a mixed phase of a β phase and a γ phase, the β phase having a bcc crystal structure of a Ni-based alloy containing 26 to 50 atom % of Al and 1 to 10 atom % of Cr, the γ phase having an fcc crystal structure of a Ni-based alloy containing 5 to 16 atom % of Al and 15 to 45 atom % of Cr, or (4) a mixed phase of a β phase, a γ' phase and a γ phase, the β phase having a bcc crystal structure of a Ni-based alloy containing 26 to 50 atom % of Al and 1 to 10 atom % of Cr, the γ' phase having an $L1_2$ crystal structure of a Ni-based alloy containing 16 to 25 atom % of Al and 1 to 10 atom % of Cr, the γ phase having an fcc crystal structure of a Ni-based alloy containing 5 to 16 atom % of Al and 15 to 45 atom % of Cr.

Such a composition allows the aluminum reservoir layer to form, maintain and reproduce an oxide film having excellent protection ability and reliability.

The alloy forming the aluminum reservoir layer may further contain Pt. The ratio of Pt contained in the aluminum reservoir layer may be, without limitation, about 0.1 to 48 atom %.

For example, when the base material is a Ni-based single crystal superalloy, a Ni-based superalloy or a Ni-based heat-resistant alloy, the alloy forming the aluminum reservoir layer may be (1) a mixed phase of a γ' phase and a γ phase, the γ' phase having an $L1_2$ crystal structure of a Ni-based alloy containing 19 to 32 atom % of Al, 0.1 to 30 atom % of Pt and 0.1 to 10 atom % of Cr, the γ phase having an fcc crystal structure of a Ni-based alloy containing 1 to 18 atom % of Al, 0.1 to 30 atom % of Pt and 0.1 to 25 atom % of Cr.

In addition, the alloy forming the aluminum reservoir layer may be (2) a γ phase having an fcc crystal structure of a Ni-based alloy containing 1 to 18 atom % of Al, 0.1 to 30 atom % of Pt and 0.1 to 25 atom % of Cr, (3) a γ' phase having an $L1_2$ crystal structure of a Ni-based alloy containing 19 to 32 atom % of Al, 0.1 to 30 atom % of Pt and 0.1 to 10 atom % of Cr, (4) a β phase having a bcc crystal structure of a Ni-based alloy containing 35 to 50 atom % of Al, 0.1 to 30 atom % of Pt and 0.1 to 10 atom % of Cr, (5) an α phase having an $L1_0$ crystal structure of a Ni-based alloy containing 15 to 50 atom % of Al, 30 to 48 atom % of Pt and 0.1 to 10 atom % of Cr, (6) a mixed phase of a γ' phase and a β phase, the γ' phase having an $L1_2$ crystal structure of a Ni-based alloy containing 19 to 32 atom % of Al, 0.1 to 30 atom % of Pt and 0.1 to 10 atom % of Cr, the β phase having a bcc crystal structure of a Ni-based alloy containing 35 to 50 atom % of Al, 0.1 to 30 atom % of Pt and 0.1 to 10 atom % of Cr, (7) a mixed phase of an α phase and a γ phase, the α phase having an $L1_0$ crystal structure of a Ni-based alloy containing 15 to 50 atom % of Al, 30 to 48 atom % of Pt and 0.1 to 10 atom % of Cr, the γ phase having an fcc crystal structure of a Ni-based alloy containing 1 to 14 atom % of Al, 0.1 to 40 atom % of Pt and 0.1 to 25 atom % of Cr, or (8) a mixed phase of an α phase, a γ' phase and a γ phase, the α phase having an $L1_0$ crystal structure of a Ni-based alloy containing 15 to 50 atom % of Al, 30 to 48 atom % of Pt and 0.1 to 10 atom % of Cr, the γ' phase having an $L1_2$ crystal structure of a Ni-based alloy containing 19 to 32 atom % of Al, 0.1 to 30 atom % of Pt and 0.1 to 10 atom % of Cr, the γ phase having an fcc crystal structure of a Ni-based alloy containing 1 to 14 atom % of Al, 0.1 to 40 atom % of Pt and 0.1 to 25 atom % of Cr.

Such a composition allows the aluminum reservoir layer to form, maintain and reproduce an oxide film having excellent protection ability and reliability.

In each of the compositions, the alloy forming the aluminum reservoir layer may further contain 0.01 to 5 atom % of Re. Such a composition allows the aluminum reservoir layer to reduce the diffusion of Re of an outer sacrificial barrier layer into the aluminum reservoir layer.

The alloy forming aluminum reservoir layer (3) may contain elements other than the above-described elements (Al, Cr, Ni, Pt, Re) mixed as a result of contamination from the base material or the external environment due to the use over a long period of time. For example, the alloy forming the aluminum reservoir layer may further contain 0.01 to 15 atom % of one or more elements selected from a group consisting of Co, Fe, Ti, Ir, Ru, Mn, Si, Zr, Mo, Ta, W, Hf, La, Ce and Y.

Barrier layer (2) contains inner sacrificial barrier layer (a) made of an alloy containing Re, inner stabilizing layer (b) formed on the inner sacrificial barrier layer, diffusion barrier layer (c) formed on the inner stabilizing layer and made of an alloy containing Re, outer stabilizing layer (d) formed on the diffusion barrier layer, and outer sacrificial barrier layer (e) formed on the outer stabilizing layer and made of an alloy containing Re. Barrier layer (2) may be formed as a discontinuous film on the surface of base material (1), but barrier layer (2) is preferably formed as a continuous film.

Diffusion barrier layer (c), which is made of an alloy containing Re, functions as a barrier which prevents Al contained in the aluminum reservoir layer from diffusing toward the base material side from the aluminum reservoir layer and prevents elements contained in the base material from diffusing toward the aluminum reservoir layer side from the base material. The thickness of the diffusion barrier layer is, without limitation, preferably 1 to 20 μm in view of mechanical characteristics, and particularly preferably 2 to 6 μm.

Inner sacrificial barrier layer (a), which is made of an alloy containing Re, prevents the reaction of the base material with the diffusion barrier layer due to direct contact of the base material with the diffusion barrier layer. The inner sacrificial barrier layer also functions as a barrier which prevents elements contained in the base material from diffusing into the inner stabilizing layer. Since the diffusion of the elements progresses between the inner sacrificial barrier layer and the base material and between the inner sacrificial barrier layer and the inner stabilizing layer, the inner sacrificial barrier layer is gradually decomposed over time. The thickness of the inner sacrificial barrier layer is, without limitation, preferably 1 to 20 μm in view of the decomposition rate of the inner sacrificial barrier layer, and particularly preferably 2 to 4 μm.

Outer sacrificial barrier layer (e), which is made of an alloy containing Re, prevents the reaction of the aluminum reservoir layer with the diffusion barrier layer due to direct contact of the aluminum reservoir layer with the diffusion barrier layer. The outer sacrificial barrier layer also functions as a barrier which prevents elements contained in the aluminum reservoir layer from diffusing into the outer stabilizing layer. Since the diffusion of the elements progresses between the outer sacrificial barrier layer and the aluminum reservoir layer and between the outer sacrificial barrier layer and the outer stabilizing layer, the outer sacrificial barrier layer is gradually decomposed over time. The thickness of the outer sacrificial barrier layer is, without limitation, preferably 1 to 20 μm in view of the decomposition rate of the outer sacrificial barrier layer, and particularly preferably 2 to 10 μm.

The composition of an alloy forming the diffusion barrier layer (c), the inner sacrificial barrier layer (a) and the outer sacrificial barrier layer (e) is not particularly limited except that the composition contains Re, and may be suitably specified depending on the base material. Examples of the alloys forming the diffusion barrier layer, the inner sacrificial barrier layer or the outer sacrificial barrier layer include a σ phase of a Re—Cr—Ni-based alloy, a σ phase of a Re—W—Cr-based alloy, a σ phase of a Re—Fe—Cr-based alloy ($Fe_3Re_2$), a χ phase of a Re—Mo—Cr-based alloy, a χ phase of a Re—Ta—Cr-based alloy, a χ phase of a Re—Nb—Cr-based alloy, and a β phase of a Re—Fe—Cr-based alloy ($Fe_2Re_3$).

For example, when the base material is a Ni-based single crystal superalloy, a Ni-based superalloy or a Ni-based heat-resistant alloy, the alloy forming the diffusion barrier layer, the inner sacrificial barrier layer or the outer sacrificial barrier layer may be (1) an alloy containing 20 to 60 atom % of Cr, 15 to 25 atom % of Ni and 15 to 65 atom % of Re (the σ phase of the Re—Cr—Ni-based alloy), or (2) an alloy containing 15 to 60 atom % of one or more elements in total, selected from a group consisting of Cr, Mo and W, 15 to 25 atom % of one or more elements in total, selected from a group consisting of Ni, Co and Fe, and 15 to 65 atom % of Re.

Since the diffusion barrier layer, the inner sacrificial barrier layer and the outer sacrificial barrier layer may contain an alloy (containing Re) having a low diffusion coefficient. Such a composition allows the layers to prevent the diffusion of the elements from the base material and the aluminum reservoir layer.

When the aluminum reservoir layer contains Pt, it is preferable that the alloy forming the diffusion barrier layer, the inner sacrificial barrier layer or the outer sacrificial barrier layer contains 1 to 55 atom % of W. For example, when the base material is a Ni-based single crystal superalloy, a Ni-based superalloy or a Ni-based heat-resistant alloy, the alloy forming the diffusion barrier layer, the inner sacrificial barrier layer or the outer sacrificial barrier layer may contain 1 to 45 atom % of Cr, 10 to 25 atom % of Ni, 1 to 55 atom % of W and 15 to 60 atom % of Re. Such a composition allows the diffusion barrier layer, the inner sacrificial barrier layer and the outer sacrificial barrier layer to prevent diffusion of Pt from the aluminum reservoir layer, and to further maintain the effect of the aluminum reservoir layer.

The alloy forming diffusion barrier layer (c), inner sacrificial barrier layer (a) or outer sacrificial barrier layer (e) may contain elements other than the above-described elements (Cr, W, Mo, Ni, Co, Fe, Re) mixed as a result of contamination from the base material, the aluminum reservoir layer or the external environment caused due to the use over a long period of time. For example, the alloy forming the diffusion barrier layer, the inner sacrificial barrier layer or the outer sacrificial barrier layer may further contain 0.1 to 10 atom % of one or more elements selected from a group consisting of V, Nb, Ir, Ru, Zr, Hf, Y, Ce and La. Similarly, the alloy forming the diffusion barrier layer, the inner sacrificial barrier layer or the outer sacrificial barrier layer may further contain 0.1 to 5 atom % of one or more elements selected from a group consisting of Al, Ta, Ti, Pt, Mn, Si, C and B.

Inner stabilizing layer (b) and outer stabilizing layer (d), which have a structure and composition identical or similar to each other, sandwich the diffusion barrier layer. The inner stabilizing layer and the outer stabilizing layer reduce or eliminate the concentration gradient (activity gradient) of each element in the direction across the diffusion barrier layer to thereby prevent Al contained in the aluminum reservoir layer from crossing the diffusion barrier layer and diffusing toward the base material side from the aluminum reservoir layer side, and to prevent the elements contained in the base material from crossing the diffusion barrier layer and diffusing toward the aluminum reservoir layer side from the base material side. The thickness of the inner stabilizing layer and the outer stabilizing layer is, without limitation, preferably 1 to 15 μm in view of mechanical characteristics, and particularly preferably 2 to 7 μm.

It is preferable that the composition of the alloy forming inner stabilizing layer (b) and outer stabilizing layer (d) is suitably specified depending on the base material.

For example, when the base material is a Ni-based single crystal superalloy, a Ni-based superalloy or a Ni-based heat-resistant alloy, the alloy forming the inner stabilizing layer and the outer stabilizing layer may be (1) a mixed phase of a γ' phase and a γ phase, the γ' phase having an $L1_2$ crystal structure of a Ni-based alloy containing 16 to 25 atom % of Al and 1 to 10 atom % of Cr, the γ phase having an fcc crystal structure of a Ni-based alloy containing 5 to 16 atom % of Al and 1 to 25 atom % of Cr.

In addition, the alloy forming the inner stabilizing layer and the outer stabilizing layer may be (2) a mixed phase of a γ' phase and a β phase, the γ' phase having an $L1_2$ crystal structure of a Ni-based alloy containing 16 to 25 atom % of Al and 1 to 10 atom % of Cr, the β phase having a bcc crystal structure of a Ni-based alloy containing 26 to 50 atom % of Al and 1 to 10 atom % of Cr, (3) a mixed phase of a γ phase and a β phase, the γ phase having an fcc crystal structure of a Ni-based alloy containing 5 to 16 atom % of Al and 15 to 45 atom % of Cr, the β phase having a bcc crystal structure of a Ni-based alloy containing 26 to 50 atom % of Al and 1 to 10 atom % of Cr, or (4) a mixed phase of a γ phase, a γ' phase and a β phase, the γ phase having an fcc crystal structure of a Ni-based alloy containing 5 to 16 atom % of Al and 15 to 45 atom % of Cr, the γ' phase having an $L1_2$ crystal structure of a Ni-based alloy containing 16 to 25 atom % of Al and 1 to 10 atom % of Cr, the β phase having a bcc crystal structure of a Ni-based alloy containing 26 to 50 atom % of Al and 1 to 10 atom % of Cr.

In each of the compositions, the alloy forming the inner stabilizing layer and the outer stabilizing layer may further contain 0.1 to 10 atom % of Co. Such a composition allows the inner stabilizing layer and the outer stabilizing layer to reduce the diffusion flux of the diffusion barrier layer effectively.

In each of the compositions, the alloy forming the inner stabilizing layer and the outer stabilizing layer may further contain 0.01 to 5 atom % of Re. Such a composition allows the inner stabilizing layer and the outer stabilizing layer to reduce the diffusion of Re of the diffusion barrier layer into the inner stabilizing layer and the outer stabilizing layer.

When the inner stabilizing layer and the outer stabilizing layer formed as described above are used under an ultrahigh temperature environment, the structure and composition thereof change over time.

For example, if the inner stabilizing layer and the outer stabilizing layer are used under an ultrahigh temperature environment with the base material being a Ni-based single crystal superalloy, a Ni-based superalloy or a Ni-based heat-resistant alloy and the aluminum reservoir layer containing Pt, the inner stabilizing layer and the outer stabilizing layer may become (1) a mixed phase of a γ' phase and a γ phase, the γ' phase having an $L1_2$ crystal structure of a Ni-based alloy containing 19 to 32 atom % of Al, 0.1 to 30 atom % of Pt and 0.1 to 10 atom % of Cr, the γ phase having an fcc crystal structure of a Ni-based alloy containing 1 to 18 atom % of Al, 0.1 to 30 atom % of Pt and 0.1 to 25 atom % of Cr.

In addition, the inner stabilizing layer and the outer stabilizing layer after being used under an ultrahigh temperature environment may become (2) aγ phase having an fcc crystal structure of a Ni-based alloy containing 1 to 18 atom % of Al, 0.1 to 30 atom % of Pt and 0.1 to 25 atom % of Cr, (3) a γ' phase having an $L1_2$ crystal structure of a Ni-based alloy containing 19 to 32 atom % of Al, 0.1 to 30 atom % of Pt and 0.1 to 10 atom % of Cr, (4) a β phase having a bcc crystal structure of a Ni-based alloy containing 35 to 50 atom % of Al, 0.1 to 30 atom % of Pt and 0.1 to 10 atom % of Cr, (5) a mixed phase of a γ' phase and a β phase, the γ' phase having an $L1_2$ crystal structure of a Ni-based alloy containing 19 to 32 atom % of Al, 0.1 to 30 atom % of Pt and 0.1 to 10 atom % of Cr, the β phase having a bcc crystal structure of a Ni-based alloy containing 35 to 50 atom % of Al, 0.1 to 30 atom % of Pt and 0.1 to 10 atom % of Cr, (6) a mixed phase of an α phase and a γ phase, the α phase having an $L1_0$ crystal structure of a Ni-based alloy containing 15 to 50 atom % of Al, 30 to 48 atom % of Pt and 0.1 to 10 atom % of Cr, the γ phase having an fcc crystal structure of a Ni-based alloy containing 1 to 14 atom % of Al, 0.1 to 40 atom % of Pt and 0.1 to 25 atom % of Cr, or (7) a mixed phase of an α phase, a γ' phase and a γ phase, the α phase having an $L1_0$ crystal structure of a Ni-based alloy containing 15 to 50 atom % of Al, 30 to 48 atom % of Pt and 0.1 to 10 atom % of Cr, the γ' phase having an $L1_2$ crystal structure of a Ni-based alloy containing 19 to 32 atom % of Al, 0.1 to 30 atom % of Pt and 0.1 to 10 atom % of Cr, the γ phase having an fcc crystal structure of a Ni-based alloy containing 1 to 14 atom % of Al, 0.1 to 40 atom % of Pt and 0.1 to 25 atom % of Cr.

The composition of the alloy forming inner stabilizing layer (b) and outer stabilizing layer (d) may be suitably specified depending on the base material as described above. However, it is more preferable that base material (1), inner stabilizing layer (b), outer stabilizing layer (d) and aluminum reservoir layer (3) contain one or more of the same phases. For example, when the base material is an alloy containing a γ' phase and a γ phase and the alloy forming the aluminum reservoir layer is an alloy containing a γ' phase and a β phase, it is preferable that the alloy forming the inner stabilizing layer and the outer stabilizing layer contains a γ' phase. Similarly, when the base material is an alloy containing a γ' phase and a γ phase and the alloy forming the aluminum reservoir layer is an alloy containing a γ' phase and a γ phase, it is preferable that the alloy forming the inner stabilizing layer and the outer stabilizing layer contains either one or both of the γ' phase and the γ phase.

This can effectively reduce the diffusion flux of not only the diffusion barrier layer located between the inner stabilizing layer and the outer stabilizing layer but also the inner sacrificial barrier layer located between the base material and the inner stabilizing layer, and the outer sacrificial barrier layer located between the outer stabilizing layer and the aluminum reservoir layer. That is, the crystal structures of the alloys constituting two layers which sandwich the layers (the inner sacrificial barrier layer, the outer sacrificial barrier layer and the diffusion barrier layer) containing Re can be made the same or similar, and the compositions (constituent elements and concentration thereof) of two layers can be made the same or similar to reduce the driving force (usually concentration gradient) of diffusion in the layer containing Re. Therefore, since the decomposition rate of the inner sacrificial barrier layer and the outer sacrificial barrier layer can be delayed and the composition change of each of the inner stabilizing layer and the outer stabilizing layer can be suppressed to the minimum, the decomposition rate of the diffusion barrier layer can be further delayed.

The alloy forming inner stabilizing layer (b) and outer stabilizing layer (d) may contain elements other than the above described elements (Al, Cr, Ni, Re, Co) mixed as a result of contamination from the base material, the aluminum reservoir layer or the external environment caused due to the use over a long period of time. For example, the alloy forming the inner stabilizing layer and the outer stabilizing layer may further contain 0.01 to 10 atom % of one or more elements selected from a group consisting of W, Mo, V, Nb, Ta, Pt, Ti, Fe, Ir, Ru, Mn, Si, Zr, Hf, Y, Ce, La, C and B.

Figure 3:
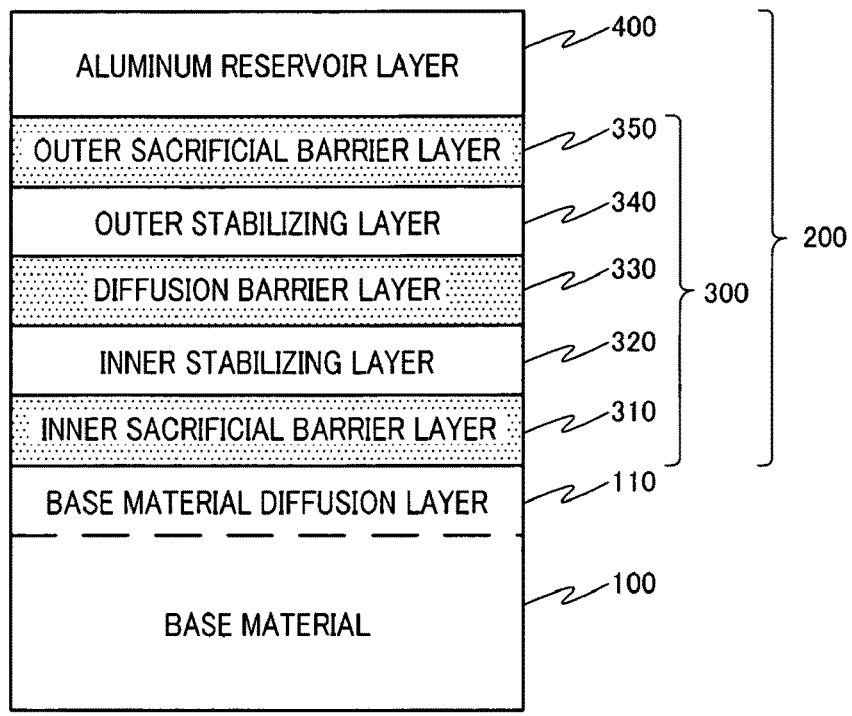
FIG. 3 is a cross-sectional schematic view of a multilayer alloy film of the present invention.

FIG. 3 is across-sectional schematic view showing one example of the multilayer alloy film of the present invention. In FIG. 3, base material 100 is coated with multilayer alloy film 200 of the present invention. Multilayer alloy film 200 contains barrier layer 300 formed on the surface of base material 100 and aluminum reservoir layer 400 formed on the surface of the barrier layer 300. Base material 100 may contain base material diffusion layer 110 having a composition different from that of the central portion of base material 100 due to elements diffusing from the side of multilayer alloy film 200. Barrier layer 300 includes inner sacrificial barrier layer 310, inner stabilizing layer 320, diffusion barrier layer 330, outer stabilizing layer 340 and outer sacrificial barrier layer 350 in this order from the side of base material 100.

The multilayer alloy film of the present invention can be formed on the surface of a metal base material using various methods. For example, a method for producing a multilayer alloy film of the present invention includes the steps of: forming an inner sacrificial barrier layer on the surface of the base material, forming an inner stabilizing layer on the inner sacrificial barrier layer, forming a diffusion barrier layer on the inner stabilizing layer, forming an outer stabilizing layer on the diffusion barrier layer, forming an outer sacrificial barrier layer on the outer stabilizing layer, and forming an aluminum reservoir layer on the outer sacrificial barrier layer.

The method for forming the inner sacrificial barrier layer, the inner stabilizing layer, the diffusion barrier layer, the outer stabilizing layer and the outer sacrificial barrier layer is not particularly limited. However, metal films such as a Re—Ni alloy, a Ni—W alloy, Ni and Cr may be formed on the base material using, for example, the chemical vapor deposition or the physical vapor deposition. Examples of the chemical vapor deposition and the physical vapor deposition include electroplating, electroless plating, thermal spraying, sputtering and electron beam evaporation. Cr infiltration treatment and heat treatment are preferably performed as necessary after the metal film is formed. The conditions (temperature, time, atmosphere or the like) of the heat treatment are not particularly limited as long as the treatment temperature is below the melting point of the base material. For example, when a Ni-based single crystal superalloy, a Ni-based superalloy or a Ni-based heat-resistant alloy is used as the base material, the heat treatment may be performed at 800 to 1350° C. in atmospheres such as inactive gas, hydrogen gas and vacuum for 20 minutes to 20 hours. In this case, when the film is formed while the structure of the base material is maintained, the treatment temperature is preferably in a range from 800 to 1100° C. When the heat treatment after the film is formed, and the solution treatment of the base material and primary aging treatment are combined, the treatment temperature is preferably in a range from 1100 to 1350° C.

The method for forming the aluminum reservoir layer is not particularly limited. However, for example, Al infiltration treatment may be performed after a metal film such as Ni is formed on the outer sacrificial barrier layer using the chemical vapor deposition, the physical vapor deposition or the like.

After the inner sacrificial barrier layer, the inner stabilizing layer, the diffusion barrier layer, the outer stabilizing layer and the outer sacrificial barrier layer are formed and before the aluminum reservoir layer is formed, the solution treatment and the aging treatment are preferably performed. The structure of the base material can be controlled by performing the solution treatment and the aging treatment to provide desired mechanical characteristics, and the stabilization (reduction in defects, smoothing of the interface between the layers, or the like) of the structure of each layer of the multilayer alloy film can be attained.

The condition of the solution treatment may be suitably set depending on the type of the base material. For example, the base material may be heated at 1275 to 1350° C. for 20 minutes to 24 hours. More specifically, when the base material is a first generation single crystal superalloy, the base material may be heated, for example, at 1275° C. for 12 hours. Similarly, when the base material is a second generation single crystal superalloy, the base material may be heated, for example, at 1315° C. for 4 hours. When the base material is a third generation single crystal superalloy, the base material may be heated, for example, at 1340° C. for 4 hours. When the base material is a fourth generation single crystal superalloy, the base material may be heated, for example, at 1340° C. for 5 hours. When the base material is a fifth generation single crystal superalloy, the base material may be heated, for example, at 1340° C. for 10 hours. The solution treatment may be multistep heat treatment. For example, when the base material is the second generation single crystal superalloy, the solution treatment may be performed by heating the base material at 1320° C. for 12 hours, thereafter heating at 1325° C. for 12 hours, and further heating at 1340° C. for 24 hours.

The condition of the aging treatment (primary aging treatment) performed after the solution treatment may be suitably set depending on the type of the base material. For example, the base material may be heated at 1100 to 1180° C. for 1 to 12 hours. More specifically, when the base material is a first generation single crystal superalloy, the base material may be heated, for example, at 1100° C. for 24 hours. Similarly, when the base material is a second generation single crystal superalloy, the base material may be heated, for example, at 1120° C. for 4 hours. When the base material is a third generation single crystal superalloy, the base material may be heated, for example, at 1100° C. for 4 hours. When the base material is a fourth generation single crystal superalloy, the base material may be heated, for example, at 1100° C. for 10 hours. When the base material is a fifth generation single crystal superalloy, the base material may be heated, for example, at 1100° C. for 4 hours.

Since the diffusion of the elements progresses between the inner sacrificial barrier layer and the base material or between the outer sacrificial barrier layer and the aluminum reservoir layer in the multilayer alloy film of the present invention, the inner sacrificial barrier layer and the outer sacrificial barrier layer may be decomposed over time. However, since the diffusion barrier layer is sandwiched between the inner sacrificial barrier layer and the outer sacrificial barrier layer and since the diffusion of the elements does not progress between the diffusion barrier layer and the base material or the aluminum reservoir layer, the diffusion barrier layer is not decomposed over a long period of time. As a result, the multilayer alloy film of the present invention can prevent the diffusion of the elements between the base material and the aluminum reservoir layer over a long period of time, and can maintain the characteristics of the aluminum reservoir layer over a long period of time. Therefore, the multilayer alloy film of the present invention can maintain heat resistance and high-temperature oxidation resistance even under an ultrahigh temperature environment over a long period of time.

In addition, in the multilayer alloy film of the present invention, the inner sacrificial barrier layer and the outer sacrificial barrier layer, which are decomposed over time, may form mixed layers with the inner stabilizing layer and the outer stabilizing layer, respectively, next to the sacrificial barrier layers. These mixed layers have an intermediate thermal expansion coefficient of the base material and the diffusion barrier layer. Therefore, the multilayer alloy film of the present invention can reduce a heat stress generated in heating and cooling as compared to that of the conventional film.

Figure 2:
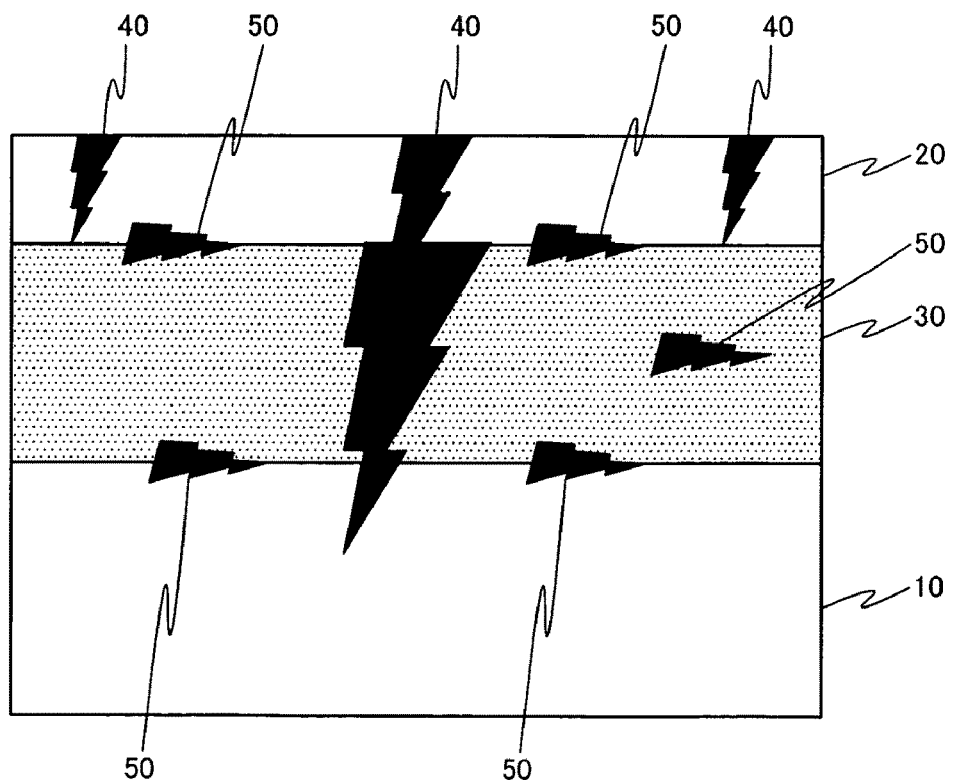
FIG. 2 is a cross-sectional schematic view for explaining the destructive behavior of the conventional alloy film.
Figure 4:
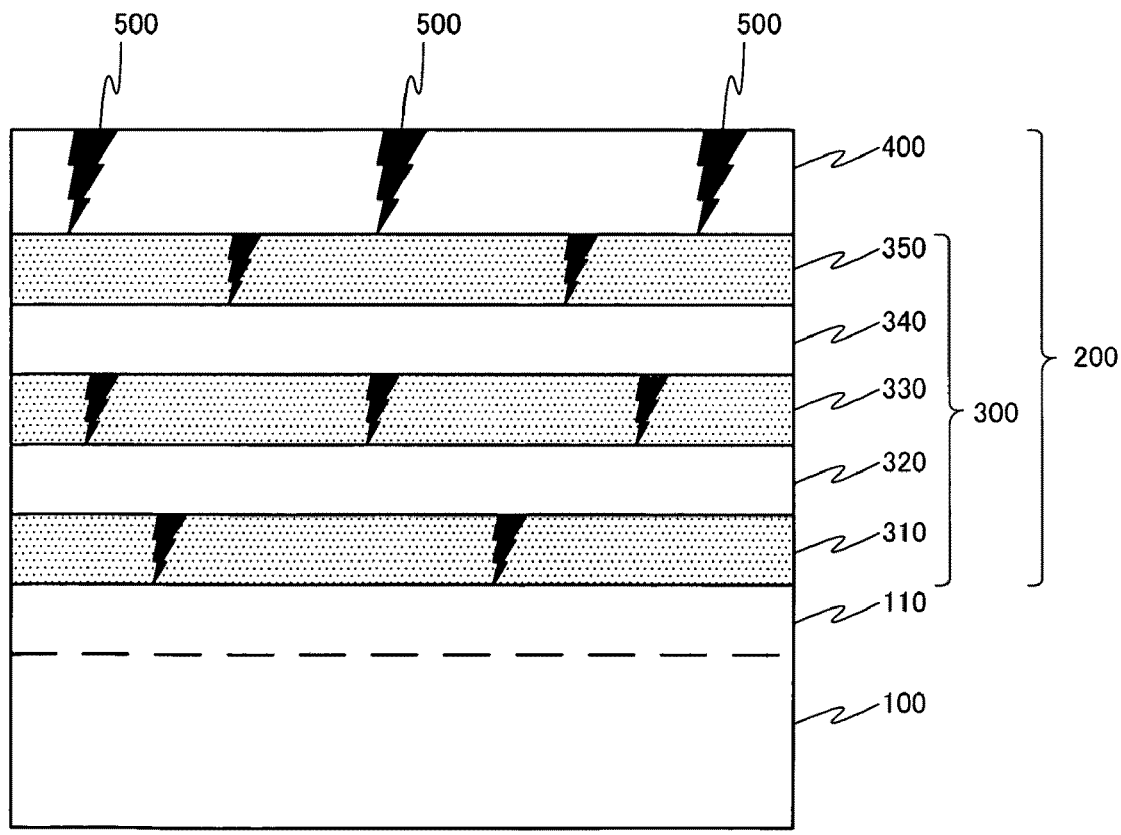
FIG. 4 is a cross-sectional schematic view for explaining the destructive behavior of the multilayer alloy film of the present invention.

The multilayer alloy film of the present invention has excellent mechanical characteristics. FIG. 4 is a cross-sectional schematic view showing the destructive behavior of the multilayer alloy film of the present invention. As shown in FIG. 4, the multilayer alloy film of the present invention can generate vertical cracks 500 caused by a heat stress, an external stress or the like in a dispersed manner in the layers, which can prevent the rapid destruction caused by stress concentration observed in the conventional film (see FIG. 2). Furthermore, in the multilayer alloy film of the present invention, the generation of horizontal cracks in the barrier layer and the interface of the barrier layer observed in the conventional film (see FIG. 2) can also be prevented by reducing the thickness of each of the layers. Therefore, the multilayer alloy film of the present invention can protect the base material over a long period of time as compared to the conventional film.

Since the multilayer alloy film of the present invention has thinner layers (the diffusion barrier layer, the inner sacrificial barrier layer and the outer sacrificial barrier layer) containing Re than those of the conventional film, the multilayer alloy film of the present invention may be formed at a lower temperature in a shorter time as compared to those of the conventional film. Therefore, the multilayer alloy film of the present invention may be formed on the surface of the base material without reducing the characteristics of the base material (the superalloy and the heat-resistant alloy).

Although the barrier layer containing three layers containing Re has been described, the barrier layer containing two layers containing Re also has excellent effect as compared to that of the conventional barrier layer having one layer containing Re. That is, since the barrier layer containing two layers containing Re can maintain heat resistance and high-temperature oxidation resistance with a thinner thickness than the conventional barrier layer, the creep resistance can be maintained over a longer period of time as compared to that of the conventional barrier layer.

In the multilayer alloy film of the present invention, the barrier layer contains five layers of the inner sacrificial barrier layer, the inner stabilizing layer, the diffusion barrier layer, the outer stabilizing layer and the outer sacrificial barrier layer. However, the multilayer alloy film may further contain additional layers such as a sacrificial barrier layer and a stabilizing layer. For example, in the multilayer alloy film of the present invention, the barrier layer may contain nine layers of a first sacrificial barrier layer, a first stabilizing layer, a second sacrificial barrier layer (inner sacrificial barrier layer), a second stabilizing layer (inner stabilizing layer), a diffusion barrier layer, a third stabilizing layer (outer stabilizing layer), a third sacrificial barrier layer (outer sacrificial barrier layer), a fourth stabilizing layer and a fourth sacrificial barrier layer.

2. Heat-Resistant Metal Member of the Present Invention

The heat-resistant metal member of the present invention has a metal base material on which the multilayer alloy film of the present invention is formed. In this case, in the heat-resistant metal member of the present invention, the surface of a metal member may be coated with the multilayer alloy film, or the multilayer alloy film may be inserted between the metal base material and a TBC layer. The heat-resistant metal member of the present invention is, for example, a moving blade, a stationary blade, a burner or a member of a jet engine or a gas turbine, a burner, a combustion nozzle or a heat exchange member of a boiler, a thermocouple casing or a heating element on which the multilayer alloy film of the present invention is formed.

The heat-resistant metal member of the present invention, which has the metal base material on which the multilayer alloy film of the present invention is formed, has excellent corrosion resistance, heat resistance and mechanical characteristics over a long period of time.

Hereinafter, embodiments of the present invention will be described in detail with reference to the drawings.

(Embodiment 1)

In Embodiment 1, there is shown an example in which, in a case where a Ni-based superalloy containing a γ' phase having an $L1_2$ structure and a γ phase of an fcc structure is used as a base material, and an alloy containing a γ' phase and a β phase having a bcc structure is used an aluminum reservoir layer (the γ' phase is common), the phase of an outer stabilizing layer and an inner stabilizing layer of a barrier layer is a two-phase mixed phase of a γ' phase and a γ phase according to that of the base material.

Figure 5:
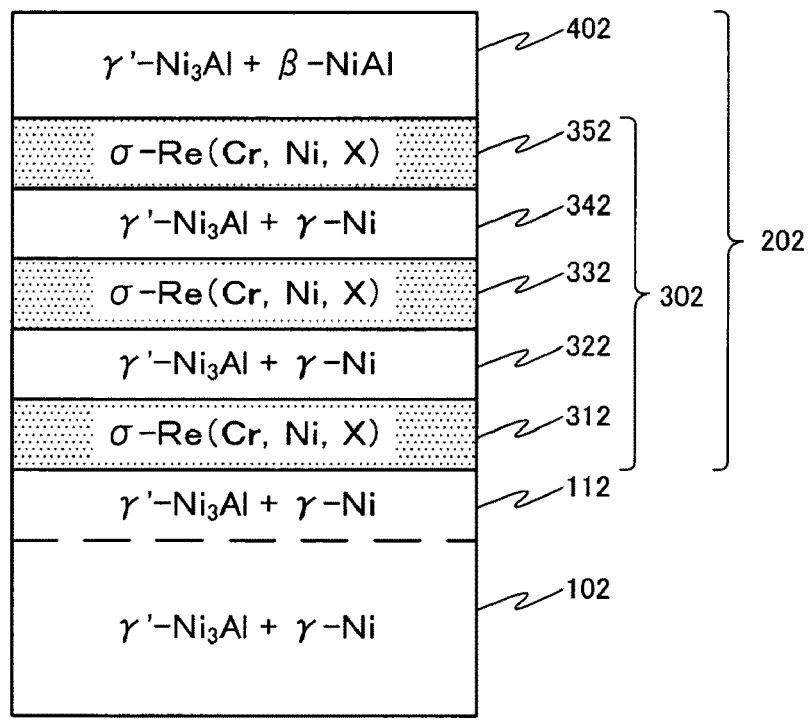
FIG. 5 is a cross-sectional schematic view of a multilayer alloy film according to Embodiment 1 of the present invention.

FIG. 5 is a cross-sectional schematic view of a multilayer alloy film according to Embodiment 1 of the present invention.

In FIG. 5, multilayer alloy film 202 formed on the surface of base material 102 (including base material diffusion layer 112) includes barrier layer 302 and an aluminum reservoir layer 402. Barrier layer 302 includes inner sacrificial barrier layer 312, inner stabilizing layer 322, diffusion barrier layer 332, outer stabilizing layer 342 and outer sacrificial barrier layer 352.

Base material 102 (including base material diffusion layer 112) is a Ni-based superalloy containing a γ' phase having an $L1_2$ structure and a γ phase of an fcc structure.

Aluminum reservoir layer 402 is an alloy layer containing a γ' phase and a β phase having a bcc structure. Aluminum reservoir layer 402 may contain Cr, Re, W, Zr, Hf, Y, Ce, La or the like other than Ni and Al. One example of the composition of aluminum reservoir layer 402 is shown below.

(γ'-Ni$_3$Al)

16<Al<25 atom %
1<Cr<10 atom %
0.01<Re<5 atom %
50<Ni<82.98 atom %
0.01<W+Zr+Hf+Y+Ce+La<10.0 atom %

(β-NiAl)

26<Al<50 atom %
1<Cr<10 atom %
0.01<Re<5 atom %
25<Ni<72.98 atom %
0.01<W+Zr+Hf+Y+Ce+La<10.0 atom %

Diffusion barrier layer 332 is a Re-based alloy layer. One example of the composition of the diffusion barrier layer 332 is shown below.

15<Cr+W+Mo<60 atom %
15<Ni+Co+Fe<25 atom %
15<Re<65 atom %

Inner sacrificial barrier layer 312 and outer sacrificial barrier layer 352 contain a Re-based alloy as in diffusion barrier layer 332. One example of the composition of the inner sacrificial barrier layer 312 and the outer sacrificial barrier layer 352 is shown below.

15<Cr+W+Mo<60 atom %
15<Ni+Co+Fe<25 atom %
15<Re<65 atom %

Inner stabilizing layer 322 and outer stabilizing layer 342 are a Ni-based alloy layer of a two-phase mixed phase of a γ' phase and a γ phase. One example of the composition of outer stabilizing layer 342 and inner stabilizing layer 322 is shown below.

(γ'-Ni$_3$Al)

16<Al<25 atom %
1<Cr<10 atom %
0.01<Re<5 atom %
60<Ni<82.99 atom %

(γ-Ni)

5<Al<16 atom %
1<Cr<25 atom %
0.01<Re<5 atom %
54<Ni<93.99 atom %

According to this embodiment, since all of the base material, the inner stabilizing layer, the outer stabilizing layer and the aluminum reservoir layer contain the γ' phase, the diffusion flux of the diffusion barrier layer can be reduced.

(Embodiment 2)

In Embodiment 2, there is shown an example in which, in a case where a Ni-based superalloy containing a γ' phase having an L1$_2$ structure and a γ phase of an fcc structure is used as a base material and an alloy containing a γ' phase and a β phase having a bcc structure is used as an aluminum reservoir layer (the γ' phase is common), the phase of an outer stabilizing layer and inner stabilizing layer of a barrier layer is a two-phase mixed phase of a γ' phase and a β phase according to that of the aluminum reservoir.

Figure 6:
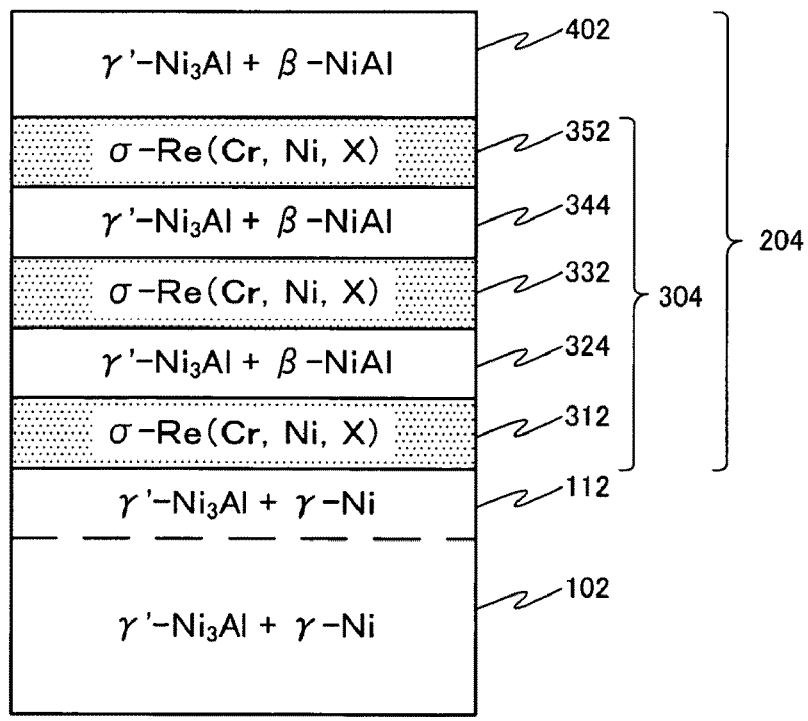
FIG. 6 is a cross-sectional schematic view of a multilayer alloy film according to Embodiment 2 of the present invention.

FIG. 6 is a cross-sectional schematic view of a multilayer alloy film according to Embodiment 2 of the present invention. The same components as those of the multilayer alloy film according to Embodiment 1 are denoted by the same reference numerals without repeating their overlapping descriptions.

In FIG. 6, multilayer alloy film 204 formed on the surface of base material 102 (including base material diffusion layer 112) includes barrier layer 304 and aluminum reservoir layer 402. Barrier layer 304 includes inner sacrificial barrier layer 312, inner stabilizing layer 324, diffusion barrier layer 332, outer stabilizing layer 344 and outer sacrificial barrier layer 352. Components other than inner stabilizing layer 324 and outer stabilizing layer 344 are the same as those of Embodiment 1.

Inner stabilizing layer 324 and outer stabilizing layer 344 are a Ni-based alloy layer of a two-phase mixed phase of a γ' phase and a β phase. One example of the composition of inner stabilizing layer 324 and outer stabilizing layer 344 is shown below.

(γ'-Ni$_3$Al)

16<Al<25 atom %
0.1<Cr<25 atom %
0.01<Re<5 atom %
60<Ni<82.99 atom %

(β-NiAl)

26<Al<50 atom %
1<Cr<10 atom %
0.01<Re<2 atom %
38<Ni<72.99 atom %

According to this embodiment, since all of the base material, the inner stabilizing layer, the outer stabilizing layer and the aluminum reservoir layer contain the γ' phase as in Embodiment 1, the diffusion flux of the diffusion barrier layer can be reduced.

(Embodiment 3)

In Embodiment 3, there is shown an example in which, in a case where a Ni-based superalloy containing a γ' phase having an L1$_2$ structure and a γ phase of an fcc structure is used as a base material and an alloy (containing Pt) containing a γ' phase having an L1$_2$ structure and a γ phase having an fcc structure is used as an aluminum reservoir layer (the γ' phase and the γ phase are common), the phase of an outer stabilizing layer and an inner stabilizing layer of a barrier layer is a two-phase mixed phase of a γ' phase and a γ phase.

Figure 7:
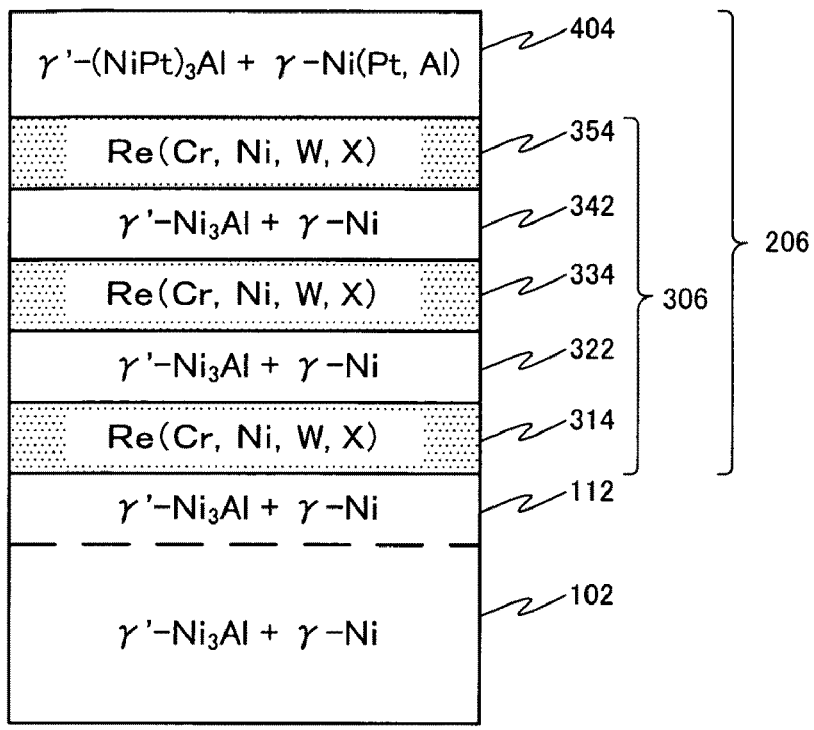
FIG. 7 is a cross-sectional schematic view of a multilayer alloy film according to Embodiment 3 of the present invention.

FIG. 7 is a cross-sectional schematic view of a multilayer alloy film according to Embodiment 3 of the present invention. The same components as those of the multilayer alloy film according to Embodiment 1 are denoted by the same reference numerals without repeating their overlapping descriptions.

In FIG. 7, multilayer alloy film 206 formed on the surface of base material 102 (including base material diffusion layer 112) includes barrier layer 306 and Pt-containing aluminum reservoir layer 404. The barrier layer 306 includes inner sacrificial barrier layer 314, inner stabilizing layer 322, diffusion barrier layer 334, outer stabilizing layer 342 and outer sacrificial barrier layer 354.

Base material 102 (including base material diffusion layer 112) is a Ni-based superalloy containing a γ' phase having an L1$_2$ structure and a γ phase of an fcc structure.

Pt-containing aluminum reservoir layer 404 is an alloy layer containing a γ' phase having an L1$_2$ structure and a γ phase having an fcc structure. Pt-containing aluminum reservoir layer 404 may contain Re, W, Zr, Hf, Y, Ce, La or the like other than Ni, Al, Cr and Pt. One example of the composition of Pt-containing aluminum reservoir layer 404 is shown below.

(γ'-(NiPt)$_3$Al)

19<Al<32 atom %
0.1<Cr<10 atom %
0.1<Pt<30 atom %
18<Ni<80.79 atom %
0.01<Re+W+Zr+Hf+Y+Ce+La<10.0 atom %

(γ-Ni(Pt,Al))

1<Al<18 atom %
0.1<Cr<25 atom %
0.1<Pt<30 atom %
17<Ni<98.79 atom %
0.01<Re+W+Zr+Hf+Y+Ce+La<10.0 atom %

Diffusion barrier layer 334 contains a σ phase of a Re-based alloy. It is preferable that diffusion barrier layer 334 contains W. One example of the composition of diffusion barrier layer 334 is shown below.

15<Cr+W+Mo<60 atom %
15<Ni+Co+Fe<25 atom %
15<Re<65 atom %

Inner sacrificial barrier layer 314 and outer sacrificial barrier layer 354 are Re-based alloy layers as diffusion barrier layer 334. One example of the composition of inner sacrificial barrier layer 314 and outer sacrificial barrier layer 354 is shown below.

15<Cr+W+Mo<60 atom %
15<Ni+Co+Fe<25 atom %
15<Re<65 atom %

Inner stabilizing layer 322 and outer stabilizing layer 342 are a Ni-based alloy layer of a two-phase mixed phase of a γ' phase and a γ phase. One example of the composition of outer stabilizing layer 342 and inner stabilizing layer 322 is shown below.

(γ'-Ni₃Al)

19<Al<32 atom %
0.1<Cr<10 atom %
0.01<Pt<30 atom %
18<Ni<80.88 atom %
0.01<Re+W+Zr+Hf+Y+Ce+La<10.0 atom %

(γ-Ni)

1<Al<25 atom %
0.1<Cr<25 atom %
0.01<Pt<30 atom %
17<Ni<98.88 atom %
0.01<Re+W+Zr+Hf+Y+Ce+La<10.0 atom %

According to this embodiment, since all of the base material, the inner stabilizing layer, the outer stabilizing layer and the aluminum reservoir layer contain the γ' phase and the γ phase, the diffusion flux of the diffusion barrier layer can be reduced.

(Embodiment 4)

In Embodiment 4, there is shown an example in which, in a case where a Ni-based superalloy containing a γ' phase having an L1₂ structure and a γ phase of an fcc structure is used as a base material and an alloy (containing Pt) containing a γ' phase having an L1₂ structure and a β phase having a bcc structure is used as an aluminum reservoir layer (the γ' phase is common), the phase of an outer stabilizing layer and an inner stabilizing layer of a barrier layer is a two-phase mixed phase of a γ' phase and a γ phase according to that of the base material.

Figure 8:
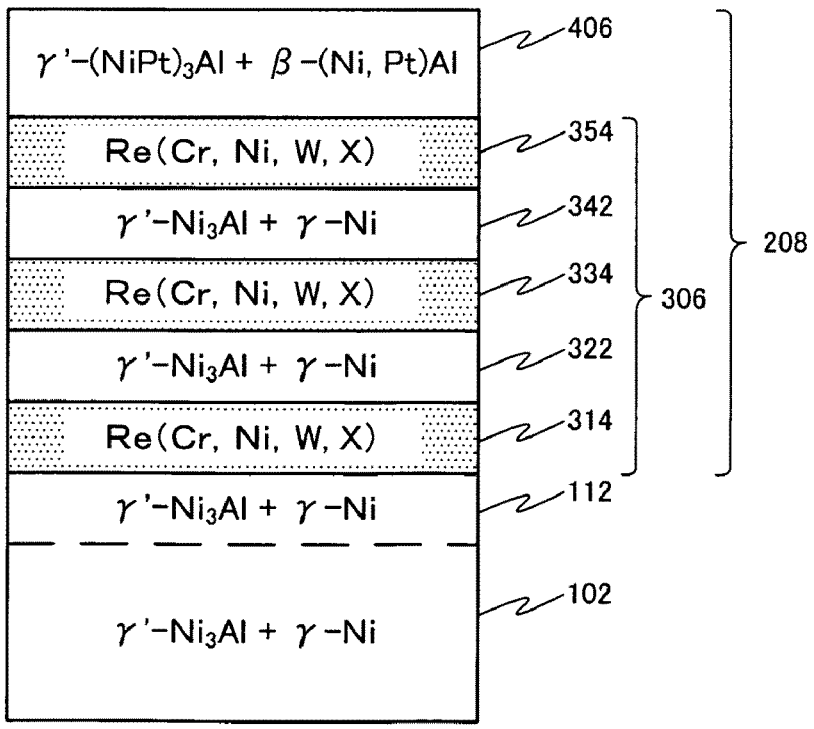
FIG. 8 is a cross-sectional schematic view of a multilayer alloy film according to Embodiment 4 of the present invention.

FIG. 8 is a cross-sectional schematic view of a multilayer alloy film according to Embodiment 4 of the present invention. The same components as those of the multilayer alloy film according to Embodiment 1 are denoted by the same reference numerals without repeating their overlapping descriptions.

In FIG. 8, multilayer alloy film 208 formed on the surface of base material 102 (including base material diffusion layer 112) includes barrier layer 306 and Pt-containing aluminum reservoir layer 406. Barrier layer 306 includes inner sacrificial barrier layer 314, inner stabilizing layer 322, diffusion barrier layer 334, outer stabilizing layer 342 and outer sacrificial barrier layer 354. Components other than Pt-containing aluminum reservoir layer 406 are the same as those of Embodiment 3.

Pt-containing aluminum reservoir layer 406 is an alloy layer containing a γ' phase having an L1₂ structure and a β phase having a bcc structure. Pt-containing aluminum reservoir layer 406 may contain Re, W, Zr, Hf, Y, Ce, La or the like other than Ni, Al, Cr and Pt. One example of the composition of Pt-containing aluminum reservoir layer 406 is shown below.

(γ'-(NiPt)₃Al)

19<Al<32 atom %
0.1<Cr<10 atom %
0.1<Pt<30 atom %
18<Ni<80.79 atom %
0.01<Re+W+Zr+Hf+Y+Ce+La<10.0 atom %

(β-(Ni,Pt)Al)

35<Al<50 atom %
0.1<Cr<10 atom %
0.1<Pt<30 atom %
5<Ni<64.79 atom %
0.01<Re+W+Zr+Hf+Y+Ce+La<10.0 atom %

According to this embodiment, since all of the base material, the inner stabilizing layer, the outer stabilizing layer and the aluminum reservoir layer contain the γ' phase, the diffusion flux of the diffusion barrier layer can be reduced.

(Embodiment 5)

In Embodiment 5, there is shown an example in which, in a case where austenitic stainless steel containing a γ phase having an fcc structure is used as a base material and an alloy containing a γ' phase having an L1₂ structure, a γ phase having an fcc structure and a β phase having a bcc structure is used as an aluminum reservoir layer (the γ phase is common), the phase of an outer stabilizing layer and an inner stabilizing layer of a barrier layer is a two-phase mixed phase of a γ' phase and a γ phase according to that of the aluminum reservoir side.

Figure 9:
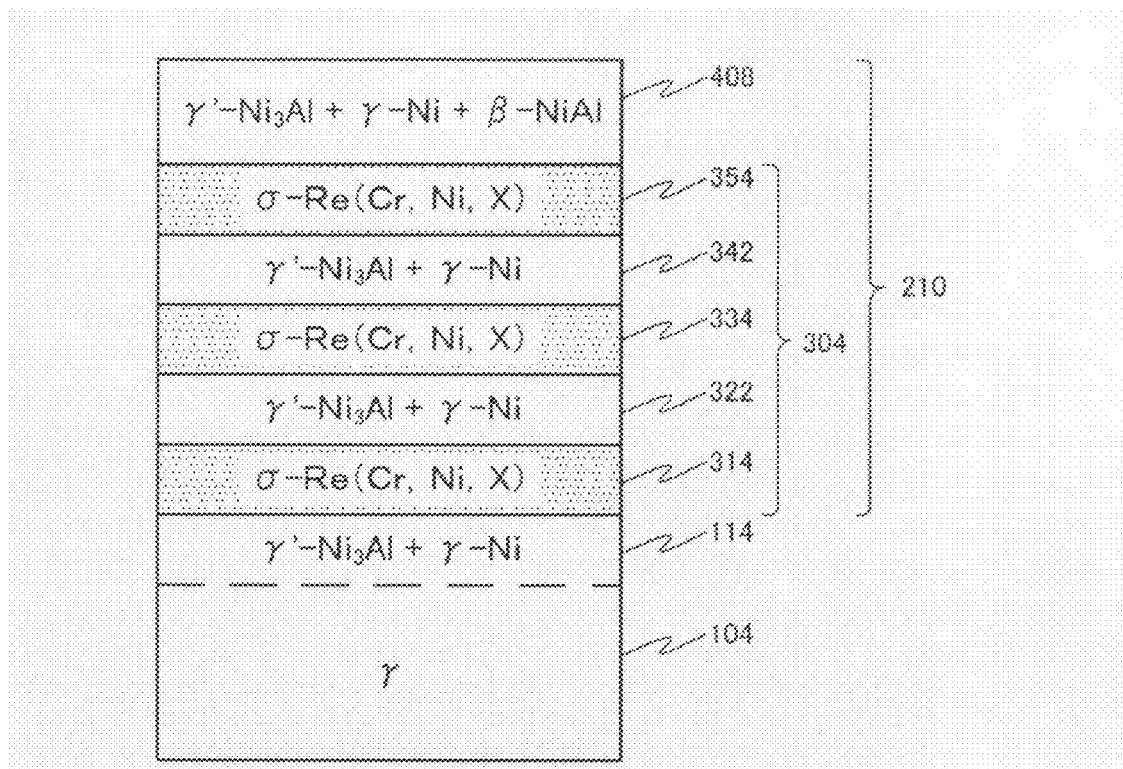
FIG. 9 is a cross-sectional schematic view of a multilayer alloy film according to Embodiment 5 of the present invention.

FIG. 9 is a cross-sectional schematic view of a multilayer alloy film according to Embodiment 5 of the present invention. In FIG. 9, multilayer alloy film 210 formed on the surface of base material 104 (including base material diffusion layer 114) includes barrier layer 304 and aluminum reservoir layer 408. Barrier layer 304 includes inner sacrificial barrier layer 314, inner stabilizing layer 322, diffusion barrier layer 334, outer stabilizing layer 342 and outer sacrificial barrier layer 354.

Base material 104 is austenitic stainless steel containing a γ phase having an fcc structure.

Base material diffusion layer 114 is a mixed phase of a γ' phase having an L1₂ structure and a γ phase having an fcc structure.

Aluminum reservoir layer 408 is an alloy layer containing a γ' phase, a γ phase and a β phase. Aluminum reservoir layer 408 may contain Cr, Re, W, Pt, Zr, Hf, Y, Ce, La or the like other than Ni and Al. One example of the composition of aluminum reservoir layer 408 is shown below.

(γ'-Ni₃Al)

16<Al<25 atom %
1<Cr<5 atom %
60<Ni<82.99 atom %
0.01<Re+W+Pt+Zr+Hf+Y+Ce+La<10.0 atom %

(γ-Ni)

5<Al<16 atom %
15<Cr<45 atom %
29<Ni<79.99 atom %
0.01<Re+W+Pt+Zr+Hf+Y+Ce+La<10.0 atom %

(β-NiAl)

26<Al<50 atom %
1<Cr<10 atom %
30<Ni<72.99 atom %
0.01<Pt+W+Zr+Hf+Y+Ce+La<10.0 atom %

Diffusion barrier layer 334 contains a σ phase of a Re-based alloy. One example of the composition of diffusion barrier layer 334 is shown below.

15<Cr+W+Mo<60 atom %
15<Ni+Co+Fe<25 atom %
15<Re<65 atom %

Inner sacrificial barrier layer 314 and outer sacrificial barrier layer 354 contains a σ phase of a Re-based alloy as in diffusion barrier layer 334. One example of the composition of inner sacrificial barrier layer 314 and outer sacrificial barrier layer 354 is shown below.

15<Cr+W+Mo<60 atom %
15<Ni+Co+Fe<25 atom %
15<Re<65 atom %

Inner stabilizing layer 322 and outer stabilizing layer 342 are Ni-based alloy layers of a two-phase mixed phase of a γ' phase and a γ phase. One example of the composition of outer stabilizing layer 342 and inner stabilizing layer 322 is shown below.

(γ-Ni)

5<Al<16 atom %
1<Cr<25 atom %
49<Ni<93.99 atom %
0.01<Re+W+Pt+Zr+Hf+Y+Ce+La<10.0 atom %

(γ'-Ni₃Al)

16<Al<25 atom %
1<Cr<10 atom %
55<Ni<82.99 atom %
0.01<Re+W+Pt+Zr+Hf+Y+Ce+La<10.0 atom %

According to this embodiment, since all of the base material, the inner stabilizing layer, the outer stabilizing layer and the aluminum reservoir layer contain the γ phase, the diffusion flux of the diffusion barrier layer can be reduced.

EXAMPLES

Hereinafter, the present invention will be further described with reference to Examples. The scope of the present invention is not interpreted to be limited to the Examples.

1. Examples Using Second Generation Ni-Based Single Crystal Superalloy, Co-Based Heat-Resistant Alloy or Ni-Based Heat-Resistant Alloy as Base Material Examples 1 to 8

[Base Material and Film Formation]

In Examples 1 to 8, three types of heat-resistant alloys of a second generation Ni-based single crystal superalloy (TMS-82+: registered trademark), a Co-based heat-resistant alloy (Haynes 188: registered trademark) and a Ni-based heat-resistant alloy (HASTELLOY X: registered trademark) were used as a base material. Specifically, the second generation Ni-based single crystal superalloy was used as the base material in Examples 1, 2, 7 and 8, the Co-based heat-resistant alloy was used as the base material in Examples 3 and 4, and the Ni-based heat-resistant alloy was used as the base material in Examples 5 and 6. Table 1 shows the nominal compositions of the heat-resistant alloys. Two types of multilayer alloy films (a multilayer alloy film containing a Ni—Cr—Re-based alloy layer or a multilayer alloy film containing a Ni—Cr—W—Re-based alloy layer) were formed on each of the base materials (three types in total) by a method including no Cr plating treatment (Examples 1 to 6). Two types of multilayer alloy films were formed on the second generation Ni-based single crystal superalloy by a method including Cr plating treatment (Examples 7 and 8).

Strip test pieces, which were cut out from each of the base materials, were subjected to surface polishing (wet polishing using an emery paper of #150 to 600) and degreasing washing (ultrasonic washing in acetone). A multilayer alloy film was then formed on the surface of the base material according to the following procedure.

First, films made of a Re—Ni alloy, a Ni—W alloy, Ni and Cr were formed on the surfaces of the base material by electroplating. The thickness and the order of these films (plating layers) were changed according to the application.

Specifically, when the multilayer alloy film using a Re—Cr—Ni-based alloy (σ phase) for a diffusion barrier layer, an outer sacrificial barrier layer and an inner sacrificial barrier layer was formed on the surface of the base material by the method including no Cr plating treatment, a film of the metals was formed according to the following procedure (film formation method 1: Examples 1, 3 and 5).

(Film Formation Method 1)

(1) Ni plating (Strike bath): Film thickness of 0.1 μm: Improved adhesion between base material and film
(2) Ni plating (Watt bath): Film thickness of 2 μm: Formation of diffusion layer
(3) Re—Ni alloy plating: Film thickness of 1 μm: Inner sacrificial barrier layer
(4) Ni plating (Watt bath): Film thickness of 2 μm: Inner stabilizing layer
(5) Re—Ni alloy plating: Film thickness of 2 μm: Diffusion barrier layer
(6) Ni plating (Watt bath): Film thickness of 2 μm: Outer stabilizing layer
(7) Re—Ni alloy plating: Film thickness of 1 μm: Outer sacrificial barrier layer
(8) Ni plating (Watt bath): Film thickness of 2 μm: Protection of entire plating film When the multilayer alloy film using the Re—Cr—Ni-based alloy (σ phase) for the diffusion barrier layer, the outer sacrificial barrier layer and the inner sacrificial barrier layer was formed on the surface of the base material by the method including Cr plating treatment, a film of the metals was formed according to the following procedure (film formation method 2: Example 7).

(Film Formation Method 2)

(1) Ni plating (Strike bath): Film thickness of 0.1 μm: Improved adhesion of base material and film
(2) Ni plating (Watt bath): Film thickness of 2 μm: Formation of diffusion layer
(3) Cr plating: Film thickness of 0.5 μm

TABLE 1

Compositions of heat-resistant alloys used in Examples 1 to 8 (mass %)

| | Al | Ti | Ta | Mo | W | Re | Hf | Cr | Co | Ni | Fe | Mn | Si | C |
|---|---|---|---|---|---|---|---|---|---|---|---|---|---|---|
| Second generation Ni-based single crystal superalloy | 5.3 | 0.5 | 6.0 | 1.9 | 8.7 | 2.4 | 0.1 | 4.9 | 7.8 | B* | — | — | — | — |
| Co-based heat-resistant alloy | — | — | — | — | 1 | — | 0.1 | 22 | B* | 22 | 3.0 | 0.5 | 0.4 | 0.1 |
| Ni-based heat-resistant alloy | — | — | — | 9.0 | 0.6 | — | 0.1 | 22 | 1.5 | B* | 18.5 | 0.5 | 0.5 | 0.1 |

B: Balance (4) Ni plating (Strike bath): Film thickness of 0.1 µm: Improved adhesion of film
(5) Re—Ni alloy plating: Film thickness of 1 µm: Inner sacrificial barrier layer
(6) Ni plating (Watt bath): Film thickness of 2 µm: Inner stabilizing layer
(7) Cr plating: Film thickness of 0.5 µm
(8) Ni plating (Strike bath): Film thickness of 0.1 µm: Improved adhesion of film
(9) Re—Ni alloy plating: Film thickness of 2 µm: Diffusion barrier layer
(10) Ni plating (Watt bath): Film thickness of 2 µm: Outer stabilizing layer
(11) Cr plating: Film thickness of 0.5 µm
(12) Ni plating (Strike bath): Film thickness of 0.1 µm: Improved adhesion of film
(13) Re—Ni alloy plating: Film thickness of 1 µm: Outer sacrificial barrier layer
(14) Ni plating (Watt bath): Film thickness of 2 µm: Protection of entire plating film When the multilayer alloy film using a Re—Cr—W—Ni-based alloy (σ phase) for the diffusion barrier layer, the outer sacrificial barrier layer and the inner sacrificial barrier layer was formed on the surface of the base material by the method including no Cr plating treatment, a film of the metals was formed according to the following procedure (film formation method 3: Examples 2, 4 and 6).

(Film Formation Method 3)
(1) Ni plating (Strike bath): Film thickness of 0.1 µm: Improved adhesion between base material and film
(2) Ni plating (Watt bath): Film thickness of 2 µm: Formation of diffusion layer
(3) Re—Ni alloy plating: Film thickness of 1 µm: Inner sacrificial barrier layer
(4) Ni—W alloy plating: Film thickness of 1 µm: Inner sacrificial barrier layer
(5) Ni plating (Watt bath): Film thickness of 2 µm: Inner stabilizing layer
(6) Re—Ni alloy plating: Film thickness of 2 µm: Diffusion barrier layer
(7) Ni—W alloy plating: Film thickness of 1 µm: Diffusion barrier layer
(8) Ni plating (Watt bath): Film thickness of 2 µm: Outer stabilizing layer
(9) Re—Ni alloy plating: Film thickness of 1 µm: Outer sacrificial barrier layer
(10) Ni—W alloy plating: Film thickness of 1 µm: Outer sacrificial barrier layer
(11) Ni plating (Watt bath): Film thickness of 2 µm: Protection of entire plating film When the multilayer alloy film using the Re—Cr—W—Ni-based alloy (σ phase) for the diffusion barrier layer, the outer sacrificial barrier layer and the inner sacrificial barrier layer was formed on the surface of the base material by the method including Cr plating treatment, a film of the metals was formed according to the following procedure (film formation method 4: Example 8).

(Film Formation Method 4)
(1) Ni plating (Strike bath): Film thickness of 0.1 µm: Improved adhesion between base material and film
(2) Ni plating (Watt bath): Film thickness of 2 µm: Formation of diffusion layer
(3) Cr plating: Film thickness of 0.5 µm
(4) Ni plating (Strike bath): Film thickness of 0.1 µm: Improved adhesion of film
(5) Re—Ni alloy plating: Film thickness of 1 µm: Inner sacrificial barrier layer
(6) Ni—W alloy plating: Film thickness of 1 µm: Inner sacrificial barrier layer
(7) Ni plating (Watt bath): Film thickness of 2 µm: Inner stabilizing layer
(8) Cr plating: Film thickness of 0.5 µm
(9) Ni plating (Strike bath): Film thickness of 0.1 µm: Improved adhesion of film
(10) Re—Ni alloy plating: Film thickness of 2 µm: Diffusion barrier layer
(11) Ni—W alloy plating: Film thickness of 1 µm: Diffusion barrier layer
(12) Ni plating (Watt bath): Film thickness of 2 µm: Outer stabilizing layer
(13) Cr plating: Film thickness of 0.5 µm
(14) Ni plating (Strike bath): Film thickness of 0.1 µm: Improved adhesion of film
(15) Re—Ni alloy plating: Film thickness of 1 µm: Outer sacrificial barrier layer
(16) Ni—W alloy plating: Film thickness of 1 µm: Outer sacrificial barrier layer
(17) Ni plating (Watt bath): Film thickness of 2 µm: Protection of entire plating film Although the film formation method 2 or the film formation method 4 including Cr plating treatment can be applied to any of the alloys, the film formation method 2 or 4 is more preferable when a Cr concentration in the base material is low. For example, a Ni-based single crystal superalloy used in Examples 1, 2, 7 and 8 is one example thereof.

When the film was formed by the method including no Cr plating treatment (the film formation method 1 or the film formation method 3), the base material having the film formed thereon was subjected to Cr infiltration treatment. Specifically, the base material having the film formed thereon was buried in mixed powder (Ni–30Cr alloy powder+$Ni_2Al_3$ powder+$NH_4Cl$+$Al_2O_3$ powder (weight ratio 8:1:1:4)) in an alumina crucible, and was heated in an argon gas atmosphere at 1280° C. for 4 hours.

When the film was formed by the method including Cr plating treatment (the film formation method 2 or the film formation method 4), the base material was subjected to heat treatment without performing Cr infiltration treatment. The base material having the film formed thereon may be heated in a vacuum or inactive gas atmosphere such as argon gas at 1200 to 1280° C. for 10 minutes to 4 hours. Specifically, the base material having the film formed thereon was heated in an argon gas atmosphere at 1250° C. for 1 hour.

Next, Al infiltration treatment was performed. Specifically, a film (film thickness: 30 µm) made of Ni was formed on the surface of the base material subjected to Cr infiltration treatment or subjected to Cr plating treatment and heat treatment by electroplating (watt bath). The base material having the Ni film formed thereon was then buried in mixed powder (Al powder+$NH_4Cl$+$Al_2O_3$ powder (weight ratio 1:1:4)) in an alumina crucible, and was heated in an argon gas atmosphere at 800° C. for 30 minutes.

Finally, the base material subjected to Al infiltration treatment was subjected to post heat treatment. Specifically, the base material subjected to Al infiltration treatment was heated in an argon gas atmosphere at 1000° C. for 4 hours.

Figure 10:
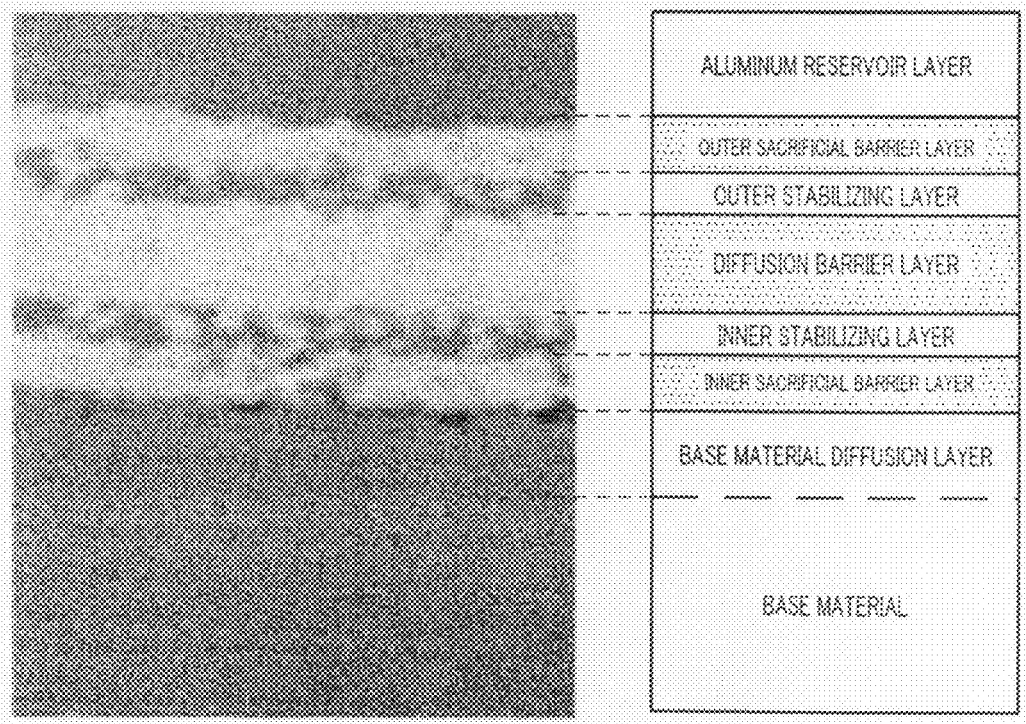
FIG. 10 is a cross-sectional photograph of a test piece of Example 2 before a high temperature oxidation test.
Figure 11:
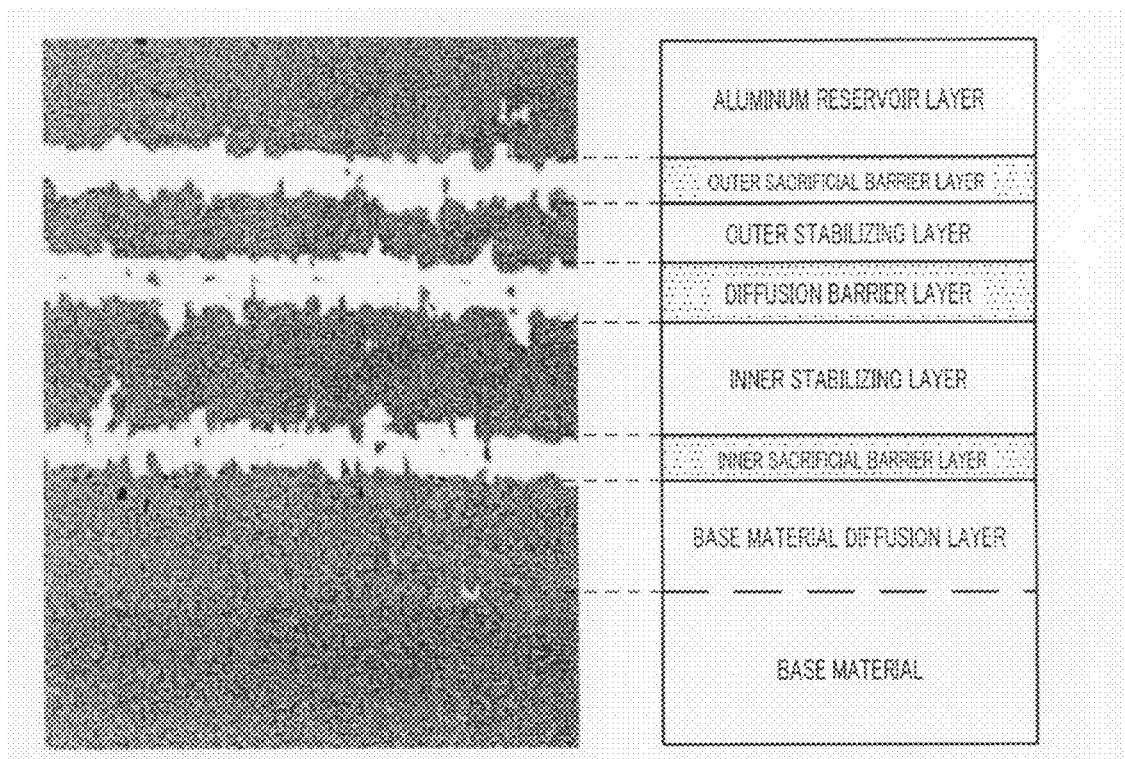
FIG. 11 is a cross-sectional photograph of a test piece of Example 7 before a high temperature oxidation test.

Tables 2 to 9 show the thickness and analysis results of elemental compositions of the layers of the test pieces (Examples 1 to 8) obtained by the above-described procedures. FIG. 10 shows a cross-sectional photograph of the test piece of Example 2 immediately after the multilayer alloy film is formed. FIG. 11 shows a cross-sectional photograph of the test piece of Example 7 immediately after the multilayer alloy film is formed.

TABLE 2

Example 1: example obtained by forming a multilayer alloy film using a Ni—Cr—Re-based alloy (σ phase) for a diffusion barrier layer, an outer sacrificial barrier layer and an inner sacrificial barrier layer on a second generation Ni-based single crystal superalloy (Unit: thickness (μm), Ni to Hf (atom %))

|  | Thickness (μm) | Ni | Co | Al | Cr | Re | W | Mo | Ta | Ti | Hf |
|---|---|---|---|---|---|---|---|---|---|---|---|
| Aluminum reservoir layer | 40.0 | B* | 3 | 20~35 | 5~10 | 0.2 | 0.2 | 0.1 | 0.05 | 0.05 | 0.05 |
| Outer sacrificial barrier layer | 2.2 | 15~24 | 1 | 0.9~1.5 | 27~54 | 35~45 | 1~4 | 1~4 | 0.1 | 0.05 | 0.1 |
| Outer stabilizing layer | 2.8 | B* | 2 | 12~25 | 2~5 | 0.1 | 0.1 | — | — | 0.1 | 0.1 |
| Diffusion barrier layer | 2.2 | 15~24 | 1 | 0.4~0.9 | 35~40 | 40~50 | 1~4 | 1~4 | 0.1 | 0.05 | 0.1 |
| Inner stabilizing layer | 2.8 | B* | 3 | 10~23 | 2~5 | 0.2 | 0.1 | — | — | 0.1 | 0.1 |
| Inner sacrificial barrier layer | 2.2 | 15~24 | 1 | 0.4~0.8 | 40~45 | 40~48 | 2~5 | 2~5 | 0.1 | 0.05 | 0.1 |

B: Balance

TABLE 3

Example 2: example obtained by forming a multilayer alloy film using a Re—Cr—Ni—W-based alloy (σ phase) for a diffusion barrier layer, an outer sacrificial barrier layer and an inner sacrificial barrier layer on a second generation Ni-based single crystal superalloy (Unit: thickness (μm), Ni to Hf (atom %))

|  | Thickness (μm) | Ni | Co | Al | Cr | Re | W | Mo | Ta | Ti | Hf |
|---|---|---|---|---|---|---|---|---|---|---|---|
| Aluminum reservoir layer | 45.0 | B* | 2 | 20~40 | 5~10 | 0.2 | 0.7 | 0.3 | 0.1 | 0.1 | 0.05 |
| Outer sacrificial barrier layer | 2.0 | 15~24 | 1 | 0.9~2.0 | 25~30 | 35~45 | 10~15 | 0.2 | 0.3 | — | 0.1 |
| Outer stabilizing layer | 2.3 | B* | 2 | 20~35 | 5~10 | 0.2 | 0.7 | 0.3 | 0.1 | 0.1 | 0.05 |
| Diffusion barrier layer | 2.5 | 15~24 | 1 | 0.2~0.5 | 23~25 | 40~50 | 15~20 | 0.2 | 0.3 | — | 0.1 |
| Inner stabilizing layer | 2.0 | B* | 2 | 13~20 | 5~8 | 0.2 | 0.7 | 0.3 | 0.1 | 0.1 | 0.05 |
| Inner sacrificial barrier layer | 1.5 | 15~24 | 1 | 0.7~0.9 | 30~40 | 40~48 | 9~14 | 0.2 | 0.8 | — | 0.1 |

B: Balance

TABLE 4

Example 3: example obtained by forming a multilayer alloy film using a Re—Cr—Ni-based alloy (σ phase) for a diffusion barrier layer, an outer sacrificial barrier layer and an inner sacrificial barrier layer on a Co-based heat-resistant alloy (Unit: thickness (μm), Ni to Hf (atom %))

|  | Thickness (μm) | Ni | Co | Fe | Al | Cr | Re | W | Hf |
|---|---|---|---|---|---|---|---|---|---|
| Aluminum reservoir layer | 35.0 | B* | 3 | 1 | 20~35 | 5~10 | 0.2 | 0.2 | 0.05 |
| Outer sacrificial barrier layer | 1.5 | 15~22 | 2 | 1 | 1.1~2.3 | 35~50 | 35~45 | 2~7 | 0.1 |
| Outer stabilizing layer | 2.2 | B* | 3 | 1 | 12~25 | 2~5 | 0.1 | 0.1 | 0.1 |
| Diffusion barrier layer | 2.0 | 15~21 | 2 | 2 | 0.1~0.2 | 35~40 | 40~50 | 4~13 | 0.1 |
| Inner stabilizing layer | 2.6 | B* | 3 | 1 | 10~23 | 2~5 | 0.1 | 0.1 | 0.1 |
| Inner sacrificial barrier layer | 1.5 | 15~19 | 4 | 2 | 0.4~0.8 | 40~45 | 40~48 | 5~11 | 0.1 |

B: Balance

TABLE 5

Example 4: example obtained by forming a multilayer alloy film using a Re—Cr—Ni—W-based alloy (σ phase) for a diffusion barrier layer, an outer sacrificial barrier layer and an inner sacrificial barrier layer on a Co-based heat-resistant alloy (Unit: thickness (μm), Ni to Hf (atom %))

| | Thickness (μm) | Ni | Co | Fe | Al | Cr | Re | W | Hf |
|---|---|---|---|---|---|---|---|---|---|
| Aluminum reservoir layer | 40.0 | B* | 4 | 0.5 | 18~35 | 5~10 | 0.1 | 0.7 | 0.05 |
| Outer sacrificial barrier layer | 2.0 | 15~20 | 4 | 1.0 | 2.0~3.5 | 35~38 | 35~45 | 10~16 | 0.1 |
| Outer stabilizing layer | 2.0 | B* | 2 | 0.5 | 14~20 | 8~15 | 0.2 | 0.7 | 0.05 |
| Diffusion barrier layer | 3.0 | 12~19 | 5 | 0.8 | 0.2~0.6 | 35~38 | 40~50 | 15~18 | 0.1 |
| Inner stabilizing layer | 2.5 | B* | 2 | 0.4 | 10~23 | 5~8 | 0.2 | 0.7 | 0.05 |
| Inner sacrificial barrier layer | 1.5 | 10~16 | 8 | 0.3 | 0.5~0.9 | 35~40 | 40~48 | 14~18 | 0.1 |

B: Balance

TABLE 6

Example 5: example obtained by forming a multilayer alloy film using a Ni—Cr—Re-based alloy (σ phase) for a diffusion barrier layer, an outer sacrificial barrier layer and an inner sacrificial barrier layer on a Ni-based heat-resistant alloy (Unit: thickness (μm), Ni to Hf (atom %))

| | Thickness (μm) | Ni | Co | Fe | Al | Cr | Re | W | Mo | Hf |
|---|---|---|---|---|---|---|---|---|---|---|
| Aluminum reservoir layer | 40.0 | B* | 3 | 1 | 25~40 | 5~10 | 0.2 | 0.2 | 0.1 | 0.05 |
| Outer sacrificial barrier layer | 1.0 | 14~17 | 1 | 5~7 | 3.0~5.0 | 36~46 | 35~45 | 5~10 | 5~10 | 0.1 |
| Outer stabilizing layer | 1.5 | B* | 3 | 2~4 | 12~26 | 2~5 | 0.1 | 0.1 | 0.1 | 0.1 |
| Diffusion barrier layer | 2.5 | 10~18 | 1 | 6~9 | 0.2~0.6 | 35~40 | 40~50 | 15~18 | 10~25 | 0.1 |
| Inner stabilizing layer | 2.4 | B* | 3 | 2~10 | 10~23 | 2~5 | 0.2 | 0.1 | 0.1 | 0.1 |
| Inner sacrificial barrier layer | 2.0 | 7~15 | 1 | 9~15 | 0.5~0.9 | 30~40 | 40~48 | 14~18 | 16~31 | 0.1 |

B: Balance

TABLE 7

Example 6: example obtained by forming a multilayer alloy film using a Ni—Cr—W—Re-based alloy (σ phase) for a diffusion barrier layer, an outer sacrificial barrier layer and an inner sacrificial barrier layer on a Ni-based heat-resistant alloy (Unit: thickness (μm), Ni to Hf (atom %))

| | Thickness (μm) | Ni | Co | Fe | Al | Cr | Re | W | Mo | Hf |
|---|---|---|---|---|---|---|---|---|---|---|
| Aluminum reservoir layer | 45.0 | B* | 0.2 | 3.0 | 20~40 | 5~10 | 0.1 | 0.7 | 0.5 | 0.05 |
| Outer sacrificial barrier layer | 2.0 | 14~17 | 4 | 4.0 | 3.0~5.0 | 25~30 | 35~45 | 10~16 | 8.0 | 0.1 |
| Outer stabilizing layer | 2.0 | B* | 1.0 | 0.5 | 14~20 | 8~15 | 0.2 | 0.7 | 0.5 | 0.05 |
| Diffusion barrier layer | 3.0 | 13~18 | 5 | 0.8 | 0.2~0.6 | 23~27 | 40~50 | 15~18 | 12.0 | 0.1 |
| Inner stabilizing layer | 2.5 | B* | 0.1 | 2.5 | 18~20 | 5~8 | 0.2 | 0.7 | 1.0 | 0.05 |
| Inner sacrificial barrier layer | 2.0 | 13~20 | 0.5 | 4.5 | 0.5~0.9 | 20~25 | 40~48 | 14~18 | 15.0 | 0.1 |

B: Balance

TABLE 8

Example 7: example obtained by forming a multilayer alloy film using a Ni—Cr—Re-based alloy (σ phase) for a diffusion barrier layer, an outer sacrificial barrier layer and an inner sacrificial barrier layer on a second generation Ni-based single crystal superalloy (Unit: thickness (μm), Ni to Hf (atom %))

|  | Thickness (μm) | Ni | Co | Al | Cr | Re | W | Mo | Ta | Ti | Hf |
|---|---|---|---|---|---|---|---|---|---|---|---|
| Aluminum reservoir layer | 40.0 | B* | 3 | 30~40 | 3~7 | 0.1 | 0.2 | 0.1 | 0.05 | 0.05 | 0.05 |
| Outer sacrificial barrier layer | 2.2 | 15~23 | 1 | 5.0~8.0 | 40~45 | 35~45 | 1~4 | 1~4 | 0.1 | 0.05 | 0.1 |
| Outer stabilizing layer | 2.8 | B* | 2 | 16~25 | 1~4 | 0.2 | 0.1 | — | — | 0.1 | 0.1 |
| Diffusion barrier layer | 2.2 | 16~24 | 1 | 0.4~0.9 | 41~44 | 40~50 | 4~6 | 1~4 | 0.1 | 0.05 | 0.1 |
| Inner stabilizing layer | 2.8 | B* | 3 | 10~20 | 1~3 | 0.2 | 0.1 | — | — | 0.1 | 0.1 |
| Inner sacrificial barrier layer | 2.2 | 15~24 | 1 | 0.1~0.3 | 35~40 | 40~48 | 4~7 | 2~5 | 0.1 | 0.05 | 0.1 |

B: Balance

TABLE 9

Example 8: example obtained by forming a multilayer alloy film using a Ni—Cr—W—Re-based alloy (σ phase) for a diffusion barrier layer, an outer sacrificial barrier layer and an inner sacrificial barrier layer on a second generation Ni-based single crystal superalloy (Unit: thickness (μm), Ni to Hf (atom %))

|  | Thickness (μm) | Ni | Co | Al | Cr | Re | W | Mo | Ta | Ti | Hf |
|---|---|---|---|---|---|---|---|---|---|---|---|
| Aluminum reservoir layer | 45.0 | B* | 2 | 35~40 | 3~7 | 0.1 | 0.5 | 0.3 | 0.1 | 0.1 | 0.05 |
| Outer sacrificial barrier layer | 2.0 | 15~23 | 1 | 0.6~0.9 | 30~45 | 35~45 | 11~13 | 0.2 | 0.3 | — | 0.1 |
| Outer stabilizing layer | 2.3 | B* | 2 | 20~25 | 1~4 | 0.2 | 0.3 | 0.3 | 0.1 | 0.1 | 0.05 |
| Diffusion barrier layer | 2.5 | 16~24 | 1 | 0.4~0.9 | 30~44 | 40~50 | 15~20 | 0.2 | 0.3 | — | 0.1 |
| Inner stabilizing layer | 2.0 | B* | 2 | 10~21 | 1~3 | 0.2 | 0.5 | 0.3 | 0.1 | 0.1 | 0.05 |
| Inner sacrificial barrier layer | 1.5 | 15~24 | 1 | 0.1~0.3 | 35~40 | 40~48 | 10~13 | 0.2 | 0.8 | — | 0.1 |

B: Balance

[High Temperature Oxidation Test]

A high temperature oxidation test was performed in order to investigate the oxidation resistance of each of the test pieces of Examples 1 to 8 under an ultrahigh temperature environment. The high temperature oxidation test was performed by repeating the steps of: heating the test pieces in the atmosphere at 1100° C. for 400 hours (Examples 3 and 4), in the atmosphere at 1100° C. for 600 hours (Examples 5 and 6), in the atmosphere at 1150° C. for 100 hours (Examples 1 and 2), or in the atmosphere at 1150° C. for 400 hours (Examples 7 and 8) to oxidize the test pieces; and cooling the test pieces in a furnace to room temperature; performing weight measurement and surface observation of the test pieces; and reheating the test pieces to oxidize the test pieces. In this process, the exfoliation situation of the film was able to be confirmed by performing the high temperature oxidation test of the test pieces with the test pieces respectively put in different crucibles. Each of the test pieces was cut after the high temperature oxidation test was completed to observe the cross section of the test piece using a scanning electron microscope (SEM), and to analyze the elemental compositions of the base material and film using an element analyzer (EA) and an electron probe micro analyzer (EPMA).

Tables 10 to 13 show the results (oxidization corrosion amount) of the high temperature oxidation tests of the test pieces of Examples 1 to 8. Tables 10 to 13 also show the results of the high temperature oxidation tests of a test piece obtained by forming only aluminum reservoir layers (thickness: about 50 μm) containing a β phase on the base materials and of the base material itself (solid base material) as Comparative Examples. In the high temperature oxidation test of the test piece on which only the aluminum reservoir layer was formed, the test piece was heated at 1150° C. for 400 hours. In the high temperature oxidation test of the solid base material, the solid base material was heated at 1150° C. for 100 hours.

TABLE 10

Result of a high temperature oxidation test of a test piece using a second generation Ni-based single crystal superalloy as a base material

|  | Oxidization amount (mg/cm$^2$) | Remarks |
|---|---|---|
| Example 1 | 0.8 | |
| Example 2 | 0.5 | |
| Comparative Example (only aluminum reservoir layer) | 2.3 | Oxide film partially exfoliated |
| Comparative Example (solid base material) | −8 | Mass decreased due to remarkable exfoliation of oxide film |

TABLE 11

Result of a high temperature oxidation test of a test piece
using a Co-based heat-resistant alloy as a base material

|  | Oxidization amount (mg/cm²) | Remarks |
|---|---|---|
| Example 3 | 0.9 | |
| Example 4 | 0.7 | |
| Comparative Example (only aluminum reservoir layer) | 3.5 | Oxide film partially exfoliated |
| Comparative Example (solid base material) | −35 | Mass decreased due to remarkable exfoliation of oxide film |

TABLE 12

Result of a high temperature oxidation test of a test piece
using a Ni-based heat-resistant alloy as a base material

|  | Oxidization amount (mg/cm²) | Remarks |
|---|---|---|
| Example 5 | 1.1 | |
| Example 6 | 0.9 | |
| Comparative Example (only aluminum reservoir layer) | 5.0 | Oxide film partially exfoliated |
| Comparative Example (solid base material) | −50 | Mass decreased due to remarkable exfoliation of oxide film |

TABLE 13

Result of a high temperature oxidation test of
a test piece using a second generation Ni-based
single crystal superalloy as a base material

|  | Oxidization amount (mg/cm²) | Remarks |
|---|---|---|
| Example 7 | 0.7 | |
| Example 8 | 0.6 | |
| Comparative Example (only aluminum reservoir layer) | 4.5 | Oxide film partially exfoliated |
| Comparative Example (solid base material) | −5 | Mass decreased due to remarkable exfoliation of oxide film |

In the test pieces (Examples 1 to 8) on which the multilayer alloy film of the present invention was formed, the oxidization amount thereof was in the range of 0.5 to 1.1 mg/cm². The formed oxide was $\alpha$-$Al_2O_3$, and the exfoliation of the film or the like was not observed. On the other hand, in Comparative Example in which only the aluminum reservoir layer was formed, the oxidization amount thereof was 3 to 7 times of those of Examples 1 to 8, and the exfoliation of the oxide film was observed. In a solid alloy with no film formed thereon, the oxidization amount thereof was a negative value due to remarkable exfoliation of the oxide film. Thus, the multilayer alloy film of the present invention has excellent oxidation resistance even under an ultrahigh temperature environment.

Figure 12:
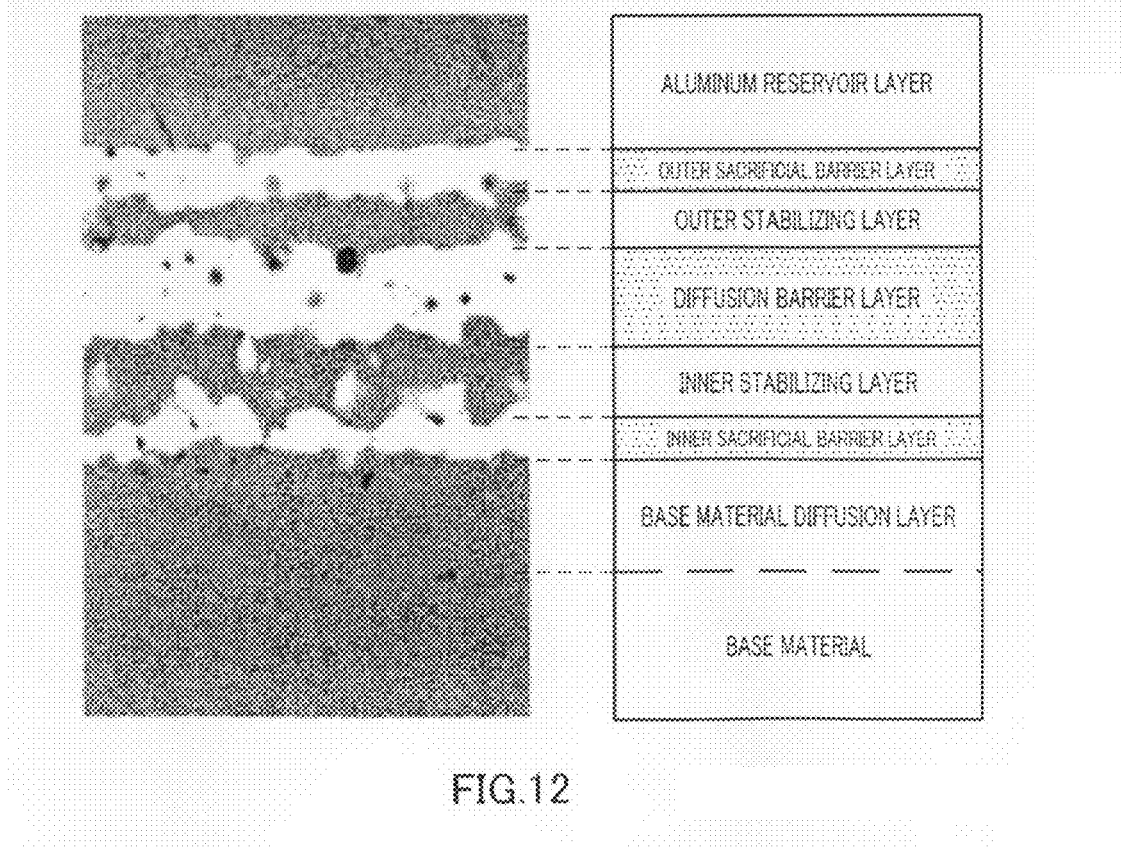
FIG. 12 is a cross-sectional photograph of the test piece of Example 2 after the high temperature oxidation test.
Figure 13:
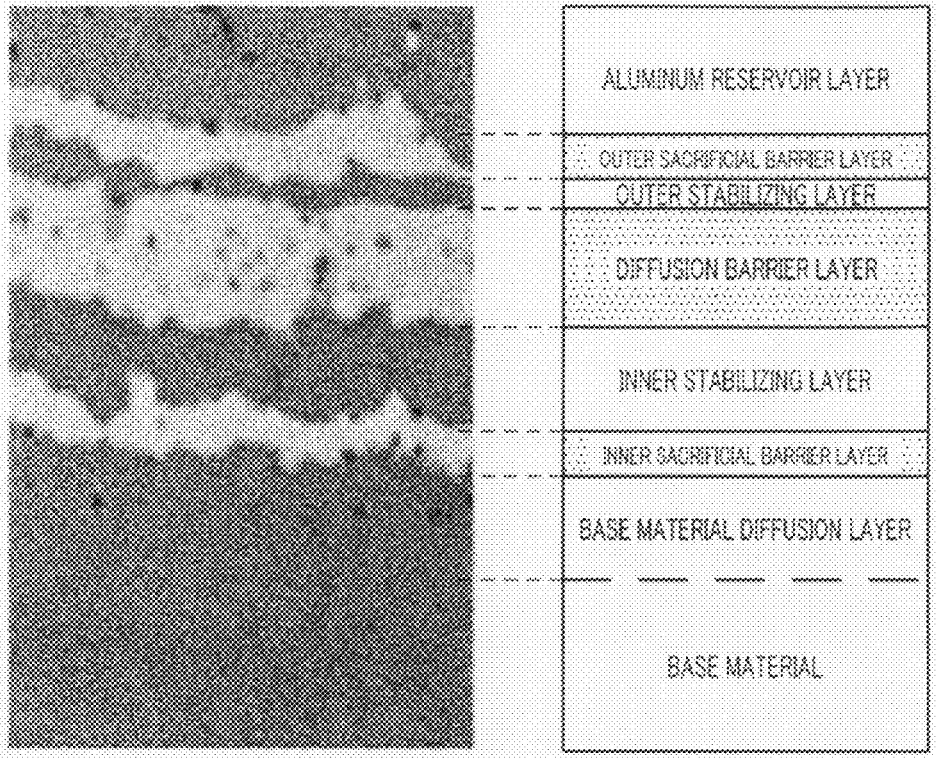
FIG. 13 is a cross-sectional photograph of the test piece of Example 7 after the high temperature oxidation test.

FIG. 12 is a cross-sectional photograph of the test piece of Example 2 after the high temperature oxidation test (at 1150° C. for 100 hours). FIG. 13 is a cross-sectional photograph of the test piece of Example 7 after the high temperature oxidation test (at 1150° C. for 400 hours). Although the outer sacrificial barrier layer and the inner sacrificial barrier layer decreased the thickness and changed to an irregular form, the diffusion barrier layer maintained a comparatively uniform thickness. This shows that the outer sacrificial barrier layer and the inner sacrificial barrier layer can sacrifice themselves to protect the diffusion barrier layer in the multilayer alloy film of the present invention.

Table 14 shows the elemental composition of the surface of the test piece of Example 6 after the high temperature oxidation test (at 1100° C. for 600 hours). Table 14 also shows the result of the test piece on which only the aluminum reservoir layer containing $\beta$-NiAl is formed as Comparative Example.

TABLE 14

Elemental composition of a sample surface of
a Ni-based heat-resistant alloy after a high temperature
oxidation test (atom %)

|  | Al | Ni | Cr | Fe | Mn | Mo |
|---|---|---|---|---|---|---|
| Example 6 | 75 | 20 | 2 | 2 | 0.2 | 0.2 |
| Comparative Example (only aluminum reservoir layer) | 64 | 20 | 8 | 6 | 0.6 | 1.2 |

Fe, Mn and Mo are elements contained in the Ni-based heat-resistant alloy used for the base material. As shown in Table 14, in Comparative Example in which only the aluminum reservoir layer was formed, 6 atom % of Fe, 0.6 atom % of Mn, and 1.2 atom % of Mo were measured. Therefore, it is considered that these atoms (Fe, Mn, and Mo) diffused from the base material into the surface (atmosphere side) of the aluminum reservoir layer as a result of being heated at 1100° C. for about 600 hours. On the other hand, in the test piece of Example 6 on which the multilayer alloy film of the present invention was formed, 2 atom % of Fe, 0.2 atom % of Mn and 0.2 atom % of Mo were measured. These values are decreased to 1/3 to 1/6 of the result of Comparative Example on which only the aluminum reservoir layer was formed. Thus, the multilayer alloy film of the present invention can suppress the diffusion of the atoms contained in the base material into the aluminum reservoir layer even under an ultrahigh temperature environment.

[Creep Test]

In order to investigate mechanical characteristics under a high temperature environment, a creep test was performed on the test piece of Example 5. The creep test is performed by loading a stress of 40 MPa, 27.5 MPa or 22.5 MPa at 970° C. in the atmosphere. The creep test (loading a stress of 22.5 MPa at 970° C. in the atmosphere) was also performed on a Ni-based heat-resistant alloy and solid base material on which only an aluminum reservoir layer was formed as Comparative Examples.

The mean diameter of the crystal grain of the base material of the test piece of Example 5 was 300 μm, and the mean diameter of the crystal grain of the base material on which only the aluminum reservoir layer was formed was 40 μm. A solid base material having a crystal grain mean diameter of 300 μm was used for the test in which a stress of 40 MPa or 27.5 MPa was loaded, and a solid base material having a crystal grain mean diameter of 40 μm was used for the test in which a stress of 22.5 MPa was loaded.

Table 15 shows rupture strain and rupture time obtained from the result of the creep test. Table 15 also shows the results for a solid base material and a test piece on which only an aluminum reservoir layer containing and $\beta$-NiAl is formed as Comparative Examples.

TABLE 15

Results of creep test

| | Stress (MPa) | Rupture time (hour) | Rupture strain (%) | Remarks |
|---|---|---|---|---|
| Example 5 | 40 | 55 | 20 | |
| | 27.5 | 380 | 16 | |
| | 22.5 | — | 3.5 | Stopped in 200 hours |
| Comparative Example (solid base material) | 40 | 40 | 24 | |
| | 27.5 | 215 | 18 | |
| | 22.5 | 190 | 23 | |
| Comparative Example (only aluminum reservoir layer) | 22.5 | 150~200 | 20~22 | |

As shown in Table 15, the rupture time of the base material on which the multilayer alloy film of the present invention was formed was a longer than the rupture time of the solid base material of Comparative Example. That is, in the solid base material, the creep rupture was observed in 215 hours when a stress of 27.5 MPa was loaded. On the other hand, the creep rupture was observed in 380 hours in the test piece of Example 5 on which the multilayer alloy film of the present invention was formed. Thus, the multilayer alloy film of the present invention has excellent mechanical characteristics even under a high temperature environment.

As shown in Table 15, a stress of 22.5 MPa was loaded on the base material on which the multilayer alloy film of the present invention was formed, at 970° C., and the creep test was stopped in 200 hours (rupture strain: 3.5%). When the cross-sectional structure of the test piece after the creep test was observed, the structure and composition of the multilayer alloy film nearly coincide with those before the creep test. Defects such as cracks and exfoliation were not observed in the film. That is, it was found that the multilayer alloy film of the present invention followed the creep deformation of the Ni-based heat-resistant alloy of the base material, and underwent creep deformation. Thus, the multilayer alloy film of the present invention has excellent mechanical characteristics even under a high temperature environment.

2. Examples Using Fourth Generation Ni-Based Single Crystal Superalloy as Base Material

Examples 9 and 10

[Base Material and Film Formation]

In Examples 9 and 10, a fourth generation Ni-based single crystal superalloy was used as a base material. The nominal composition of the used fourth generation Ni-based single crystal superalloy is shown in Table 16. In Example 9, a multilayer alloy film containing a Re—Cr—W—Ni-based alloy layer was formed by a method including no Cr plating treatment. In Example 10, a multilayer alloy film containing a Re—Cr—W—Ni-based alloy layer was formed by a method including Cr plating treatment.

TABLE 16

Composition of a fourth generation Ni-based single crystal superalloy used in Examples 9 and 10 (mass %)

| | Al | Ta | Mo | W | Re | Hf | Cr | Co | Ru | Ni |
|---|---|---|---|---|---|---|---|---|---|---|
| Fourth generation Ni-based single crystal superalloy | 5.8 | 5.6 | 2.9 | 6.2 | 5.2 | 0.1 | 2.8 | 3.9 | 1.9 | B* |

B: Balance

Strip test pieces, which were cut out from each of the base materials, were subjected to surface polishing (wet polishing using an emery paper of #150 to 600) and degreasing washing (ultrasonic washing in acetone). A multilayer alloy film was then formed on the surface of the base material according to the following procedure.

First, films made of a Re—Ni alloy, a Ni—W alloy, Ni and Cr were formed on the surface of the base material by electroplating. Specifically, when a multilayer alloy film using a Re—Cr—W—Ni-based alloy for a diffusion barrier layer, an outer sacrificial barrier layer and an inner sacrificial barrier layer was formed on the surface of a base material by a method including no Cr plating treatment, a film of the metals was formed according to the following procedure (film formation method 5: Example 9).

(Film Formation Method 5)

(1) Ni plating: Film thickness of 2 μm: Formation of diffusion layer
(2) Ni—W alloy plating: Film thickness of 10 μm: Formation of diffusion layer
(3) Re—Ni alloy plating: Film thickness of 3 μm: Inner sacrificial barrier layer
(4) Ni—W alloy plating: Film thickness of 3 μm: Inner sacrificial barrier layer
(5) Ni plating: Film thickness of 2 μm: Inner stabilizing layer
(6) Re—Ni alloy plating: Film thickness of 5 μm: Diffusion barrier layer
(7) Ni—W alloy plating: Film thickness of 3 μm: Diffusion barrier layer
(8) Ni plating: Film thickness of 2 μm: Outer stabilizing layer
(9) Re—Ni alloy plating: Film thickness of 3 μm: Outer sacrificial barrier layer
(10) Ni—W alloy plating: Film thickness of 3 μm: Outer sacrificial barrier layer
(11) Ni plating: Film thickness of 3 μm: A portion of aluminum reservoir layer When the multilayer alloy film using the Re—Cr—W—Ni-based alloy for the diffusion barrier layer, the outer sacrificial barrier layer and the inner sacrificial barrier layer was formed on the surface of the base material by the method including Cr plating treatment, a film of the metals was formed according to the following procedure (film formation method 6: Example 10).

(Film Formation Method 6)

(1) Ni plating: Film thickness of 2 μm: Formation of diffusion layer
(2) Cr plating: Film thickness of 1 μm: Inner sacrificial barrier layer
(3) Re—Ni alloy plating: Film thickness of 1 μm: Inner sacrificial barrier layer
(4) Ni—W alloy plating: Film thickness of 1 μm: Inner sacrificial barrier layer
(5) Ni plating: Film thickness of 2 μm: Inner stabilizing layer
(6) Cr plating: Film thickness of 1 μm: Diffusion barrier layer
(7) Re—Ni alloy plating: Film thickness of 2 μm: Diffusion barrier layer
(8) Ni—W alloy plating: Film thickness of 1 μm: Diffusion barrier layer
(9) Ni plating: Film thickness of 2 μm: Outer stabilizing layer
(10) Cr plating: Film thickness of 1 μm: Outer sacrificial barrier layer
(11) Re—Ni alloy plating: Film thickness of 1 μm: Outer sacrificial barrier layer
(12) Ni—W alloy plating: Film thickness of 1 μm: Outer sacrificial barrier layer
(13) Ni plating: Film thickness of 3 μm: A portion of aluminum reservoir layer In any of the procedures, the Re—Ni alloy has a composition of 10 to 35 atom % of Ni and the balance of Re. The Ni—W alloy has a composition of 15 to 25 atom % of W and the balance of Ni.

Next, the base material having the film formed thereon was subjected to Cr infiltration treatment. Specifically, when the film was formed by the method including no Cr plating treatment (the film formation method 5), the base material having the film formed thereon was buried in mixed powder (alloy powder (Ni+30 atom % Cr+30 atom % Al) 30 g+Al$_2$O$_3$ powder 30 g) in an alumina crucible, and was heated in a vacuum atmosphere at 1300° C. for 1 hour, 2 hours or 4 hours. When the film was formed by the method including Cr plating treatment (the film formation method 6), the base material having the film formed thereon was buried in mixed powder (alloy powder (Ni+20 atom % Cr+40 atom % Al) 30 g+Al$_2$O$_3$ powder 30 g) in an alumina crucible, and was heated in a vacuum atmosphere at 1300° C. for 1 hour.

Next, solution treatment and aging treatment were performed to control a base material structure to form the base material having a dual-phase structure of a γ phase and a γ' phase. Specifically, when the film was formed by the method including no Cr plating treatment (the film formation method 5), the base material subjected to Cr infiltration treatment was heated in a low-pressure argon gas atmosphere at 1340° C. for 4 hours (solution treatment), and was then heated at 1100° C. for 4 hours (aging treatment). When the film was formed by the method including Cr plating treatment (the film formation method 6), the base material subjected to Cr infiltration treatment was heated in a low-pressure argon gas atmosphere at 1340° C. for 1 hour (solution treatment).

Figure 14:
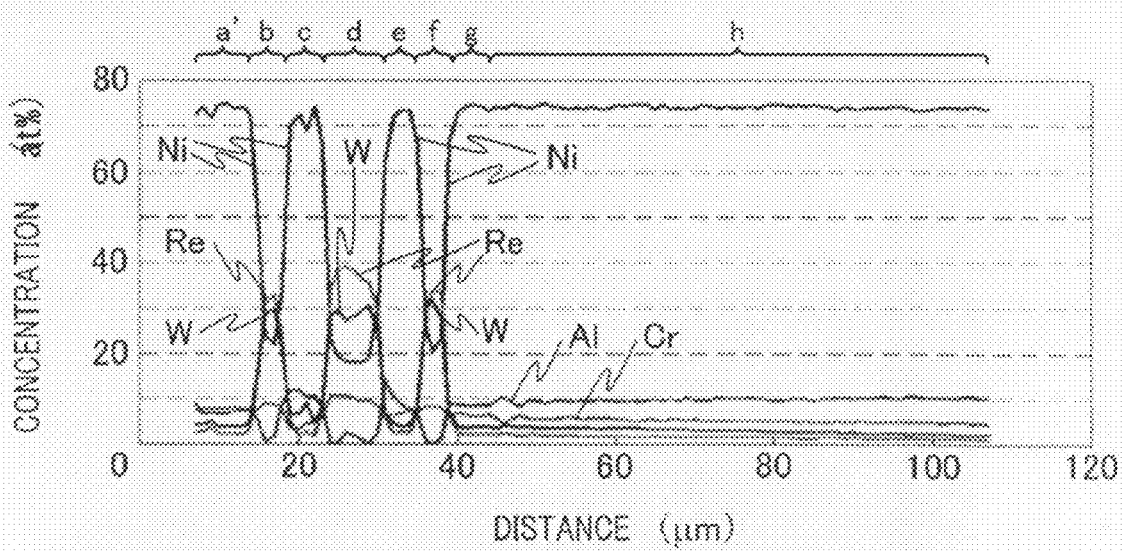
FIG. 14 is a graph showing the concentration distribution of each element of a test piece of Example 9 (Cr infiltration treatment: 1 hour) before a high temperature oxidation test.
Figure 15:
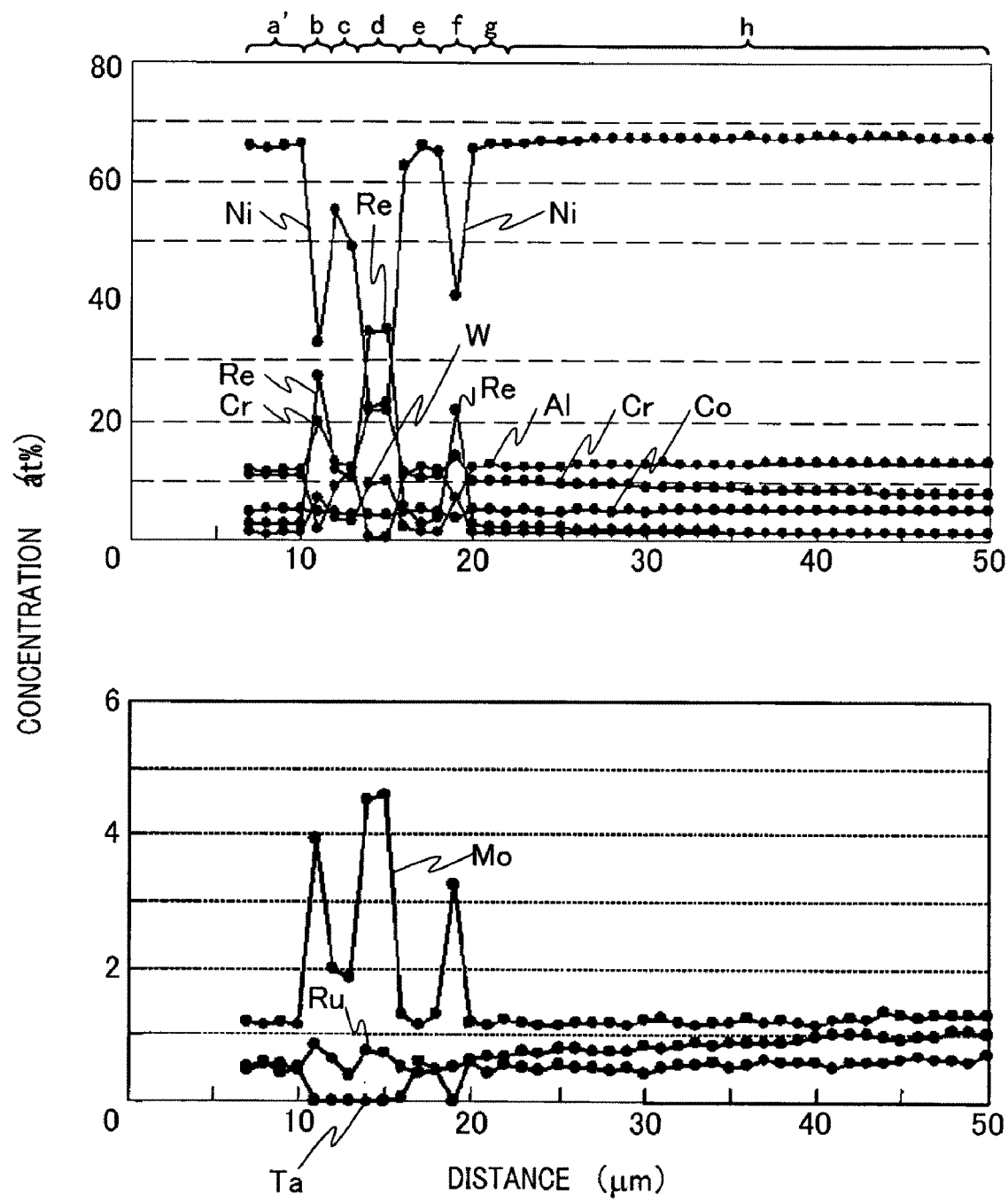
FIG. 15 is a graph showing the concentration distribution of each element of a test piece of Example 10 before a high temperature oxidation test.

Tables 17 and 18 show the analysis results of the elemental compositions of the diffusion barrier layer and the inner stabilizing layer of the test pieces (Examples 9 and 10) obtained by the above-described procedures. FIG. 14 shows a graph showing the concentration distribution of each element of the test piece of Example 9 (Cr infiltration treatment: 1 hour). FIG. 15 shows a graph showing the concentration distribution of each element of the test piece of Example 10. In FIGS. 14 and 15, the reference symbol (a') denotes a layer forming a portion of an aluminum reservoir layer obtained by performing Al infiltration treatment; (b), an outer sacrificial barrier layer; (c), an outer stabilizing layer; (d), a diffusion barrier layer; (e) an inner stabilizing layer; (f), an inner sacrificial barrier layer; (g), a base material diffusion layer; and (h), a base material.

TABLE 17

Example 9: example obtained by forming a multilayer alloy film using a Re—W—Ni—Cr-based alloy for a diffusion barrier layer, an outer sacrificial barrier layer and an inner sacrificial barrier layer on a fourth generation Ni-based single crystal superalloy by a method including no Cr plating treatment (Unit: atom %)

| | Ni | Re | W | Cr | Al |
|---|---|---|---|---|---|
| Diffusion barrier layer | 18 | 40 | 30 | 10 | 0.5 |
| Inner stabilizing layer | 73 | 2.5 | 3.5 | 8 | 10 |

TABLE 18

Example 10: example obtained by forming multilayer alloy film using Re—Cr—Ni—W-based alloy for diffusion barrier layer, outer sacrificial barrier layer and inner sacrificial barrier layer on fourth generation Ni-based single crystal superalloy by method including Cr plating treatment (Unit: atom %)

| | Ni | Re | W | Cr | Al | Co | Mo | Ta | Ru |
|---|---|---|---|---|---|---|---|---|---|
| Diffusion barrier layer | 22 | 36 | 10 | 21 | 0.4 | 4 | 4.8 | 0.1 | 0.8 |
| Inner stabilizing layer | 67 | 3 | 2 | 11 | 12 | 4 | 1.2 | 0.6 | 0.4 |

Based on the analysis results of the elemental compositions, the diffusion barrier layer, the outer sacrificial barrier layer and the inner sacrificial barrier layer of Example 9 are believed to be made of the Re—W—Ni—Cr-based alloy, and the inner stabilizing layer and the outer stabilizing layer are believed to be made of a Ni—Cr—Al-based γ phase. The diffusion barrier layer, the outer sacrificial barrier layer and the inner sacrificial barrier layer of Example 10 are believed to be made of a Re—Cr—Ni-based σ layer, and the inner stabilizing layer and the outer stabilizing layer are believed to be made of a Ni—Cr—Al-based γ phase.

Figure 16:
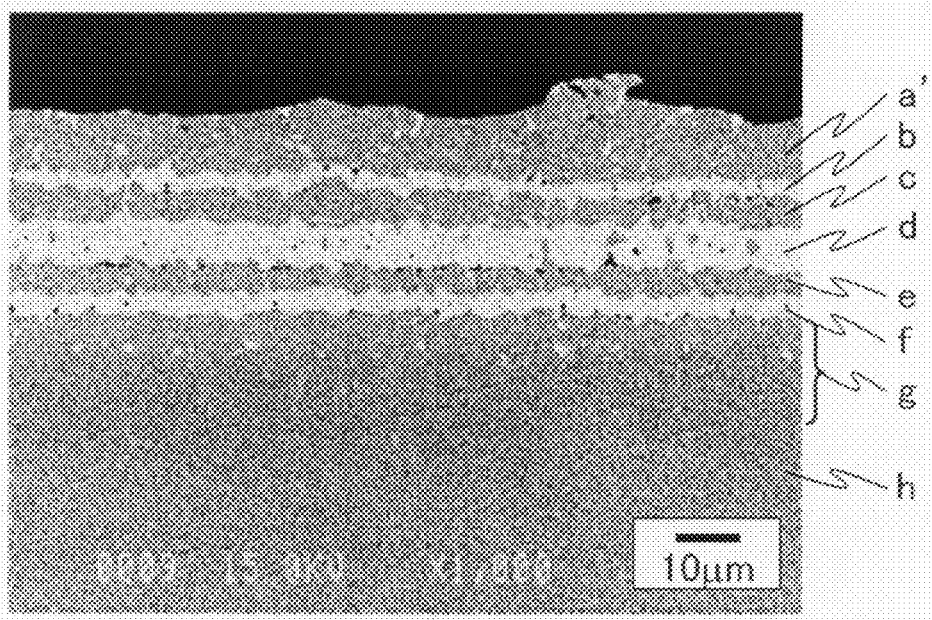
FIG. 16 is a cross-sectional photograph of the test piece of Example 9 (Cr infiltration treatment: 1 hour) before a high temperature oxidation test.
Figure 17:
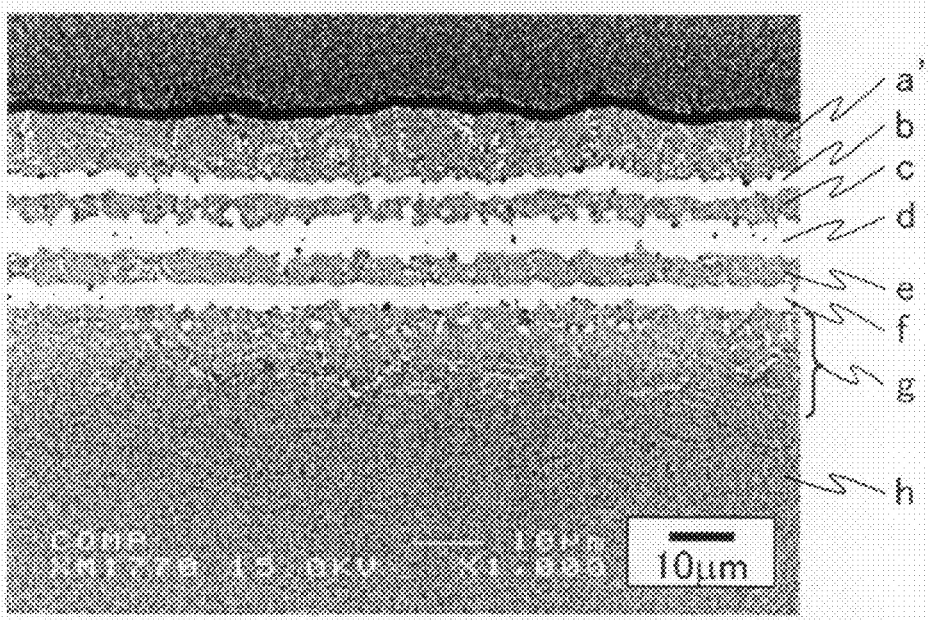
FIG. 17 is a cross-sectional photograph of the test piece of Example 9 (Cr infiltration treatment: 2 hours) before a high temperature oxidation test.
Figure 18:
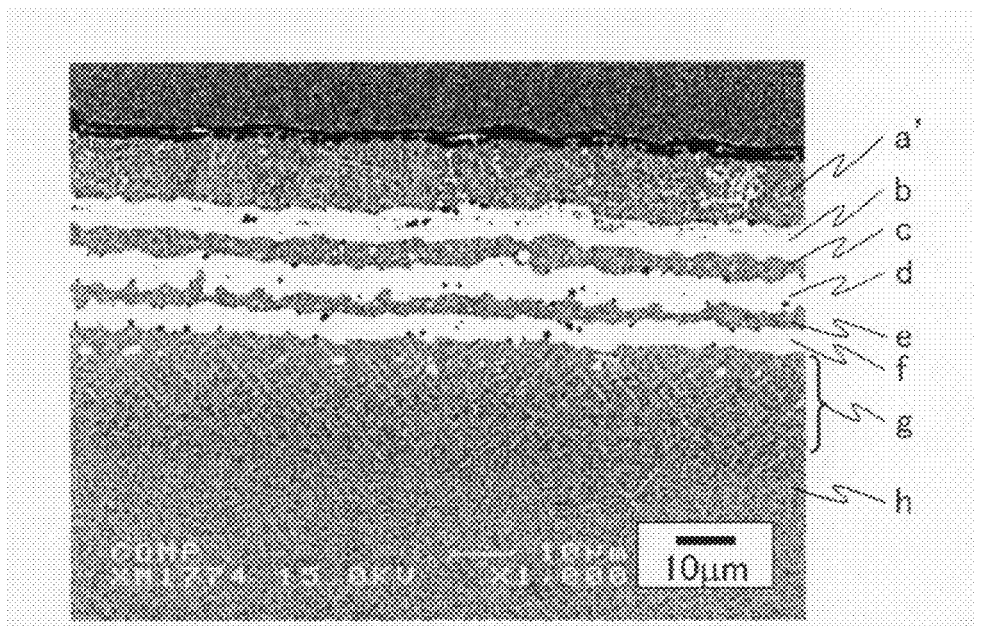
FIG. 18 is a cross-sectional photograph of the test piece of Example 9 (Cr infiltration treatment: 4 hours) before a high temperature oxidation test.

FIGS. 16 to 18 are cross-sectional photographs of the test piece of Example 9. FIG. 16 is a cross-sectional photograph of the test piece subjected to Cr infiltration treatment for 1 hour. FIG. 17 is a cross-sectional photograph of the test piece subjected to Cr infiltration treatment for 2 hours. FIG. 18 is a cross-sectional photograph of the test piece subjected to Cr infiltration treatment for 4 hours. In FIGS. 16 to 18, the reference symbol (a') denotes a layer forming a portion of an aluminum reservoir layer obtained by performing Al infiltration treatment; (b), an outer sacrificial barrier layer; (c), an outer stabilizing layer (d), a diffusion barrier layer; (e), an inner stabilizing layer; (f), an inner sacrificial barrier layer; (g), a base material diffusion layer; and (h), a base material. As shown in FIG. 18, linear deposits containing Cr and Re are observed in the base material diffusion layer, and the deposits are believed to be generated due to an excessive amount of diffusion of Cr. Based on this result, while the treatment time of Cr infiltration treatment may be any of 1 hour, 2 hours and 4 hours, it is considered that the treatment time is more preferably 1 hour or 2 hours.

Figure 19:
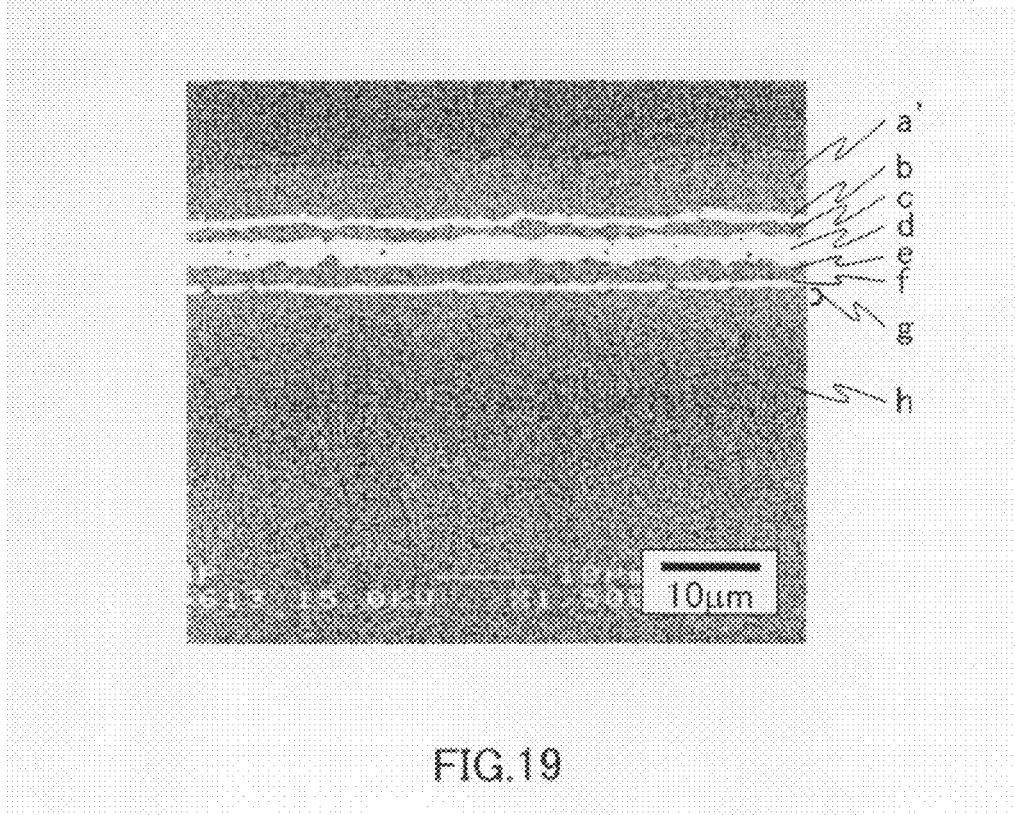
FIG. 19 is a cross-sectional photograph of the test piece of Example 10 before a high temperature oxidation test.

FIG. 19 is a cross-sectional photograph of the test piece of Example 10. In FIG. 19, the reference symbol (a') denotes a layer forming a portion of an aluminum reservoir layer obtained by performing Al infiltration treatment; (b), an outer sacrificial barrier layer; (c), an outer stabilizing layer (d), a diffusion barrier layer; (e), an inner stabilizing layer; (f), an inner sacrificial barrier layer; (g), a base material diffusion layer; and (h), a base material. FIG. 19 shows that the base material diffusion layer of the test piece of Example 10 is thinner than that of the test piece of Example 9. Thus, the Cr concentration of alloy powder used in Cr infiltration treatment can be made to be 20 atom %, and the Al concentration can be made to be 40 atom % by performing Cr plating in the formation process of the multilayer alloy film, and the base material diffusion layer can be thinned.

3. Examples Using a Fourth Generation Ni-Based Single Crystal Superalloy as a Base Material and Having an Aluminum Reservoir Layer Containing Pt Examples 11 and 12

[Base Material and Film Formation]

In Examples 11 and 12, a fourth generation Ni-based single crystal superalloy was used as a base material. Table 19 shows the nominal composition of the used fourth generation Ni-based single crystal superalloy. In Examples 11 and 12, a multilayer alloy film containing a Re—W—Cr—Ni-based alloy layer was formed, and an aluminum reservoir layer containing Pt was formed by a method including no Cr plating treatment.

TABLE 19

Composition of a fourth generation Ni-based single crystal superalloy used in Examples 11 and 12 (atom %)

| | Al | Ta | Mo | W | Re | Hf | Cr | Co | Ru | Ni |
|---|---|---|---|---|---|---|---|---|---|---|
| Fourth generation Ni-based single crystal superalloy | 13.21 | 1.90 | 1.86 | 2.07 | 1.72 | 0.034 | 3.31 | 6.15 | 1.16 | B* |

B: Balance

Strip test pieces, which were cut out from each of the base materials, were subjected to surface polishing (wet polishing using an emery paper of #150 to 600) and degreasing washing (ultrasonic washing in acetone). A multilayer alloy film was then formed on the surface of the base material according to the following procedure.

First, films made of a Re—Ni alloy, a Ni—W alloy and Ni were formed on the surface of the base material by electroplating. Specifically, the test piece of Example 11 was obtained by forming a film of the metals according to a procedure described in a film formation method 7, and the test piece of Example 12 was obtained by forming a film of the metals according to a procedure described in a film formation method 8. In both the procedures, the Re—Ni alloy has a composition of 10 to 35 atom % of Ni and the balance of Re. The Ni—W alloy has a composition of 15 to 25 atom % of W and the balance of Ni.

(Film Formation Method 7)
(1) Ni plating: Film thickness of 2 μm: Formation of diffusion layer
(2) Ni—W alloy plating: Film thickness of 10 μm: Formation of diffusion layer
(3) Re—Ni alloy plating: Film thickness of 3 μm: Inner sacrificial barrier layer
(4) Ni—W alloy plating: Film thickness of 3 μm: Inner sacrificial barrier layer
(5) Ni plating: Film thickness of 2 μm: Inner stabilizing layer
(6) Re—Ni alloy plating: Film thickness of 5 μm: Diffusion barrier layer
(7) Ni—W alloy plating: Film thickness of 3 μm: Diffusion barrier layer
(8) Ni plating: Film thickness of 2 μm: Outer stabilizing layer
(9) Re—Ni alloy plating: Film thickness of 5 μm: Outer sacrificial barrier layer
(10) Ni—W alloy plating: Film thickness of 3 μm: Outer sacrificial barrier layer
(11) Ni plating: Film thickness of 3 μm: A portion of aluminum reservoir layer (Film Formation Method 8)
(1) Ni plating: Film thickness of 2 μm: Formation of diffusion layer
(2) Ni—W alloy plating: Film thickness of 10 μm: Formation of diffusion layer
(3) Re—Ni alloy plating: Film thickness of 3 μm: Inner sacrificial barrier layer
(4) Ni—W alloy plating: Film thickness of 1 μm: Inner sacrificial barrier layer
(5) Ni plating: Film thickness of 2 μm: Inner stabilizing layer
(6) Re—Ni alloy plating: Film thickness of 3 μm: Diffusion barrier layer
(7) Ni—W alloy plating: Film thickness of 1 μm: Diffusion barrier layer
(8) Ni plating: Film thickness of 2 μm: Outer stabilizing layer
(9) Re—Ni alloy plating: Film thickness of 3 μm: Outer sacrificial barrier layer
(10) Ni—W alloy plating: Film thickness of 1 μm: Outer sacrificial barrier layer
(11) Ni plating: Film thickness of 3 μm: A portion of aluminum reservoir layer Next, the base material having the film formed thereon was subjected to Cr infiltration treatment. Specifically, the base material having the film formed thereon was buried in mixed powder (alloy powder (Ni+30 atom % Cr+30 atom % Al) 30 g+$Al_2O_3$ powder 30 g) in an alumina crucible, and was heated in a vacuum atmosphere at 1300° C. for 2 hours.

Next, solution treatment and aging treatment were performed to control a base material structure to form the base material having a dual-phase structure of a γ phase and a γ' phase. Specifically, the base material subjected to Cr infiltration treatment was heated in a low-pressure argon gas atmosphere at 1340° C. for 4 hours (solution treatment), and was then heated at 1100° C. for 4 hours (aging treatment).

Next, a film made of Ni and a film made of Pt were formed on the surface of the base material subjected to Cr infiltration treatment by electroplating. Al infiltration treatment was then performed to form an aluminum reservoir layer. Specifically, a film made of Ni (film thickness: 5.5 μm), a film made of Pt (film thickness: 4 μm), and a film made of Ni (film thickness: 7 μm) were formed on a test piece of Example 11 in this order by electroplating. The base material having the Ni films and the Pt film formed thereon was then buried in mixed powder (Al powder 15 g+$NH_4Cl$ powder 2 g+$Al_2O_3$ powder 83 g) in an alumina crucible, and was heated in an argon gas atmosphere at 800° C. for 20 minutes. A film made of Ni (film thickness: 4.5 μm), a film made of Pt (film thickness: 4 μm) and a film made of Ni (film thickness: 10 μm) were formed on a test piece of Example 12 in this order by electroplating. The base material having the Ni films and the Pt film formed thereon was then buried in mixed powder (Al powder 15 g+$NH_4Cl$ powder 2 g+$Al_2O_3$ powder 83 g) in an alumina crucible, and was heated in an argon gas atmosphere at 800° C. for 20 minutes.

Figure 20:
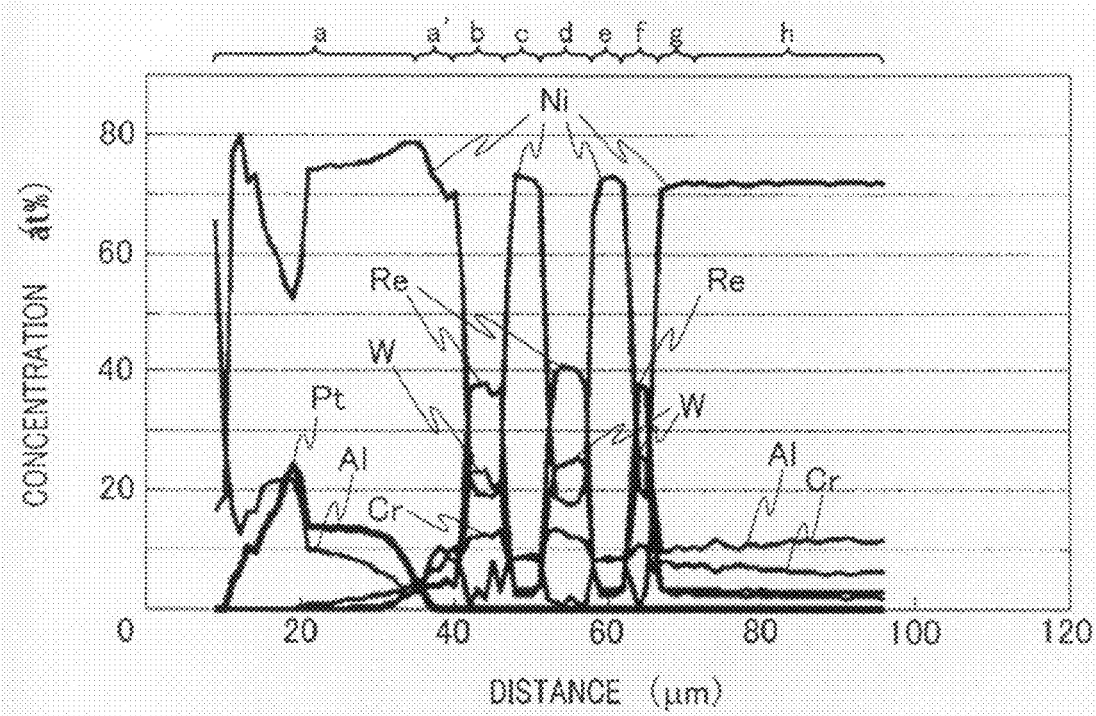
FIG. 20 is a graph showing the concentration distribution of each element of a test piece of Example 11 before a high temperature oxidation test.

Table 20 shows the analysis results of the elemental compositions of the diffusion barrier layer and the inner stabilizing layer of the test piece of Example 11 obtained by the above-described procedure. FIG. 20 shows a graph showing the concentration distribution of each element of the test piece of Example 11. In FIG. 20, the reference symbol (a) denotes a Pt-containing aluminum reservoir layer; (a'), a portion of the aluminum reservoir layer; (b), an outer sacrificial barrier layer; (c), an outer stabilizing layer (d), a diffusion barrier layer; (e), an inner stabilizing layer; (f), an inner sacrificial barrier layer; (g), a base material diffusion layer; and (h), a base material.

TABLE 20

Example 11: example obtained by forming a multilayer alloy film using a Re—W—Ni—Cr-based alloy for a diffusion barrier layer, an outer sacrificial barrier layer and an inner sacrificial barrier layer on a fourth generation Ni-based single crystal superalloy, and further forming an aluminum reservoir layer containing Pt thereon (Unit: atom %)

|  | Ni | Cr | Al | Re | W | Pt |
|---|---|---|---|---|---|---|
| Diffusion barrier layer | 18 | 13 | 0.5 | 41 | 25 | 0 |
| Inner stabilizing layer | 73 | 8 | 8 | 2 | 2.5 | 0 |

Based on the analysis results of the elemental compositions, the diffusion barrier layer, the outer sacrificial barrier layer and the inner sacrificial barrier layer are believed to be made of a Re—W—Ni—Cr-based alloy, and the inner stabilizing layer and the outer stabilizing layer are believed to be made of a Ni—Cr—Al-based γ phase.

Figure 21:
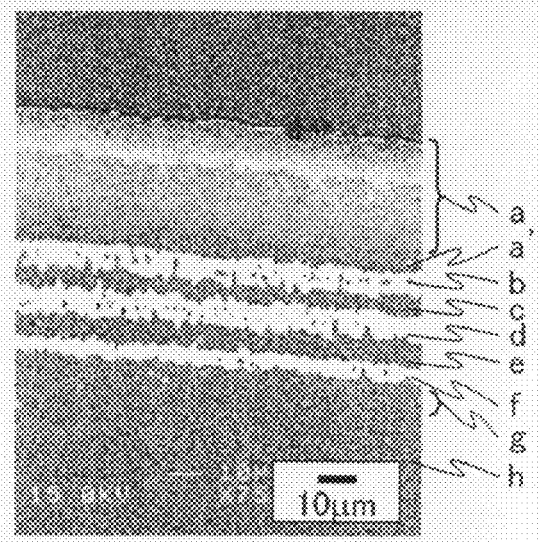
FIG. 21 is a cross-sectional photograph of the test piece of Example 11 before the high temperature oxidation test.

FIG. 21 is a cross-sectional photograph of the test piece of Example 11. In FIG. 21, the reference symbol (a) denotes a Pt-containing aluminum reservoir layer; (a'), a portion of the aluminum reservoir layer; (b), an outer sacrificial barrier layer; (c), an outer stabilizing layer (d), a diffusion barrier layer; (e), an inner stabilizing layer; (f), an inner sacrificial barrier layer; (g), a base material diffusion layer; and (h), a base material. FIGS. 20 and 21 show that the Pt-containing aluminum reservoir layer can be formed on the multilayer alloy film, and that a portion with high Pt concentration can be formed in the Pt-containing aluminum reservoir layer.

[High Temperature Oxidation Test]

A high temperature oxidation test was performed in order to investigate the oxidation resistance of the test piece of Example 12 under an ultrahigh temperature environment. The high temperature oxidation test was performed by repeating the steps of: heating and oxidizing the test piece in the atmosphere in an electric furnace held at 1100° C. for 1 hour; then taking the test piece out of the furnace to rapidly cool the test piece; leaving the test piece for 20 minutes at room temperature; and reheating the test piece in the electric furnace to oxidize the test piece. The weight (oxidization amount) measurement of the test piece was performed using an electronic balance (measurement accuracy: 0.01 mg) at room temperature. The test piece was cut after the high temperature oxidation test (400 cycles) was completed to observe the cross section of the test piece using a scanning electron microscope (SEM), and to analyze the elemental compositions of the base material and film using an electron probe micro analyzer (EPMA).

Figure 22:
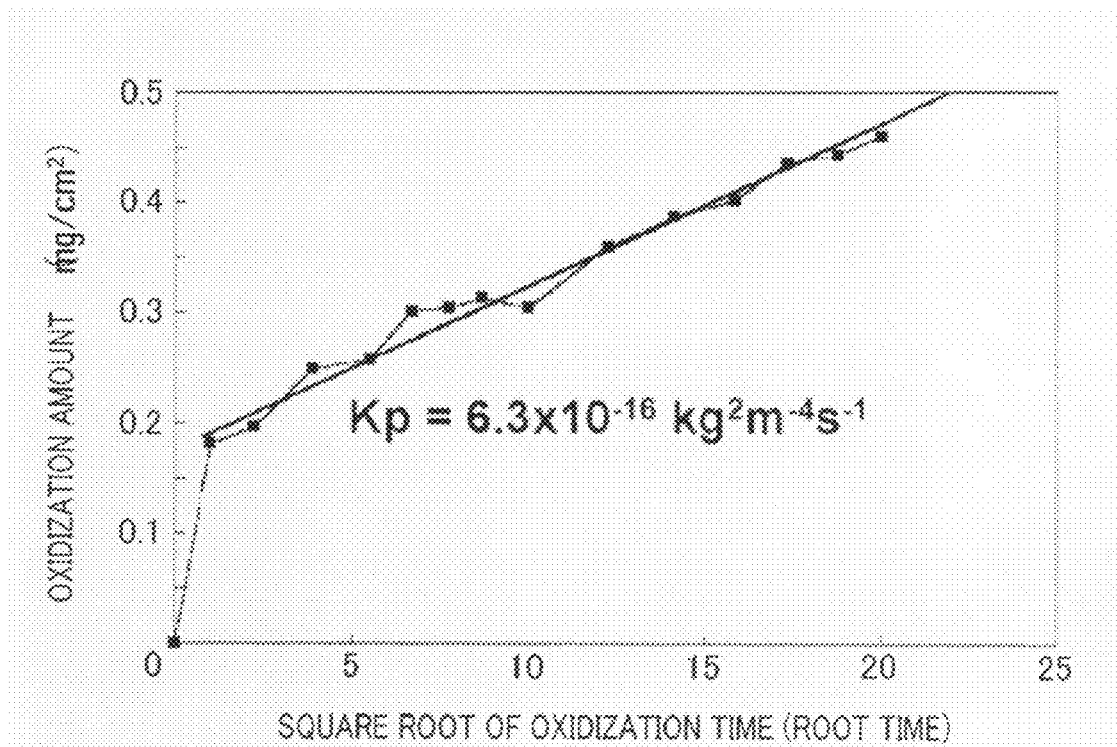
FIG. 22 is a graph showing the result of a high temperature oxidation test of a test piece of Example 12.

FIG. 22 is a graph showing the result of the high temperature oxidation test. The horizontal axis of the graph shows the square root (root time) of oxidization time (total time for which the temperature is kept at 1100° C.). The vertical axis of the graph shows the oxidization amount (mg/cm$^2$). This graph shows that the oxidization amount increases linearly to the square root of the oxidization time except for the initial first cycle. The parabolic measure constant calculated from the inclination of this straight line was $6.3 \times 10^{-16}$ kg$^2$ m$^{-4}$ s$^{-1}$. Thus, the multilayer alloy film of Example 12 can suppress the oxidization amount immediately after being under an ultrahigh temperature environment (an effect caused by the aluminum reservoir layer containing Pt) and further maintain the effect of the Pt-containing aluminum reservoir layer for a longer time (an effect caused by a W-containing diffusion barrier layer suppressing the diffusion of Pt).

Figure 23:
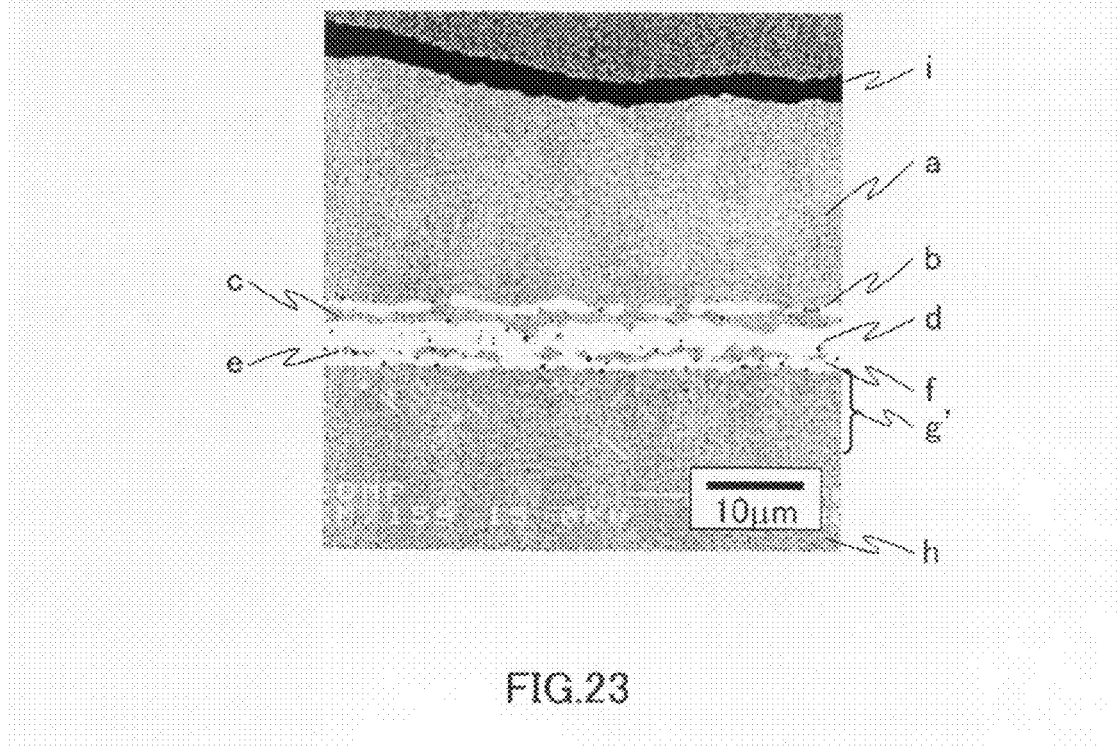
FIG. 23 is a cross-sectional photograph of the test piece of Example 12 after the high temperature oxidation test.

FIG. 23 is a cross-sectional photograph of the test piece of Example 12 after the high temperature oxidation test (400 cycles) was completed. In FIG. 23, the reference symbol (a) denotes a Pt-containing aluminum reservoir layer; (b), an outer sacrificial barrier layer; (c), an outer stabilizing layer (d), a diffusion barrier layer; (e), an inner stabilizing layer; (f), an inner sacrificial barrier layer; (g'), a Pt-containing Ni-aluminide layer; (h), a base material; and (i), an oxide (α-Al$_2$O$_3$). Although the outer sacrificial barrier layer and the inner sacrificial barrier layer decreased the thickness and changed to an irregular form, the diffusion barrier layer maintained a comparatively uniform thickness. This shows that the outer sacrificial barrier layer and the inner sacrificial barrier layer can sacrifice themselves to protect the diffusion barrier layer in the multilayer alloy film of the present invention. The Pt-containing Ni-aluminide layer formed between the base material and the multilayer alloy film was observed. The formed oxide was α-Al$_2$O$_3$, and the exfoliation or the like was not observed.

Figure 24:
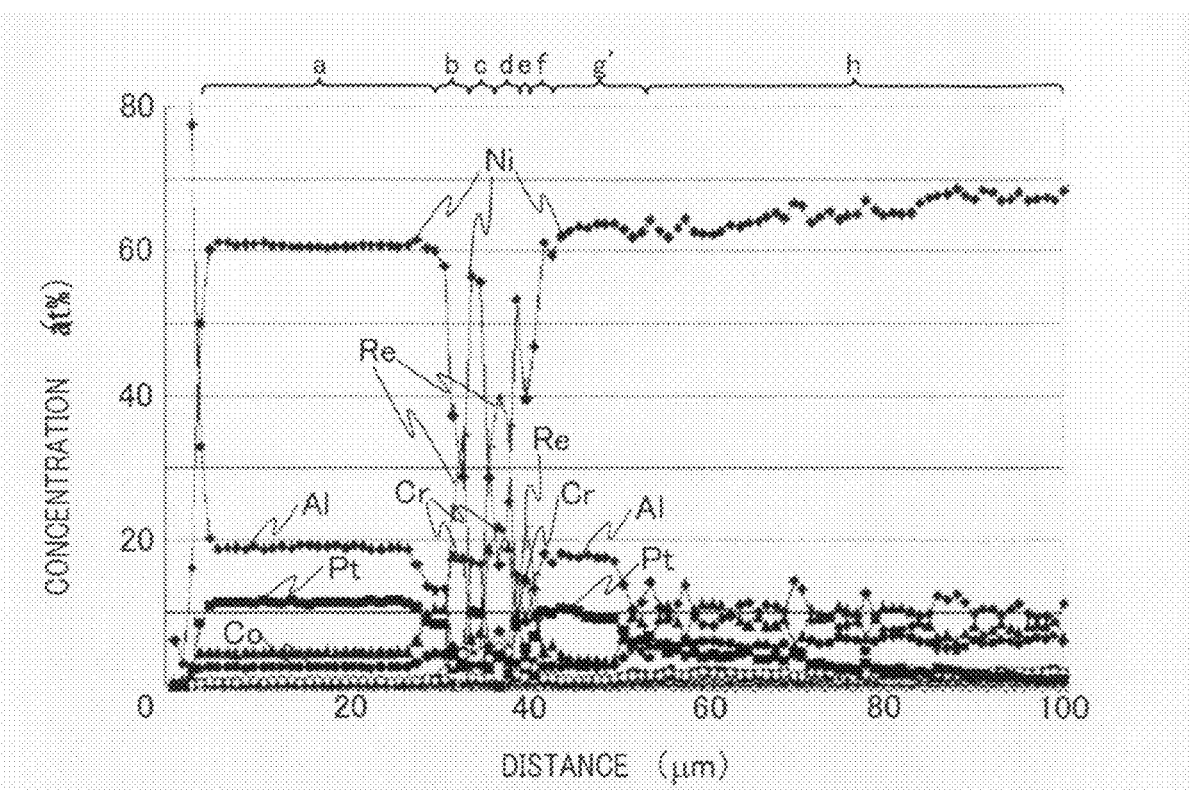
FIG. 24 is a graph showing the concentration distribution of each element of the test piece of Example 12 after the high temperature oxidation test.

Table 21 shows the analysis results of the elemental compositions of the layers of the test piece of Example 12 after the high temperature oxidation test (400 cycles) was completed. FIG. 24 shows a graph showing the concentration distribution of each element of the test piece of Example 12. In FIG. 24, the reference symbol (a) denotes a Pt-containing aluminum reservoir layer; (b), an outer sacrificial barrier layer; (c), an outer stabilizing layer (d), a diffusion barrier layer; (e), an inner stabilizing layer; (f), an inner sacrificial barrier layer; (g'), a Pt-containing Ni-aluminide layer; and (h), a base material.

TABLE 21

Example 12: example obtained by forming a multilayer alloy film using a Re—Cr—Ni—W-based alloy (σ phase) for a diffusion barrier layer, an outer sacrificial barrier layer and an inner sacrificial barrier layer on a fourth generation Ni-based single crystal superalloy, and further forming an aluminum reservoir layer containing Pt thereon (after a high temperature oxidation test was completed) (Unit: atom %)

|  | Ni | Al | Pt | Cr | Co | Re | W | Mo |
|---|---|---|---|---|---|---|---|---|
| Pt-containing aluminum reservoir layer | 61 | 19 | 12 | 4 | 3 | — | — | — |
| Pt-containing aluminum reservoir layer (inner portion) | 63 | 13 | 8 | 10 | 4 | 2 | — | — |
| Outer stabilizing layer | 56 | 18 | 10 | 6 | 4 | 3 | — | — |
| Diffusion barrier layer | 17 | 0~7 | 0~1 | 23 | 3 | 40 | 4 | 3.5 |
| Pt-containing Ni-aluminide layer | 64 | 19 | 11 | 3 | 3 | 1 | — | — |

Based on the analysis results of the elemental compositions, the diffusion barrier layer, outer sacrificial barrier layer and inner sacrificial barrier layer are mainly made of a Re—Cr—Ni—W-based σ phase, and believed to further contain a Ni—Cr—Al-based γ phase. The Pt-containing aluminum reservoir layer is believed to be made of a dual-phase of a Ni—Pt—Al-based γ' phase and γ phase. The newly formed Pt-containing Ni-aluminide layer is believed to be made of a Ni—Pt—Al-based γ' phase.

FIGS. 23 and 24 and Table 21 show that a portion of Pt contained in the aluminum reservoir layer diffuses toward the base material side in the test piece of Example 12 (the diffusion is suppressed in Examples 13 and 14 to be described later), and Pt diffusing into the base material side is concentrated in a region on the barrier layer side (Pt-containing Ni-aluminide layer) in the base material. As a result, the concentrations of Al and Pt of two layers (Pt-containing aluminum reservoir layer, Pt-containing Ni-aluminide layer)

sandwiching the barrier layer are almost the same, and the barrier layer is sandwiched between two layers (Pt-containing aluminum reservoir layer (γ phase+γ' phase), Pt-containing Ni-aluminide layer (γ' phase)) containing a common phase (γ' phase). Thus, the oxidation resistance of the barrier layer is estimated to be more effectively maintained.

4. Examples Using a Fourth Generation Ni-Based Single Crystal Superalloy as a Base Material and Having an Aluminum Reservoir Layer Containing Low-Concentration Pt and a Barrier Layer Containing High-Concentration W Examples 13 and 14

[Base Material and Film Formation]

In Examples 13 and 14, the same fourth generation Ni-based single crystal superalloy as that of Examples 11 and 12 was used as a base material. In Examples 13 and 14, a multilayer alloy film containing a Re—W—Cr—Ni-based alloy layer was formed, and an aluminum reservoir layer containing low-concentration Pt was formed by a method including no Cr plating treatment.

Strip test pieces, which were cut out from each of the base materials, were subjected to surface polishing (wet polishing using an emery paper of #150 to 600) and degreasing washing (ultrasonic washing in acetone). A multilayer alloy film was then formed on the surface of the base material according to the following procedure.

First, films made of a Re—Ni alloy, a Ni—W alloy and Ni were formed on the surface of the base material by electroplating. Specifically, a film of the metals was formed according to a procedure described in a film formation method 9. The Re—Ni alloy has a composition of 10 to 35 atom % of Ni and the balance of Re. The Ni—W alloy has a composition of 15 to 25 atom % of W and the balance of Ni.

(Film Formation Method 9)
(1) Ni plating: Film thickness of 2 μm: Formation of diffusion layer
(2) Ni—W alloy plating: Film thickness of 10 μm: Formation of diffusion layer
(3) Re—Ni alloy plating: Film thickness of 3 μm: Inner sacrificial barrier layer
(4) Ni—W alloy plating: Film thickness of 3 μm: Inner sacrificial barrier layer
(5) Ni plating: Film thickness of 2 μm: Inner stabilizing layer
(6) Re—Ni alloy plating: Film thickness of 5 μm: Diffusion barrier layer
(7) Ni—W alloy plating: Film thickness of 3 μm: Diffusion barrier layer
(8) Ni plating: Film thickness of 2 μm: Outer stabilizing layer
(9) Re—Ni alloy plating: Film thickness of 5 μm: Outer sacrificial barrier layer
(10) Ni—W alloy plating: Film thickness of 3 μm: Outer sacrificial barrier layer
(11) Ni plating: Film thickness of 3 μm: A portion of aluminum reservoir layer Next, the base material having the film formed thereon was subjected to Cr infiltration treatment. Specifically, the base material having the film formed thereon was buried in mixed powder (alloy powder (Ni+30 atom % Cr+30 atom % Al) 30 g+Al$_2$O$_3$ powder 30 g) in an alumina crucible, and was heated in a vacuum atmosphere at 1300° C. for 2 hours.

Next, solution treatment and aging treatment were performed to control a base material structure to form the base material having a dual-phase structure of a γ phase and a γ' phase. Specifically, the base material subjected to Cr infiltration treatment was heated in a low-pressure argon gas atmosphere at 1340° C. for 4 hours (solution treatment), and was then heated at 1100° C. for 4 hours (aging treatment).

Next, a film made of Ni and a film made of Pt were formed on the surface of the base material subjected to Cr infiltration treatment by electroplating, and Al infiltration treatment was then performed to form an aluminum reservoir layer. Specifically, a film made of Ni (film thickness: 4.5 μm), a film made of Pt (film thickness: 2 μm), and a film made of Ni (film thickness: 20 μm) were formed on a test piece of Example 13 in this order by electroplating. The base material having the Ni films and the Pt film formed thereon was then buried in mixed powder (Al powder 15 g+NH$_4$Cl powder 2 g+Al$_2$O$_3$ powder 83 g) in an alumina crucible, and was heated in an argon gas atmosphere at 800° C. for 20 minutes. A film made of Ni (film thickness: 4.5 μm), a film made of Pt (film thickness: 6 μm), and a film made of Ni (film thickness: 20 μm) were formed on a test piece of Example 14 in this order by electroplating. The base material having the Ni films and the Pt film formed thereon was then buried in mixed powder (Al powder 15 g+NH$_4$Cl powder 2 g+Al$_2$O$_3$ powder 83 g) in an alumina crucible, and was heated in an argon gas atmosphere at 800° C. for 20 minutes.

A test piece in which only an aluminum reservoir layer was formed on the surface of the same base material as that of Example 14 was prepared as Comparative Example. Specifically, a film made of Ni (film thickness: 4.5 μm), a film made of Pt (film thickness: 6 μm) and a film made of Ni (film thickness: 20 μm) were formed on the surface of the base material, without any barrier layer formed thereon, in this order by electroplating. Al infiltration treatment was then performed under the same condition described above to produce a test piece of Comparative Example.

[High Temperature Oxidation Test]

A high temperature oxidation test was performed in order to investigate the oxidation resistance of each of the test pieces of Examples 13 and 14 and the test piece of Comparative Example under an ultrahigh temperature environment. The high temperature oxidation test was performed by repeating the steps of: heating and oxidizing the test piece in the atmosphere for 1 hour in an electric furnace held at 1100° C.; then taking the test piece out of the furnace to rapidly cool the test piece; leaving the test piece for 20 minutes at room temperature, and reheating the test piece in the electric furnace to oxidize the test piece. The weight (oxidization amount) measurement of the test piece was performed using an electronic balance (measurement accuracy: 0.01 mg) at room temperature. The test piece was cut after the high temperature oxidation test (100 cycles) was completed to observe the cross section of the test piece using a scanning electron microscope (SEM), and to analyze the elemental compositions of the base material and film using an electron probe micro analyzer (EPMA).

Figure 25:
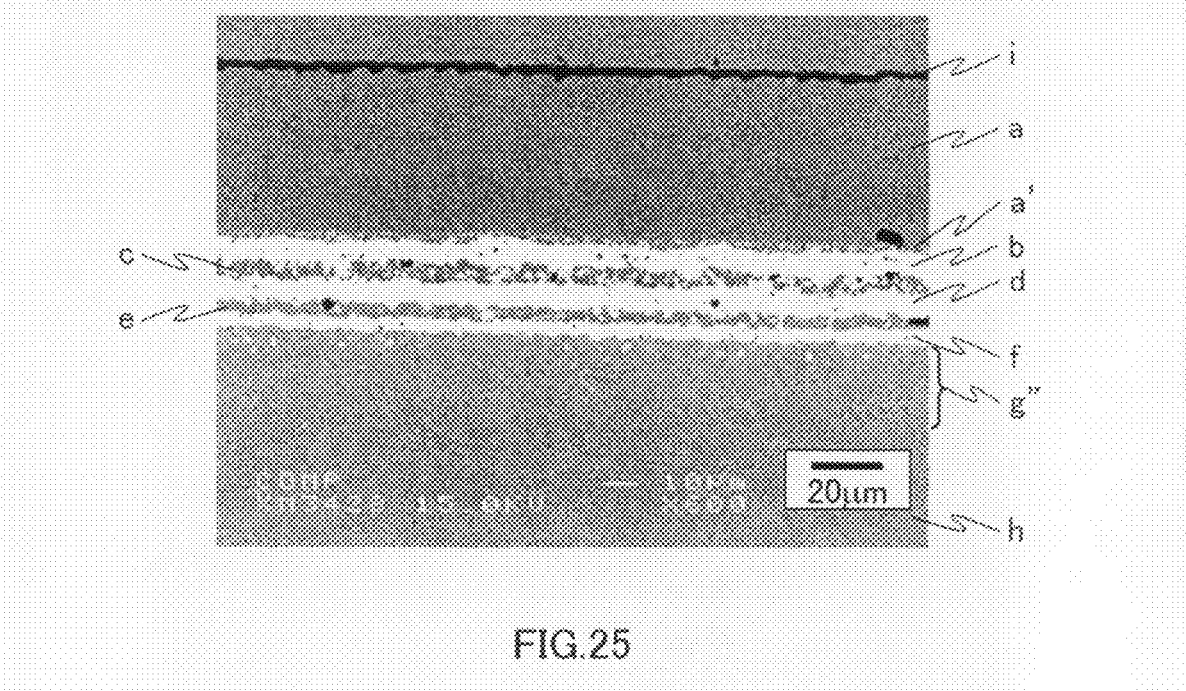
FIG. 25 is a cross-sectional photograph of a test piece of Example 13 after a high temperature oxidation test.

FIG. 25 is a cross-sectional photograph of the test piece of Example 13 after the high temperature oxidation test (100 cycles) was completed. In FIG. 25, the reference symbol (a) denotes an aluminum reservoir layer; (a'), a portion of the aluminum reservoir layer; (b), an outer sacrificial barrier layer; (c), an outer stabilizing layer (d), a diffusion barrier layer; (e), an inner stabilizing layer; (f), an inner sacrificial barrier layer; (g") a layer containing linear deposits; (h), a base material; and (i), an oxide (α-Al$_2$O$_3$). The diffusion barrier layer, the outer sacrificial barrier layer and the inner sacrificial barrier layer maintained a uniform thickness. The formed oxide (thickness: 2 to 3 μm) was α-Al$_2$O$_3$, and the exfoliation or the like was not observed.

Figure 26A:
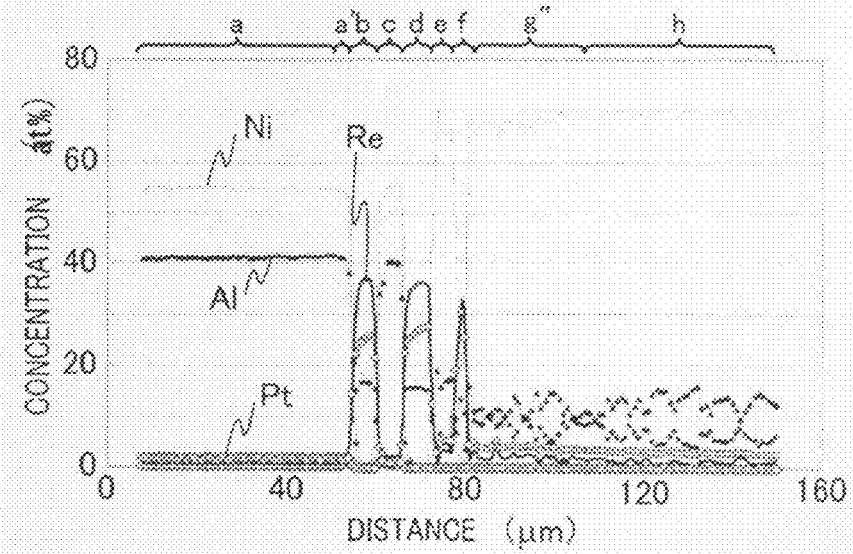
FIG. 26 is a graph showing the concentration distribution of each element of the test piece of Example 13 after the high temperature oxidation test.
Figure 26B:
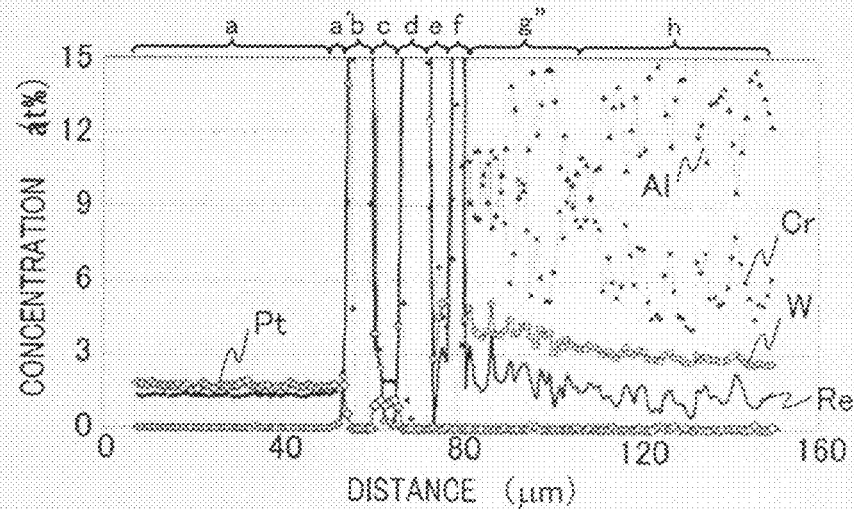
Figure 26C:
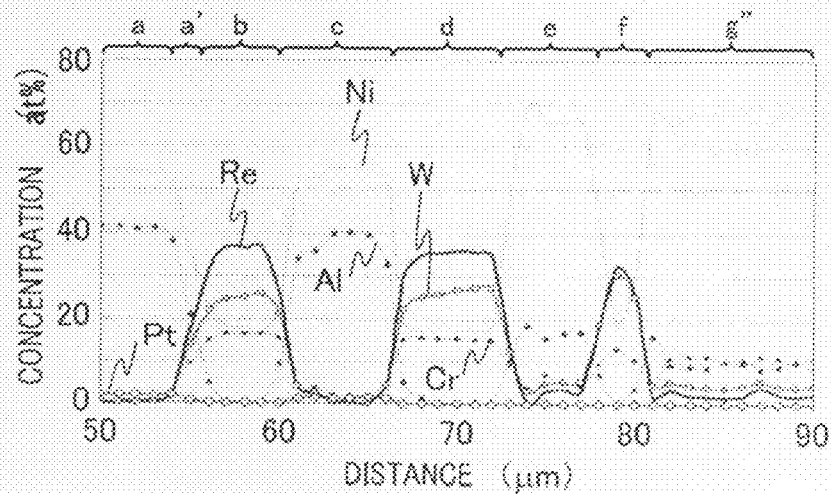

Table 22 shows the analysis results of the elemental compositions of the layers of the test piece of Example 13 after the high temperature oxidation test (100 cycles) was completed. FIG. 26 shows a graph showing the concentration distribution of each element of the test piece of Example 13. FIG. 26B is an enlarged view of a low concentration region of a graph of FIG. 26A. FIG. 26C is an enlarged view of a barrier layer of a graph of FIG. 26A. In FIG. 26, the reference symbol (a) denotes an aluminum reservoir layer; (a'), a portion of the aluminum reservoir layer; (b), an outer sacrificial barrier layer; (c), an outer stabilizing layer (d), a diffusion barrier layer; (e), an inner stabilizing layer; (f), an inner sacrificial barrier layer; (g") a layer containing linear deposits; and (h), a base material.

TABLE 22

Example 13: example obtained by forming a multilayer alloy film using a Re—W—Cr—Ni-based alloy for a diffusion barrier layer, an outer sacrificial barrier layer and an inner sacrificial barrier layer on a fourth generation Ni-based single crystal superalloy, and further forming an aluminum reservoir layer containing Pt thereon (after a high temperature oxidation test was completed) (Unit: atom %)

|  | Ni | Al | Pt | Cr | Re | W |
|---|---|---|---|---|---|---|
| Pt-containing aluminum reservoir layer | 54 | 42 | 1.9 | 1.4 | 0.1 | 0.1 |
| Outer sacrificial barrier layer | 17 | 0.1 | 0.1 | 16 | 37 | 26 |
| Outer stabilizing layer | 56 | 41 | 1 | 2.5 | 0.8 | 1.5 |
| Diffusion barrier layer | 18 | 0.1 | 0.1 | 16 | 36 | 28 |
| Inner stabilizing layer | 66~70 | 16~19 | 0.1 | 6~8 | 2.5 | 2.5 |
| Inner sacrificial barrier layer | 19 | 0.1 | 0.1 | 13 | 33 | 32 |

Based on the analysis results of the elemental compositions, the diffusion barrier layer, the outer sacrificial barrier layer and the inner sacrificial barrier layer are mainly made of a Re—W—Cr—Ni-based alloy. The Pt-containing aluminum reservoir layer is made of a Ni—Al—Pt-based β phase. The outer stabilizing layer has a Ni—Al-based β phase, and a γ' phase contained in the Ni—Al-based β phase. The inner stabilizing layer has a Ni—Al-based γ' phase, and a γ phase contained in the Ni—Al-based γ' phase. Table 22 and FIG. 26 show that Pt, which exists only in the aluminum reservoir layer, hardly exists in the other layers.

Figure 27:
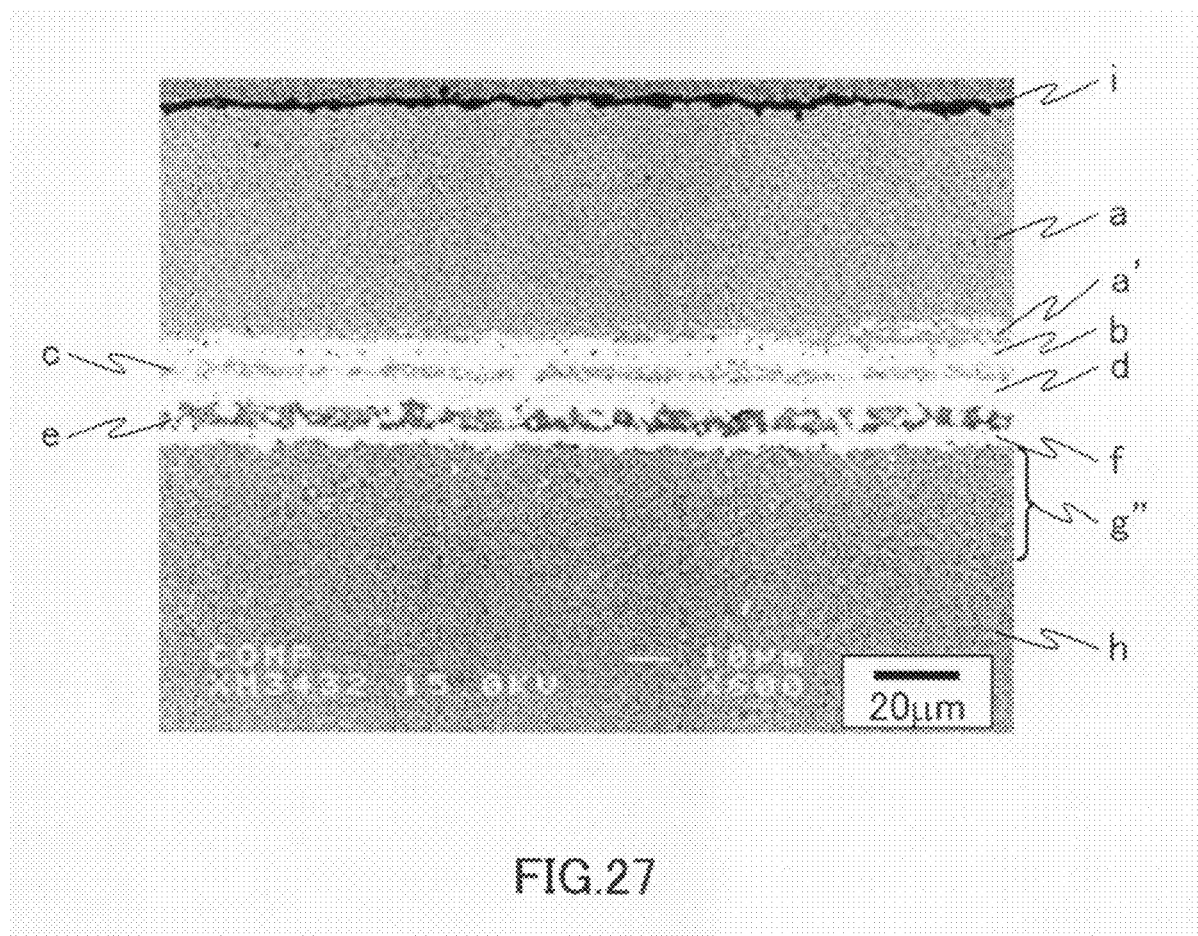
FIG. 27 is a cross-sectional photograph of a test piece of Example 14 after a high temperature oxidation test.

FIG. 27 is a cross-sectional photograph of a test piece of Example 14 after the high temperature oxidation test (100 cycles) was completed. In FIG. 27, the reference symbol (a) denotes an aluminum reservoir layer; (a'), a portion of the aluminum reservoir layer; (b), an outer sacrificial barrier layer; (c), an outer stabilizing layer (d), a diffusion barrier layer; (e), an inner stabilizing layer; (f), an inner sacrificial barrier layer; (g") a layer containing linear deposits; (h), a base material; and (i), an oxide (α-Al$_2$O$_3$). The diffusion barrier layer, the outer sacrificial barrier layer and the inner sacrificial barrier layer maintained a comparatively uniform thickness. The formed oxide (thickness: 2 to 3 μm) was α-Al$_2$O$_3$, and the exfoliation or the like was not observed.

Figure 28A:
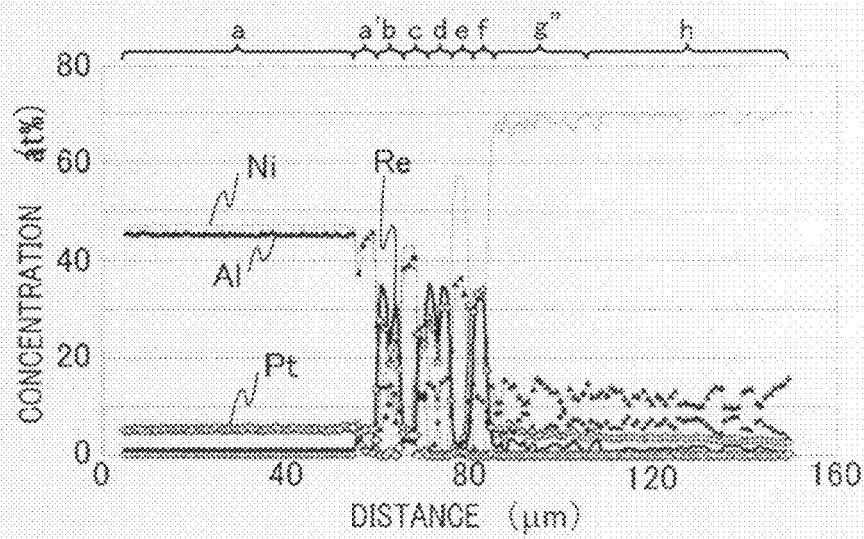
FIG. 28 is a graph showing the concentration distribution of each element of the test piece of Example 14 after the high temperature oxidation test.
Figure 28B:
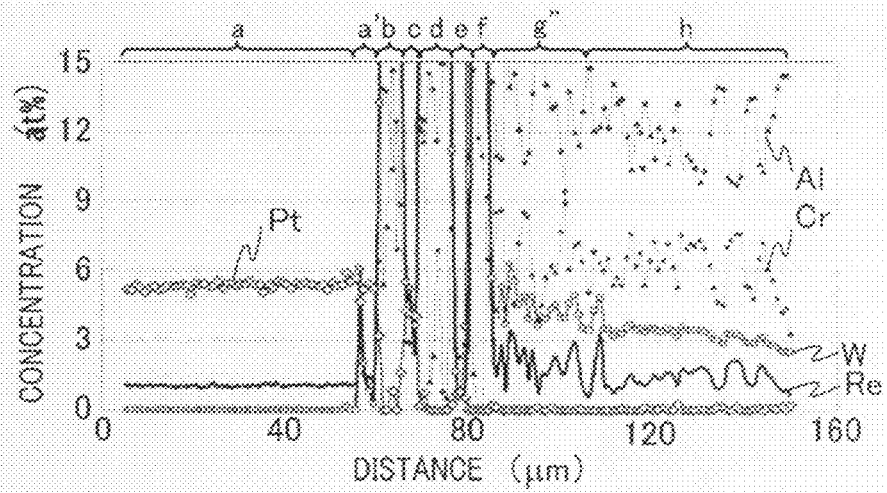
Figure 28C:
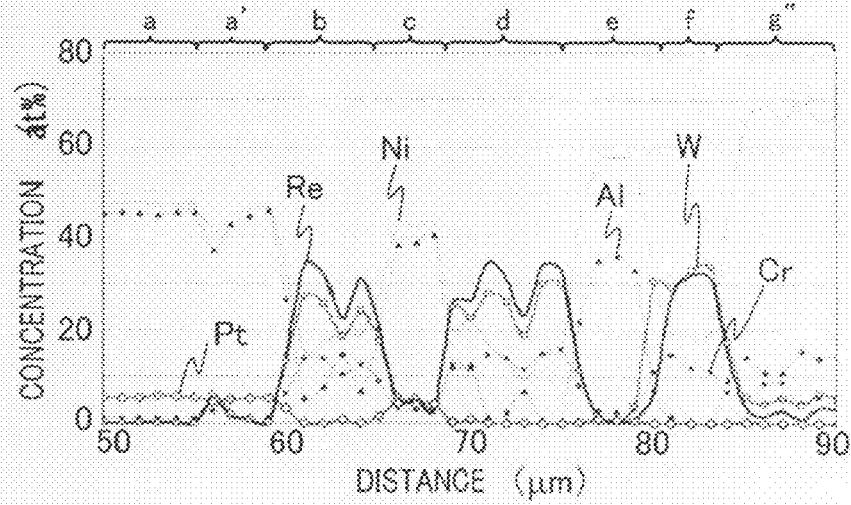

Table 23 shows the analysis results of the elemental compositions of the layers of the test piece of Example 14 after the high temperature oxidation test (100 cycles) was completed. FIG. 28 shows a graph showing the concentration distribution of each element of the test piece of Example 14. FIG. 28B is an enlarged view of a low concentration region of a graph of FIG. 28A. FIG. 28C is an enlarged view of a barrier layer of a graph of FIG. 28A. In FIG. 28, the reference symbol (a) denotes an aluminum reservoir layer; (a'), a portion of the aluminum reservoir layer; (b), an outer sacrificial barrier layer; (c), an outer stabilizing layer; (d), a diffusion barrier layer; (e), an inner stabilizing layer; (f), an inner sacrificial barrier layer; (g") a layer containing linear deposits; and (h), a base material.

TABLE 23

Example 14: example obtained by forming a multilayer alloy film using a Re—W—Cr—Ni-based alloy for a diffusion barrier layer, an outer sacrificial barrier layer and an inner sacrificial barrier layer on a fourth generation Ni-based single crystal superalloy, and further forming an aluminum reservoir layer containing Pt thereon (after a high temperature oxidation test was completed) (Unit: atom %)

|  | Ni | Al | Pt | Cr | Re | W |
|---|---|---|---|---|---|---|
| Pt-containing aluminum reservoir layer | 47 | 44 | 6 | 1.0 | 0.1 | 0.1 |
| Outer sacrificial barrier layer | 15~20 | 5~14 | 0.1~1 | 10~14 | 23~36 | 19~28 |
| Outer stabilizing layer | 42~43 | 38~41 | 3~5 | 2~3 | 3~4 | 3~4 |
| Diffusion barrier layer | 9~23 | 0.9~8 | 0.1~1 | 12~15 | 23~34 | 19~28 |
| Inner stabilizing layer | 57 | 36 | 1 | 2.5 | 0.1 | 0.1 |
| Inner sacrificial barrier layer | 18 | 0.1 | 0.1 | 12~14 | 30~33 | 29~34 |

Based on the analysis results of the elemental compositions, the diffusion barrier layer, the outer sacrificial barrier layer and the inner sacrificial barrier layer are mainly made of a Re—W—Cr—Ni-based alloy. The Pt-containing aluminum reservoir layer is made of a Ni—Al—Pt-based β phase. The outer stabilizing layer has a Ni—Al—Pt-based β phase. The inner stabilizing layer has a Ni—Al-based β phase, and a γ' phase contained in the Ni—Al-based β phase. Table 23 and FIG. 28 show that Pt, which exists only in the aluminum reservoir layer and the outer stabilizing layer, hardly exists in the other layers.

In Example 12 in which the W concentration of the alloy layer containing Re was low (about 4 atom %), the diffusion of Pt toward the base material side was observed after the high temperature oxidization experiment (see Table 21). On the other hand, in the test pieces of Examples 13 and 14 in which the W concentration of the alloy layer containing Re was high (about 20 atom % or more), the diffusion of Pt toward the base material side was hardly observed even after the high temperature oxidization experiment. This suggests that the diffusion of Pt can be more efficiently suppressed by forming the alloy layer (the diffusion barrier layer, the outer sacrificial barrier layer and the inner sacrificial barrier layer) containing Re to include W at high concentration (for example, 20 atom % or more).

Figure 29:
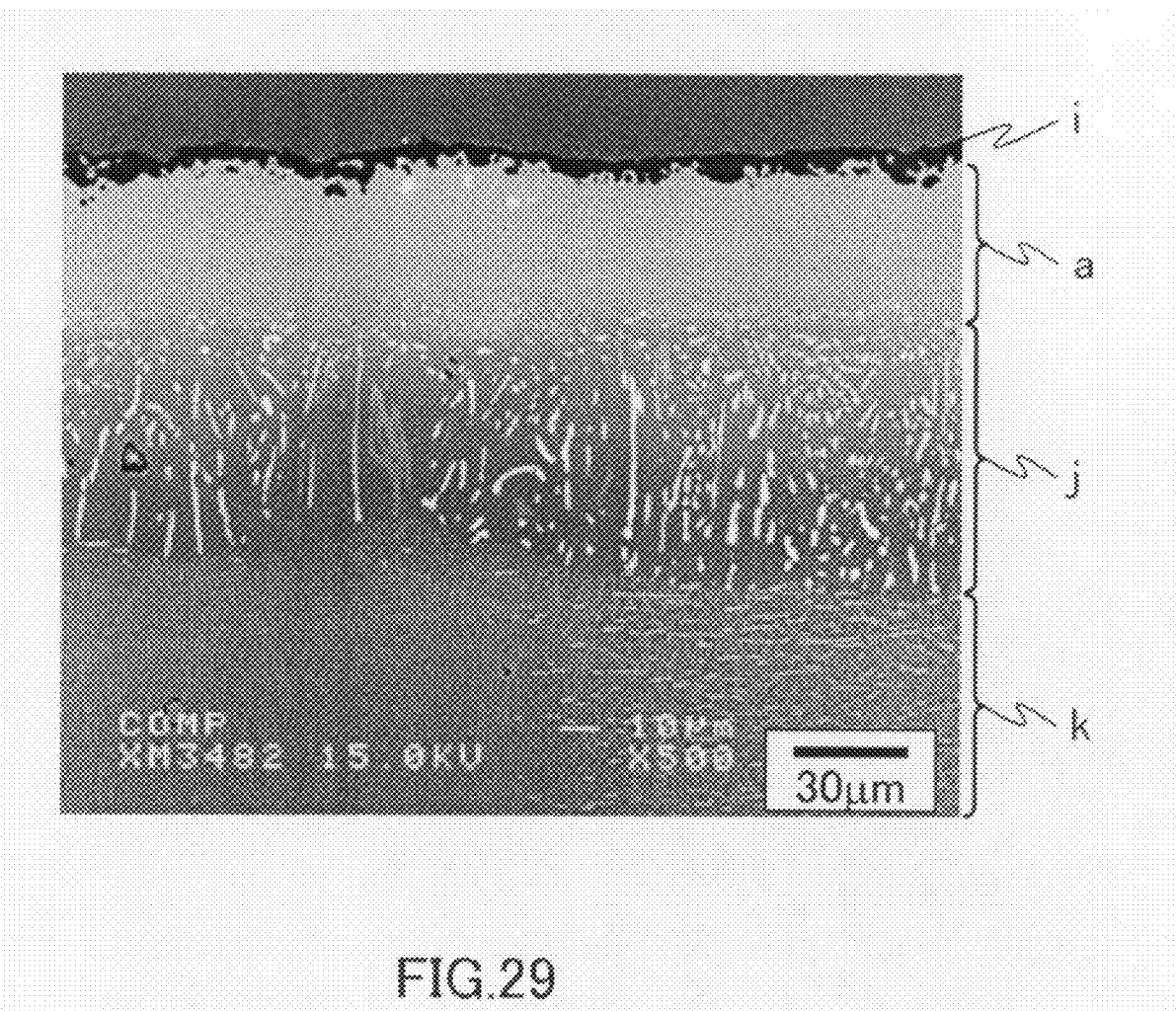
FIG. 29 is a cross-sectional photograph of a test piece of Comparative Example after a high temperature oxidation test.

FIG. 29 is a cross-sectional photograph of the test piece of Comparative Example after the high temperature oxidation test (100 cycles) was completed. In FIG. 29, the reference symbol (a) denotes a Pt-containing aluminum reservoir layer; (i), an oxide; (j) a secondary reaction zone (SRZ); and (k), a layer (base material) containing linear deposits. As shown in FIG. 29, the secondary reaction zone is formed below the Pt-containing aluminum reservoir layer, and the existence of the linear deposits below the secondary reaction zone was observed. The formed oxide is mainly made of Al, and the intrusion of the oxide into the Pt-containing aluminum reservoir layer was observed.

Figure 30A:
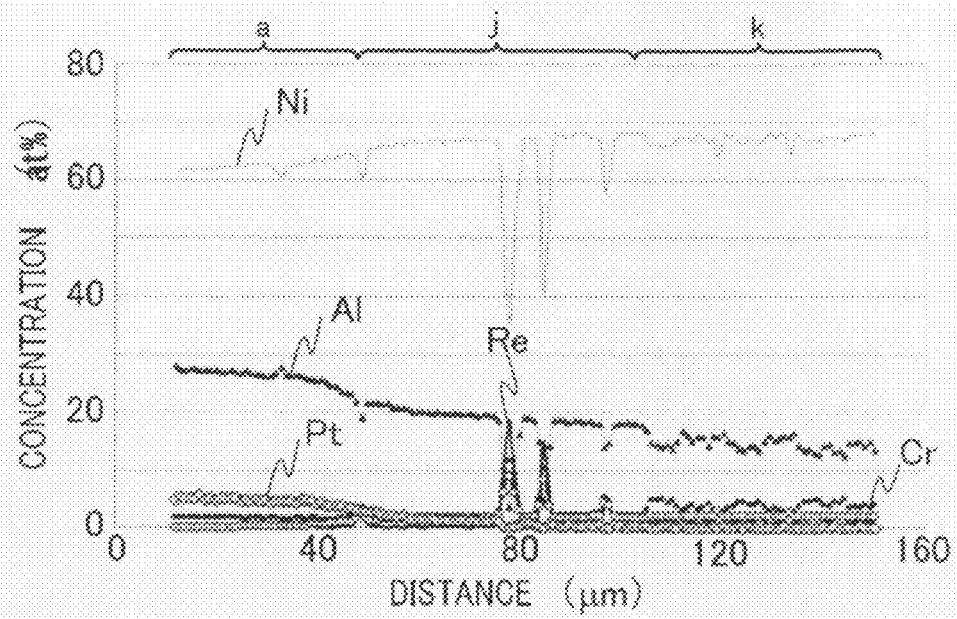
FIG. 30 is a graph showing the concentration distribution of each element of the test piece of Comparative Example after the high temperature oxidation test.
Figure 30B:
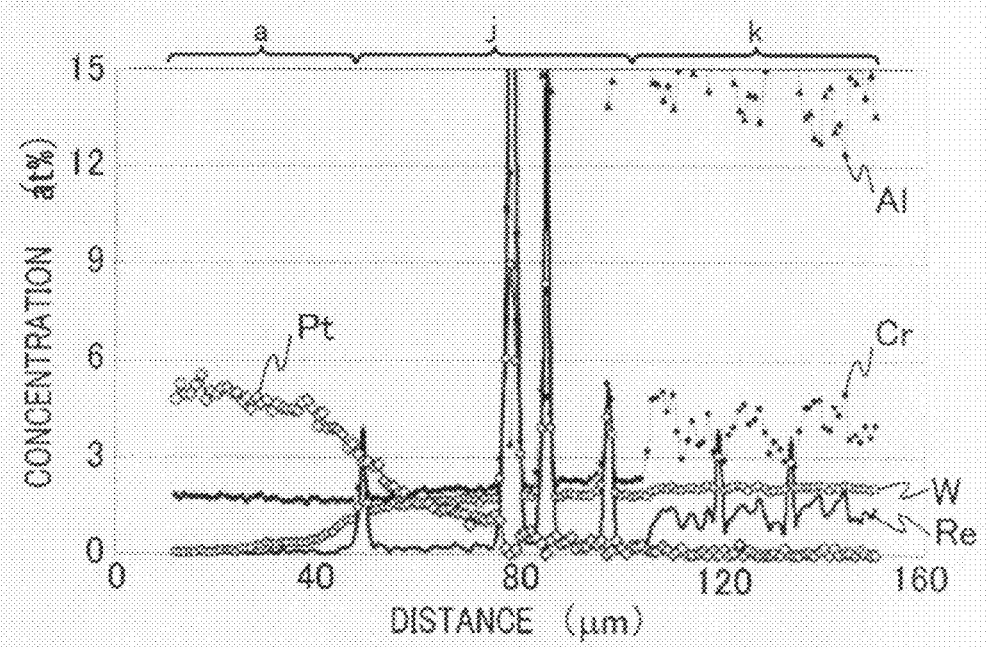

FIG. 30 shows a graph showing the concentration distribution of each element of the test piece of Comparative Example after the high temperature oxidation test (100 cycles) was completed. FIG. 30B is an enlarged view of a low concentration region of a graph of FIG. 30A. In FIG. 30, the reference symbol (a) denotes a Pt-containing aluminum reservoir layer; (j), a secondary reaction zone (SRZ); and (k), a layer (base material) containing linear deposits. Based on the analysis results of the elemental compositions, the Pt-containing aluminum reservoir layer was made of a Ni—Al-based γ' phase containing Pt. Diffusing and infiltrating Al and Pt formed a Ni—Al-based γ' phase in the secondary reaction zone. The deposits containing Re, W and Cr were also observed.

A large number of attempts have been made to form a film containing a Pt-containing aluminum reservoir layer in recent years (see U.S. Pat. Nos. 7,250,225, 7,247,393 and 7,273,662). However, it is known that the secondary reaction zone formed by the diffusion of Pt and Al from the Pt-containing aluminum reservoir layer deteriorates the oxidation resistance of the film and remarkably reduces the mechanical characteristics of the film (A. Sato, Y. Aoki, M. Arai and H. Harada, "Effect of Aluminide Coating on Creep Properties of Ni-Base Single Crystal Superalloys", J. Japan Inst. Metals, Vol. 71, No. 3 (2007), pp. 320-325). The result of the test piece of Example 14 (see FIG. 27) and the result of the test piece of Comparative Example (see FIG. 29) show that the formation of the barrier layer between the Pt-containing aluminum reservoir layer and the base material suppresses the diffusion of Pt and Al contained in the Pt-containing aluminum reservoir layer into the base material side to suppress the formation of the secondary reaction zone.

The results also show that the formation of the barrier layer between the Pt-containing aluminum reservoir layer and the base material remarkably reduces the thickness of the oxide formed on the surface of the film and smoothes the form of the oxide. Thus, the multilayer alloy film of the present invention can suppress the formation of the secondary reaction zone even when the aluminum reservoir layer contains Pt, and can maintain oxidation resistance and mechanical characteristics over a long period of time.

5. Example Using a Ni-based Superalloy as a Base Material

Example 15

[Base Material and Film Formation]

In Example 15, the Ni-based superalloy was used as the base material. Table 24 shows the nominal composition of the used Ni-based superalloy. In Example 15, a multilayer alloy film containing a Re—Cr—Ni—W-based alloy layer was formed by a method including no Cr plating treatment.

TABLE 24

Composition of a Ni-based superalloy used in Example 15 (mass %)

| | Ni | Cr | Co | Mo | W | Ta | Nb | Al | Ti | C | B | Zr |
|---|---|---|---|---|---|---|---|---|---|---|---|---|
| Ni-based superalloy | 61 | 16 | 8.5 | 1.7 | 2.6 | 1.7 | 0.9 | 3.4 | 3.4 | 0.11 | 0.01 | 0.05 |

Strip test pieces, which were cut out from each of the base materials, were subjected to surface polishing (wet polishing using an emery paper of #150 to 600) and degreasing washing (ultrasonic washing in acetone). A multilayer alloy film was then formed on the surface of the base material according to the following procedure.

First, films made of a Re—Ni alloy, a Ni—W alloy and Ni were formed on the surface of the base material by electroplating. Specifically, a film of the metals was formed according to a procedure described in a film formation method 10. The Re—Ni alloy has a composition of 10 to 35 atom % of Ni and the balance of Re. The Ni—W alloy has a composition of 15 to 25 atom % of W and the balance of Ni.

(Film Formation Method 10)

(1) Ni plating: Film thickness of 2 μm: Formation of diffusion layer (2) Re—Ni alloy plating: Film thickness of 3 μm: Inner sacrificial barrier layer (3) Ni—W alloy plating: Film thickness of 3 μm: Inner sacrificial barrier layer (4) Ni plating: Film thickness of 2 μm: Inner stabilizing layer (5) Re—Ni alloy plating: Film thickness of 5 μm: Diffusion barrier layer (6) Ni—W alloy plating: Film thickness of 3 μm: Diffusion barrier layer (7) Ni plating: Film thickness of 2 μm: Outer stabilizing layer (8) Re—Ni alloy plating: Film thickness of 5 μm: Outer sacrificial barrier layer (9) Ni—W alloy plating: Film thickness of 3 μm: Outer sacrificial barrier layer

(10) Ni plating: Film thickness of 3 μm: A portion of aluminum reservoir layer

Next, the base material having the film formed thereon was subjected to Cr infiltration treatment. Specifically, the base material having the film formed thereon was buried in mixed powder (alloy powder (Ni+30 atom % Cr+30 atom % Al) 30 g+$Al_2O_3$ powder 30 g) in an alumina crucible, and was heated in a vacuum atmosphere at 1300° C. for 2 hours.

Next, solution treatment and aging treatment were performed to control a base material structure to form the base material having a dual-phase structure of a γ phase and a γ' phase. Specifically, the base material subjected to Cr infiltration treatment was heated in a low-pressure argon gas atmosphere at 1320° C. for 4 hours (solution treatment), and was then heated at 1120° C. for 4 hours (aging treatment).

Next, an aluminum reservoir layer was formed on the surface of the base material subjected to Cr infiltration treatment. Specifically, a film made of Ni (film thickness: 15 μm) was formed on the surface of the base material subjected to Cr infiltration treatment by electroplating, and the base material having Ni film formed thereon was buried in mixed powder (Al powder 15 g+$NH_4Cl$ power 2 g+$Al_2O_3$ powder 83 g) in an alumina crucible, and was heated in an argon gas atmosphere at 800° C. for 30 minutes (Al infiltration treatment).

Figure 31:
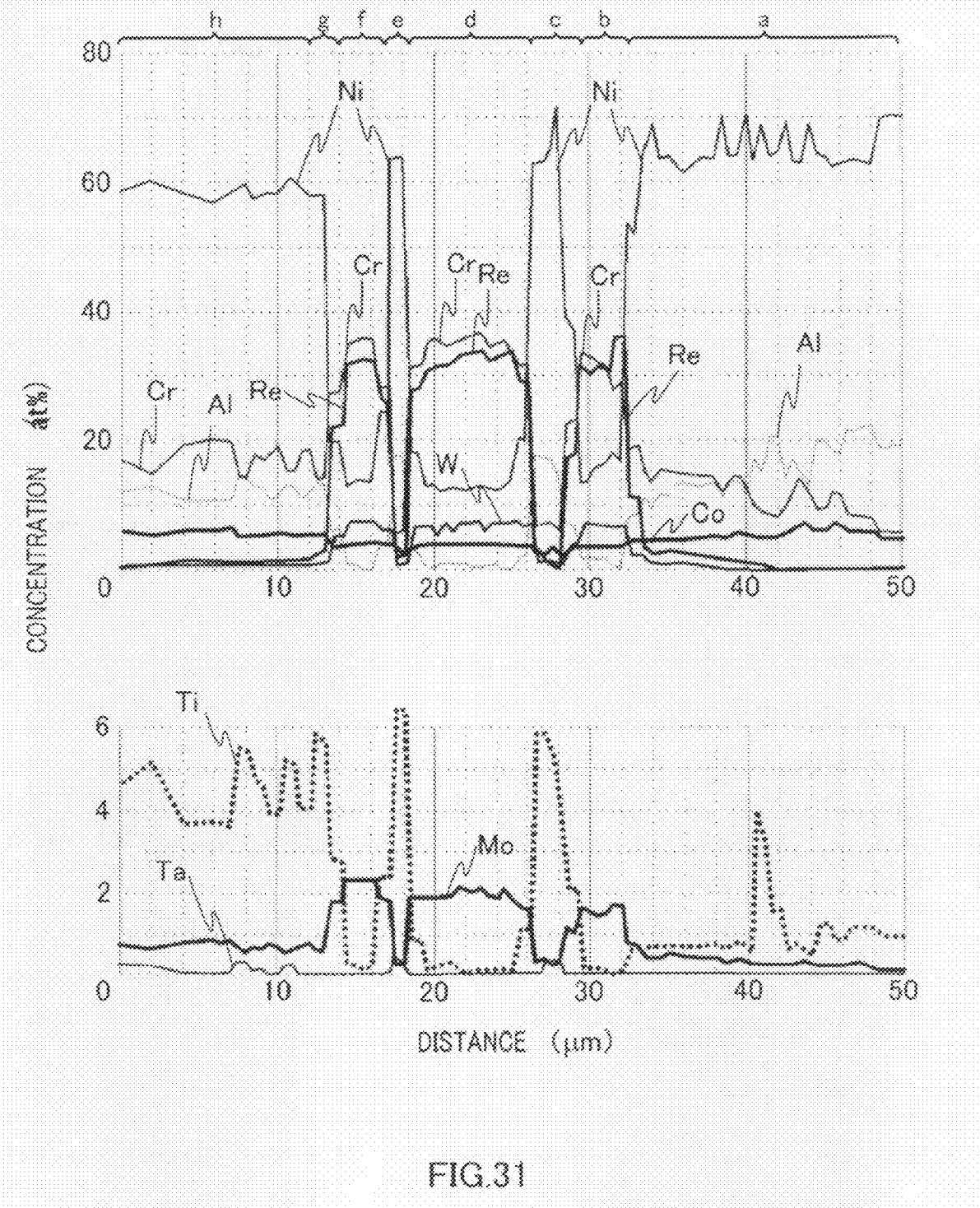
FIG. 31 is a graph showing the concentration distribution of each element of a test piece of Example 15 before a high temperature oxidation test.

Table 25 shows the analysis results of the elemental compositions of the diffusion barrier layer and the inner stabilizing layer of the test piece (Example 15) obtained by the above-described procedure. FIG. 31 shows a graph showing the concentration distribution of each element of the test piece of Example 15. In FIG. 31, the reference symbol (a') denotes an aluminum reservoir layer; (b), an outer sacrificial barrier layer; (c), an outer stabilizing layer (d), a diffusion barrier layer; (e), an inner stabilizing layer; (f), an inner sacrificial barrier layer; (g), a base material diffusion layer; and (h), a base material.

TABLE 25

Example 15: example obtained by forming a multilayer alloy film using a Re—Cr—Ni—W-based alloy (σ phase) for a diffusion barrier layer, an outer sacrificial barrier layer and an inner sacrificial barrier layer on a Ni-based superalloy (Unit: atom %)

|  | Ni | Cr | Al | Re | W | Co | Ti | Mo | Ta |
|---|---|---|---|---|---|---|---|---|---|
| Diffusion barrier layer | 13 | 36 | 0.5 | 33 | 7 | 4 | 0.4 | 2.2 | 0.1 |
| Inner stabilizing layer | 64 | 6 | 18 |  | 1.5 | 1.5 | 3 | 7 | 0.15 | 0.3 |

Based on the analysis results of the elemental compositions, the diffusion barrier layer, the outer sacrificial barrier layer and the inner sacrificial barrier layer are believed to be mainly made of a Re—Cr—Ni—W-based σ phase, the inner stabilizing layer and the outer stabilizing layer are believed to be made of a Ni—Cr—Al-based γ' phase, and the aluminum reservoir layer is believed to be made of a Ni—Cr—Al-based γ phase and γ' phase.

Figure 32:
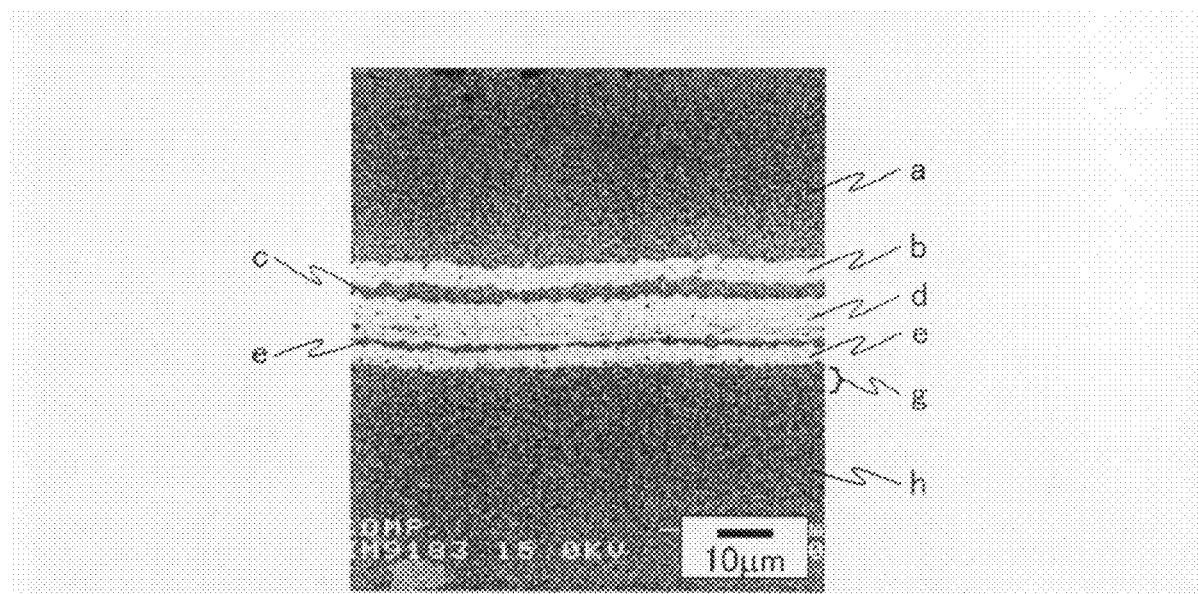
FIG. 32 is a cross-sectional photograph of the test piece of Example 15 before the high temperature oxidation test.

FIG. 32 is a cross-sectional photograph of the test piece of Example 15. In FIG. 32, the reference symbol (a) denotes an aluminum reservoir layer; (b), an outer sacrificial barrier layer; (c), an outer stabilizing layer; (d), a diffusion barrier layer; (e), an inner stabilizing layer; (f), an inner sacrificial barrier layer; (g), a base material diffusion layer; and (h), a base material. Thus, the multilayer alloy film of the present invention can also be formed on the Ni-based superalloy.

6. Example Using a Ni-based Heat-resistant Alloy as a Base Material

Example 16

[Base Material and Film Formation]

In Example 16, a Ni-based heat-resistant alloy was used as a base material. Table 26 shows the nominal composition of the used Ni-based heat-resistant alloy. In Example 16, a multilayer alloy film containing a Re—Cr—Ni—W-based alloy layer was formed by a method including no Cr plating treatment.

TABLE 26

Composition of a Ni-based heat-resistant alloy used in Example 16 (atom %)

|  | Ni | Cr | W | Si | C | Mo | Mn |
|---|---|---|---|---|---|---|---|
| Ni-based heat-resistant alloy | 51.1 | 40.2 | 5.2 | 1.1 | 1.5 | 0.3 | 0.6 |

Strip test pieces, which were cut out from each of the base materials, were subjected to surface polishing (wet polishing using an emery paper of #150) and degreasing washing (ultrasonic washing in acetone). A multilayer alloy film was then formed on the surface of the base material according to the following procedure.

First, films made of a Re—Ni alloy, a Ni—W alloy and Ni were formed on the surface of the base material by electroplating. Specifically, a film of the metals was formed according to a procedure described in a film formation method 11. The Re—Ni alloy has a composition of 10 to 35 atom % of Ni and the balance of Re. The Ni—W alloy has a composition of 15 to 25 atom % of W and the balance of Ni.

(Film Formation Method 11)
(1) Ni plating: Film thickness of 2 μm: Formation of diffusion layer
(2) Re—Ni alloy plating: Film thickness of 3 μm: Inner sacrificial barrier layer
(3) Ni—W alloy plating: Film thickness of 3 μm: Inner sacrificial barrier layer
(4) Ni plating: Film thickness of 3 μm: Inner stabilizing layer
(5) Re—Ni alloy plating: Film thickness of 5 μm: Diffusion barrier layer
(6) Ni—W alloy plating: Film thickness of 5 μm: Diffusion barrier layer
(7) Ni plating: Film thickness of 3 μm: Outer stabilizing layer
(8) Re—Ni alloy plating: Film thickness of 3 μm: Outer sacrificial barrier layer
(9) Ni—W alloy plating: Film thickness of 3 μm: Outer sacrificial barrier layer
(10) Ni plating: Film thickness of 3 μm: A portion of aluminum reservoir layer Next, the base material having the film formed thereon was subjected to Cr infiltration treatment. Specifically, the base material having the film formed thereon was buried in mixed powder (alloy powder (Ni+30 atom % Cr+30 atom % Al) 30 g+Al$_2$O$_3$ powder 30 g) in an alumina crucible, and was heated in a vacuum atmosphere at 1300° C. for 4 hours.

Next, the aluminum reservoir layer was formed on the surface of the base material subjected to Cr infiltration treatment. Specifically, a film made of Ni (film thickness: 20 μm) was formed on the surface of the base material subjected to Cr infiltration treatment by electroplating, and the base material having the Ni film formed thereon was then buried in mixed powder (Al powder 15 g+NH$_4$Cl powder 2 g+Al$_2$O$_3$ powder 83 g) in an alumina crucible, and was heated in an argon gas atmosphere at 800° C. for 30 minutes (Al infiltration treatment).

Finally, the base material subjected to Al infiltration treatment was subjected to homogenization treatment. Specifically, the base material subjected to Al infiltration treatment was heated in the atmosphere at 1000° C. for 4 hours. Thereby, the aluminum reservoir layer becomes a β-NiAl phase containing about 40 atom % of Al.

Two types of test pieces in which only an aluminum reservoir layer were each formed on the surface of the same base material as that of Example 16, as Comparative Example were prepared. One test piece was prepared by performing only Al infiltration treatment without forming a film made of Ni. The other test piece was prepared by forming a film made of Ni (20 μm) on the surface of the base material by electroplating, and by then performing Al infiltration treatment and homogenization treatment.

[High Temperature Oxidation Test]

A high temperature oxidation test (cycle oxidation test) was performed in order to investigate the oxidation resistance of the test piece of Example 16 and two types of test pieces of Comparative Examples under an ultrahigh temperature environment. The cycle oxidation test was performed by repeating the steps of: heating and oxidizing the test piece in the atmosphere at 1100° C. for 1 hour; cooling the test piece in a furnace for 20 minutes to room temperature; performing the weight (oxidization amount) measurement of the test piece using an electronic balance (measurement accuracy: 0.01 mg); and reheating the test piece to oxidize the test piece. The test piece was cut after the high temperature oxidation test (144 cycles or 199 cycles) was completed to observe the cross section thereof by a scanning electron microscope (SEM)

Figure 33:
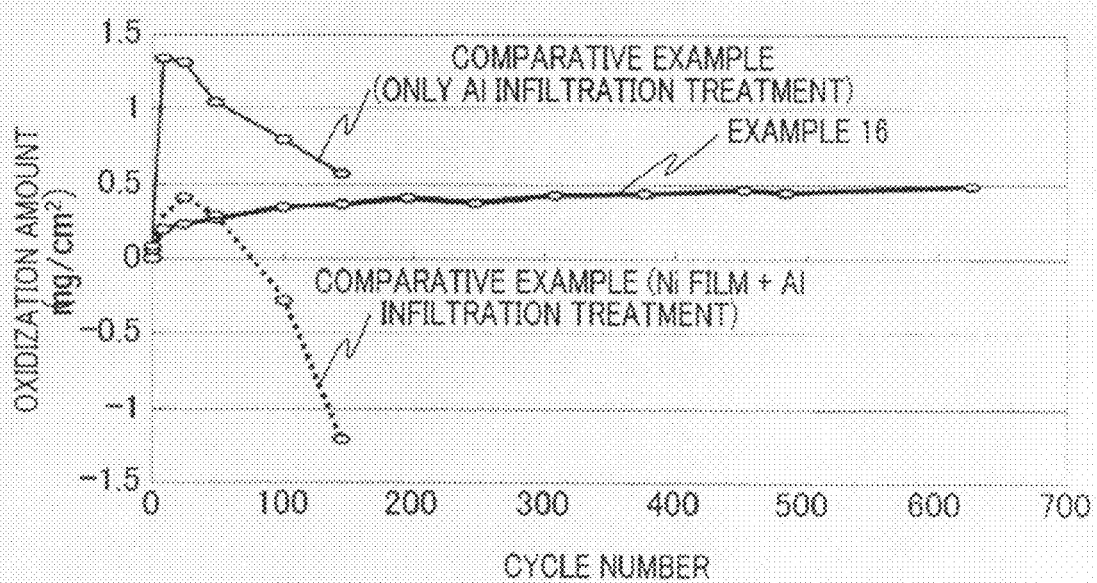
FIG. 33 is a graph showing the result of a high temperature oxidation test of a test piece of Example 16.

FIG. 33 is a graph showing the result of the high temperature oxidation test. The horizontal axis of the graph shows cycle number (one cycle: heating for 1 hour and cooling in a furnace for 20 minutes). The vertical axis of the graph shows the oxidization amount (mg/cm$^2$). In the test piece of Example 16 on which the multilayer alloy film of the present invention was formed, the exfoliation of the oxide was not observed until 625 cycles. The oxidization amount of the test piece of Example 16 was about 0.5 mg/cm². On the other hand, in two types of the test pieces of Comparative Examples, although the increase of the weight was observed in early stages of oxidization due to the oxide, the decrease of the weight caused by the exfoliation of the oxide was subsequently observed. Table 27 shows oxidization time (corresponding to the cycle number) when the oxidization amount of the test piece of Example 16 and two types of test pieces of Comparative Examples is the highest.

TABLE 27

Oxidization time when the oxidization amount of a test piece of Example 16 and test pieces of Comparative Examples is the highest

|  | Oxidization time when the oxidation amount is maximum (hour) | Remarks |
| --- | --- | --- |
| Example 16 | >625 | Continuing to increase |
| Comparative Example (Ni film + Al infiltration treatment) | 25 |  |
| Comparative Example (only Al infiltration treatment) | 9 |  |

7. Example Using Stainless Steel as a Base Material

Example 17

[Base Material and Film Formation]

In Example 17, austenitic stainless steel was used as a base material. Table 28 shows the nominal composition of the used stainless steel. In Example 17, a multilayer alloy film containing a Re—Cr—Ni—W-based alloy layer was formed by a method including no Cr plating treatment.

TABLE 28

Composition of stainless steel used in Example 17 (atom %)

|  | Fe | Cr | Ni | Si | C | Mn |
| --- | --- | --- | --- | --- | --- | --- |
| Austenitic stainless steel | B* | 25 | 20 | 1.1 | 1.5 | 0.6 |

B: Balance

The base material (round bar) was cut in round slices to cut out test pieces, and the test pieces were subjected to surface polishing (wet polishing using an emery paper of #150 to 600) and degreasing washing (ultrasonic washing in acetone). A multilayer alloy film was then formed on the surface of the base material according to the following procedure.

First, films made of a Re—Ni alloy, a Ni—W alloy and Ni were formed on the surface of the base material by electroplating. Specifically, a film of the metals was formed according to a procedure described in a film formation method 12. The Re—Ni alloy has a composition of 10 to 35 atom % of Ni and the balance of Re. The Ni—W alloy has a composition of 15 to 25 atom % of W and the balance of Ni.

(Film Formation Method 12)
(1) Ni plating: Film thickness of 2 μm: Formation of diffusion layer
(2) Re—Ni alloy plating: Film thickness of 3 μm: Inner sacrificial barrier layer
(3) Ni—W alloy plating: Film thickness of 3 μm: Inner sacrificial barrier layer
(4) Ni plating: Film thickness of 3 μm: Inner stabilizing layer
(5) Re—Ni alloy plating: Film thickness of 5 μm: Diffusion barrier layer
(6) Ni—W alloy plating: Film thickness of 5 μm: Diffusion barrier layer
(7) Ni plating: Film thickness of 3 μm: Outer stabilizing layer
(8) Re—Ni alloy plating: Film thickness of 3 μm: Outer sacrificial barrier layer
(9) Ni—W alloy plating: Film thickness of 3 μm: Outer sacrificial barrier layer
(10) Ni plating: Film thickness of 3 μm: A portion of aluminum reservoir layer Next, the base material having the film formed thereon was subjected to Cr infiltration treatment. Specifically, the base material having the film formed thereon was buried in mixed powder (alloy powder (Ni+30 atom % Cr+30 atom % Al) 30 g+Al₂O₃ powder 30 g) in an alumina crucible, and was heated in a vacuum atmosphere at 1300° C. for 4 hours.

Next, an aluminum reservoir layer was formed on the surface of the base material subjected to Cr infiltration treatment. Specifically, a film made of Ni (20 μm) was formed on the surface of the base material subjected to Cr infiltration treatment by electroplating. The base material having the Ni film formed thereon was then buried in mixed powder (Al powder 15 g+NH₄Cl powder 2 g+Al₂O₃ powder 83 g) in an alumina crucible, and was heated in an argon gas atmosphere at 800° C. for 30 minutes (Al infiltration treatment).

Finally, the base material subjected to Al infiltration treatment was subjected to homogenization treatment. Specifically, the base material subjected to Al infiltration treatment was heated in the atmosphere at 1000° C. for 4 hours. Thereby, the aluminum reservoir layer becomes a β-NiAl phase containing about 40 atom % of Al.

As Comparative Examples, there were prepared two types of test pieces in which only an aluminum reservoir layer was formed on the surface of the same base material as that of Example 17, and a test piece in which only one diffusion barrier layer was formed on the surface of the same base material as that of Example 17. One of the test pieces in which only the aluminum reservoir layer was formed was prepared by performing only Al infiltration treatment without forming a film made of Ni. The other test piece was prepared by forming a film (20 μm) made of Ni on the surface of the base material by electroplating, and by then performing Al infiltration treatment and homogenization treatment. The test piece in which only one diffusion barrier layer was formed was prepared by forming a film made of Ni (film thickness: 3 μm: a base material diffusion layer), a film made of a Re—Ni alloy (film thickness: 5 μm: a diffusion barrier layer), a film made of a Ni—W alloy (film thickness: 5 μm: a diffusion barrier layer), and a film made of Ni (film thickness: 3 μm: a portion of an aluminum reservoir layer) in this order on the surface of the base material by electroplating, and then performing Cr infiltration treatment.

[High Temperature Oxidation Test]

A high temperature oxidation test (an isothermal oxidation test and a cycle oxidation test) of the test piece of Example 17 and three types of test pieces of Comparative Examples was performed.

The isothermal oxidation test was performed by heating and oxidizing the test pieces in the atmosphere at 1100° C. for 200 hours (Comparative Example: one diffusion barrier) or for 300 hours (Example 17) and measuring the weight (oxidization amount) of the test pieces using an electronic balance (measurement accuracy: 0.01 mg). As a result, even when the test piece of Example 17 was oxidized for 300 hours, the oxidization amount thereof was 0.35 mg/cm². On the other hand, when the test piece of Comparative Example in which only one diffusion barrier layer was formed was oxidized for only 200 hours, the oxidization amount thereof was 0.6 mg/cm². The exfoliation of the oxide was not observed in either of the test pieces.

The cycle oxidation test was performed by repeating the steps of: heating and oxidizing the test piece in the atmosphere at 1100° C. for 1 hour; cooling the test piece in a furnace for 20 minutes to room temperature; performing the weight (oxidization amount) measurement of the test piece using an electronic balance (measurement accuracy: 0.01 mg); and reheating the test piece to oxidize the test piece. The test piece was cut after the high temperature oxidation test was completed to observe the cross section thereof by a scanning electron microscope (SEM).

Figure 34:
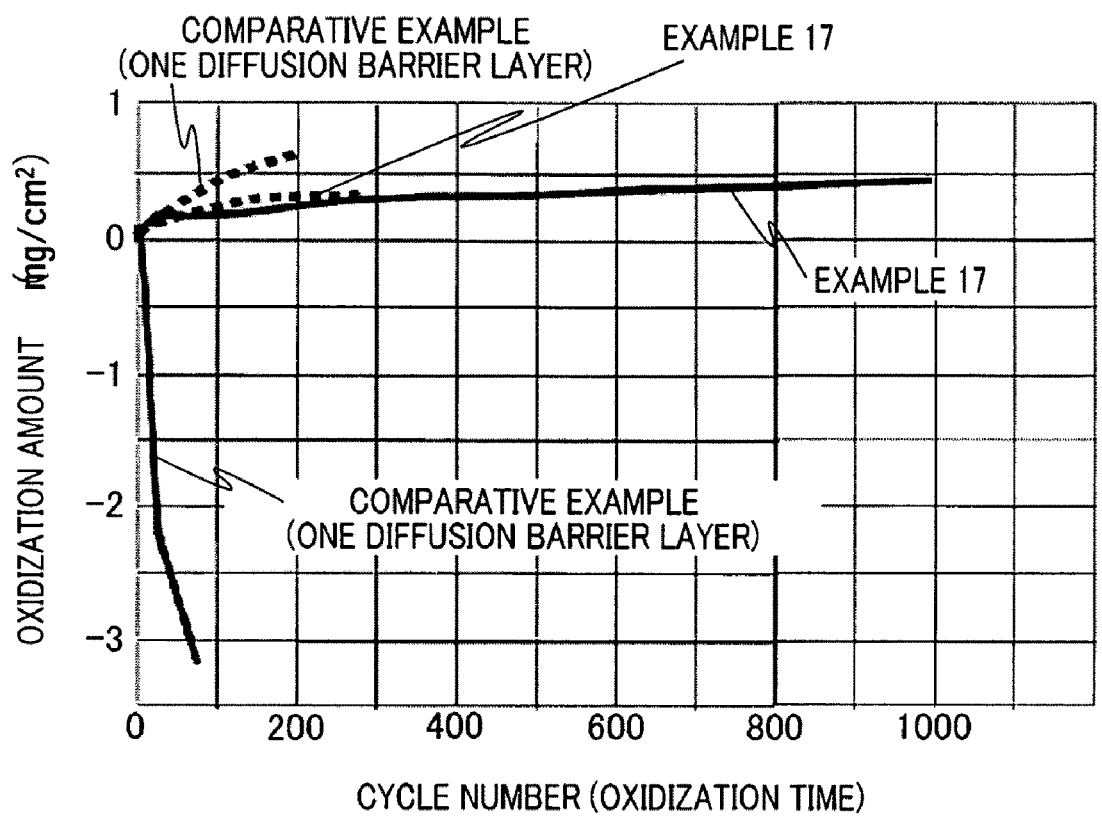
FIG. 34 is a graph showing the result of a high temperature oxidation test of a test piece of Example 17.

FIG. 34 is a graph showing the result of the cycle oxidation test (solid line). The horizontal axis of the graph shows cycle number (one cycle: heating for 1 hour and cooling in a furnace for 20 minutes). The vertical axis of the graph shows the oxidization amount (mg/cm²). In the test piece of Example 17 on which the multilayer alloy film of the present invention was formed, the exfoliation of the oxide was not observed until 1000 cycles. The oxidization amount of the test piece of Example 17 was about 0.5 mg/cm² even when the test piece was oxidized for 1000 hours (1000 cycles). On the other hand, in the test piece of Comparative Example in which only one diffusion barrier layer was formed, although the increase of the weight was observed in early stages of oxidization due to the oxide, the decrease of the weight caused by the exfoliation of the oxide was subsequently observed. The dotted line shows the result of the isothermal oxidation test.

Figure 35A:
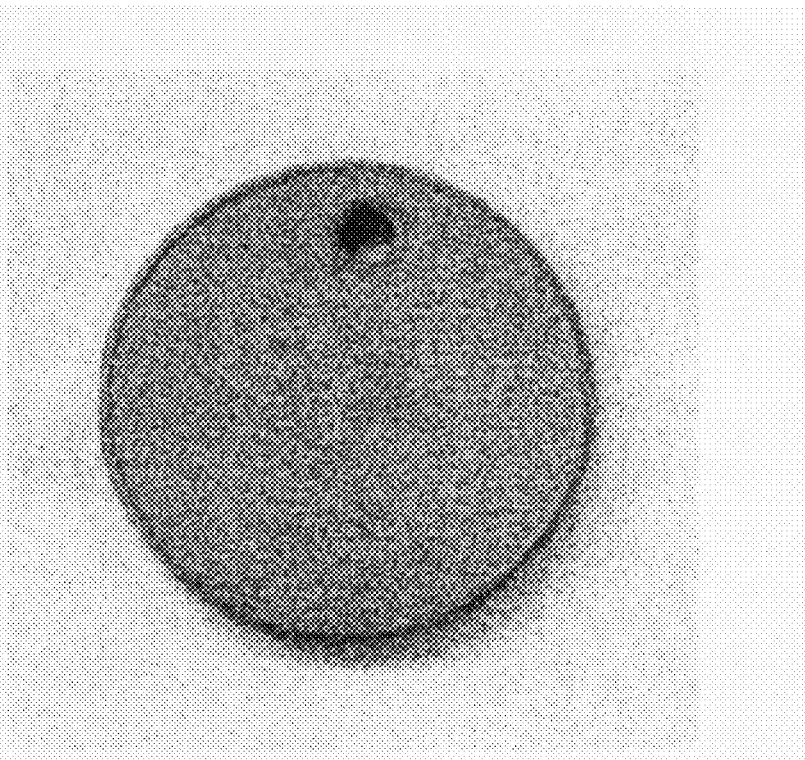
FIG. 35 is a photograph showing the result of the high temperature oxidation test of the test piece of Example 17.
Figure 35B:
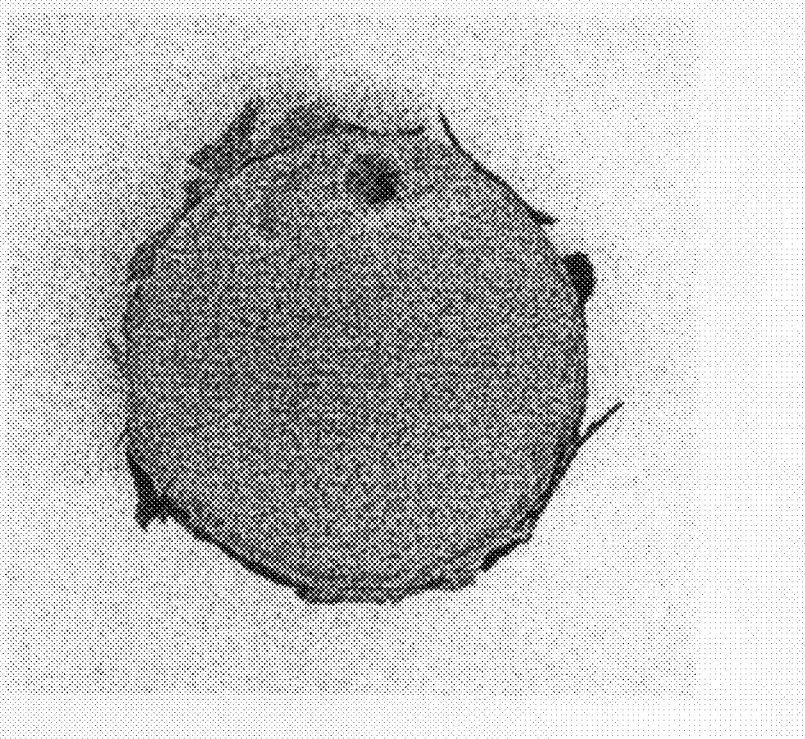

FIG. 35 is a photograph showing the result of the cycle oxidation test. FIG. 35A is a photograph of the test piece of Example 17 after 400 cycles were completed, and FIG. 35B is a photograph of the test piece of Comparative Example, in which only one diffusion barrier layer was formed, after 75 cycles were completed. FIG. 35A shows that only a thin oxidization film is formed on the surface of the test piece of Example 17, and the exfoliation of the film has not occurred. On the other hand, as shown in FIG. 35B, remarkable crack and exfoliation were observed at the angle portion of the test piece in Comparative Example which was coated with only one diffusion barrier layer. This crack and exfoliation are presumed to be caused by a heat stress in heating/cooling cycle oxidization. Thus, it is clear that the multilayer alloy film of the present invention has excellent oxidation resistance even under an ultrahigh temperature environment and also has excellent performance to the heat stress caused by heating/cooling.

The present application is based on Japanese Patent Application No. 2006-310798 filed Nov. 16, 2006, the entire content of which is expressly incorporated by reference herein.

Industrial Applicability

The multilayer alloy film and the heat-resistant metal member according to the present invention are useful for a member for a high temperature apparatus such as a gas turbine, a jet engine and a boiler.

The invention claimed is:

1. A multilayer alloy film comprising:
a barrier layer formed on a surface of a base material; and
an aluminum reservoir layer formed on the barrier layer, the aluminum reservoir layer made of an alloy containing Al,
wherein the barrier layer comprises:
an inner sacrificial barrier layer made of an alloy containing Re;
an inner stabilizing layer formed on the inner sacrificial barrier layer;
a diffusion barrier layer formed on the inner stabilizing layer, the diffusion barrier layer made of an alloy containing Re;
an outer stabilizing layer formed on the diffusion barrier layer; and
an outer sacrificial barrier layer formed on the outer stabilizing layer, the outer sacrificial barrier layer made of an alloy containing Re.

2. The multilayer alloy film according to claim 1, wherein the base material, the inner stabilizing layer, the outer stabilizing layer and the aluminum reservoir layer each comprise the same phase.

3. The multilayer alloy film according to claim 1, wherein the diffusion barrier layer, the inner sacrificial barrier layer and the outer sacrificial barrier layer each comprise a σ phase of the alloy containing Re.

4. The multilayer alloy film according to claim 3, wherein the σ phase of the alloy containing Re comprises 20 to 60 atom % of Cr, 15 to 25 atom % of Ni, and 15 to 65 atom % of Re.

5. The multilayer alloy film according to claim 1, wherein the diffusion barrier layer, the inner sacrificial barrier layer and the outer sacrificial barrier layer each comprise 15 to 60 atom % of one or more elements in total, selected from the group consisting of Cr, Mo and W, 15 to 25 atom % of one or more elements in total, selected from the group consisting of Ni, Co and Fe, and 15 to 65 atom % of Re.

6. The multilayer alloy film according to claim 5, wherein the diffusion barrier layer, the inner sacrificial barrier layer or the outer sacrificial barrier layer comprises 1 to 45 atom % of Cr, 1 to 55 atom % of W, 15 to 60 atom % of Re, and 10 to 25 atom % of Ni.

7. The multilayer alloy film according to claim 6,
wherein the aluminum reservoir layer comprises:
a γ phase having an fcc crystal structure of a Ni-based alloy containing 1 to 18 atom % of Al, 0.1 to 30 atom % of Pt and 0.1 to 25 atom % of Cr;
a γ' phase having an $L1_2$ crystal structure of a Ni-based alloy containing 19 to 32 atom % of Al, 0.1 to 30 atom % of Pt and 0.1 to 10 atom % of Cr;
a β phase having a bcc crystal structure of a Ni-based alloy containing 35 to 50 atom % of Al, 0.1 to 30 atom % of Pt and 0.1 to 10 atom % of Cr;
an α phase having an $L1_0$ crystal structure of a Ni-based alloy containing 15 to 50 atom % of Al, 30 to 48 atom % of Pt and 0.1 to 10 atom % of Cr;
a mixed phase of a γ' phase and a γ phase, the γ' phase having an $L1_2$ crystal structure of a Ni-based alloy containing 19 to 32 atom % of Al, 0.1 to 30 atom % of Pt and 0.1 to 10 atom % of Cr, the γ phase having an fcc crystal structure of a Ni-based alloy containing 1 to 18 atom % of Al, 0.1 to 30 atom % of Pt and 0.1 to 25 atom % of Cr;
a mixed phase of a γ' phase and a β phase, the γ' phase having an $L1_2$ crystal structure of a Ni-based alloy containing 19 to 32 atom % of Al, 0.1 to 30 atom % of Pt and 0.1 to 10 atom % of Cr, the β phase having a bcc crystal structure of a Ni-based alloy containing 35 to 50 atom % of Al, 0.1 to 30 atom % of Pt and 0.1 to 10 atom % of Cr;
a mixed phase of an α phase and a γ phase, the α phase having an $L1_0$ crystal structure of a Ni-based alloy containing 15 to 50 atom % of Al, 30 to 48 atom % of Pt and 0.1 to 10 atom % of Cr, the γ phase having an fcc crystal structure of a Ni-based alloy containing 1 to 14 atom % of Al, 0.1 to 40 atom % of Pt and 0.1 to 25 atom % of Cr; or a mixed phase of an α phase, a γ' phase and a γ phase, the α phase having an $L1_0$ crystal structure of a Ni-based alloy containing 15 to 50 atom % of Al, 30 to 48 atom % of Pt and 0.1 to 10 atom % of Cr, the γ' phase having an $L1_2$ crystal structure of a Ni-based alloy containing 19 to 32 atom % of Al, 0.1 to 30 atom % of Pt and 0.1 to 10 atom % of Cr, the γ phase having an fcc crystal structure of a Ni-based alloy containing 1 to 14 atom % of Al, 0.1 to 40 atom % of Pt and 0.1 to 25 atom % of Cr.

8. The multilayer alloy film according to claim 1, wherein the diffusion barrier layer, the inner sacrificial barrier layer or the outer sacrificial barrier layer further comprises 0.1 to 10 atom % of one or more elements selected from the group consisting of V, Nb, Ir, Ru, Zr, Hf, Y, Ce and La.

9. The multilayer alloy film according to claim 1, wherein the diffusion barrier layer, the inner sacrificial barrier layer or the outer sacrificial barrier layer further comprises 0.1 to 5 atom % of one or more elements selected from the group consisting of Al, Ta, Ti, Pt, Mn, Si, C and B.

10. The multilayer alloy film according to claim 1, wherein the inner stabilizing layer and the outer stabilizing layer each comprise:
a mixed phase of a γ' phase and a γ phase, the γ' phase having an $L1_2$ crystal structure of a Ni-based alloy containing 16 to 25 atom % of Al and 1 to 10 atom % of Cr, the γ phase having an fcc crystal structure of a Ni-based alloy containing 5 to 16 atom % of Al and 1 to 25 atom % of Cr;
a mixed phase of a γ' phase and a β phase, the γ' phase having an $L1_2$ crystal structure of a Ni-based alloy containing 16 to 25 atom % of Al and 1 to 10 atom % of Cr, the β phase having a bcc crystal structure of a Ni-based alloy containing 26 to 50 atom % of Al and 1 to 10 atom % of Cr;
a mixed phase of a γ phase and a β phase, the γ phase having an fcc crystal structure of a Ni-based alloy containing 5 to 16 atom % of Al and 15 to 45 atom % of Cr, the β phase having a bcc crystal structure of a Ni-based alloy containing 26 to 50 atom % of Al and 1 to 10 atom % of Cr; or
a mixed phase of a γ phase, a γ' phase and a β phase, the γ phase having an fcc crystal structure of a Ni-based alloy containing 5 to 16 atom % of Al and 15 to 45 atom % of Cr, the γ' phase having an $L1_2$ crystal structure of a Ni-based alloy containing 16 to 25 atom % of Al and 1 to 10 atom % of Cr, the β phase having a bcc crystal structure of a Ni-based alloy containing 26 to 50 atom % of Al and 1 to 10 atom % of Cr.

11. The multilayer alloy film according to claim 10, wherein the inner stabilizing layer or the outer stabilizing layer further comprises 0.1 to 10 atom % of Co.

12. The multilayer alloy film according to claim 1, wherein the inner stabilizing layer and the outer stabilizing layer each comprise:
a γ phase having an fcc crystal structure of a Ni-based alloy containing 1 to 18 atom % of Al, 0.1 to 30 atom % of Pt and 0.1 to 25 atom % of Cr;
a γ' phase having an $L1_2$ crystal structure of a Ni-based alloy containing 19 to 32 atom % of Al, 0.1 to 30 atom % of Pt and 0.1 to 10 atom % of Cr;
a β phase having a bcc crystal structure of a Ni-based alloy containing 35 to 50 atom % of Al, 0.1 to 30 atom % of Pt and 0.1 to 10 atom % of Cr;
an α phase having an $L1_0$ crystal structure of a Ni-based alloy containing 15 to 50 atom % of Al, 30 to 48 atom % of Pt and 0.1 to 10 atom % of Cr;
a mixed phase of a γ' phase and a γ phase, the γ' phase having an $L1_2$ crystal structure of a Ni-based alloy containing 19 to 32 atom % of Al, 0.1 to 30 atom % of Pt and 0.1 to 10 atom % of Cr, the γ phase having an fcc crystal structure of a Ni-based alloy containing 1 to 18 atom % of Al, 0.1 to 30 atom % of Pt and 0.1 to 25 atom % of Cr;
a mixed phase of a γ' phase and a β phase, the γ' phase having an $L1_2$ crystal structure of a Ni-based alloy containing 19 to 32 atom % of Al, 0.1 to 30 atom % of Pt and 0.1 to 10 atom % of Cr, the β phase having a bcc crystal structure of a Ni-based alloy containing 35 to 50 atom % of Al, 0.1 to 30 atom % of Pt and 0.1 to 10 atom % of Cr;
a mixed phase of an α phase and a γ phase, the α phase having an $L1_0$ crystal structure of a Ni-based alloy containing 15 to 50 atom % of Al, 30 to 48 atom % of Pt and 0.1 to 10 atom % of Cr, the γ phase having an fcc crystal structure of a Ni-based alloy containing 1 to 14 atom % of Al and 0.1 to 40 atom % of Pt and 0.1 to 25 atom % of Cr; or
a mixed phase of an α phase, a γ' phase and a γ phase, the α phase having an $L1_0$ crystal structure of a Ni-based alloy containing 15 to 50 atom % of Al, 30 to 48 atom % of Pt and 0.1 to 10 atom % of Cr, the γ' phase having an $L1_2$ crystal structure of a Ni-based alloy containing 19 to 32 atom % of Al, 0.1 to 30 atom % of Pt and 0.1 to 10 atom % of Cr, and the γ phase having an fcc crystal structure of a Ni-based alloy containing 1 to 14 atom % of Al, 0.1 to 40 atom % of Pt and 0.1 to 25 atom % of Cr.

13. The multilayer alloy film according to claim 1, wherein the inner stabilizing layer or the outer stabilizing layer comprises 0.01 to 5 atom % of Re.

14. The multilayer alloy film according to claim 1, wherein the inner stabilizing layer or the outer stabilizing layer further comprises 0.01 to 10 atom % of one or more elements selected from the group consisting of W, Mo, V, Nb, Ta, Pt, Ti, Fe, Ir, Ru, Mn, Si, Zr, Hf, Y, Ce, La, C and B.

15. The multilayer alloy film according to claim 1, wherein the aluminum reservoir layer comprises:
a mixed phase of a γ' phase and a β phase, the γ' phase having an $L1_2$ crystal structure of a Ni-based alloy containing 16 to 25 atom % of Al and 1 to 10 atom % of Cr, the β phase having a bcc crystal structure of a Ni-based alloy containing 26 to 50 atom % of Al and 1 to 10 atom % of Cr;
a mixed phase of a γ' phase and a γ phase, the γ' phase having an $L1_2$ crystal structure of a Ni-based alloy containing 16 to 25 atom % of Al and 1 to 10 atom % of Cr, the γ phase having an fcc crystal structure of a Ni-based alloy containing 5 to 16 atom % of Al and 1 to 25 atom % of Cr;
a mixed phase of a β phase and a γ phase, the β phase having a bcc crystal structure of a Ni-based alloy containing 26 to 50 atom % of Al and 1 to 10 atom % of Cr, the γ phase having an fcc crystal structure of a Ni-based alloy containing 5 to 16 atom % of Al and 15 to 45 atom % of Cr; or
a mixed phase of a β phase, a γ' phase and a γ phase, the β phase having a bcc crystal structure of a Ni-based alloy containing 26 to 50 atom % of Al and 1 to 10 atom % of Cr, the γ' phase having an $L1_2$ crystal structure of a Ni-based alloy containing 16 to 25 atom % of Al and 1 to 10 atom % of Cr, the γ phase having an fcc crystal structure of a Ni-based alloy containing 5 to 16 atom % of Al and 15 to 45 atom % of Cr.

16. The multilayer alloy film according to claim 1, wherein the aluminum reservoir layer further comprises 0.01 to 5 atom % of Re.

17. The multilayer alloy film according to claim 1, wherein the aluminum reservoir layer further comprises 0.01 to 15 atom % of one or more elements selected from the group consisting of Co, Fe, Ti, Ir, Ru, Mn, Si, Zr, Mo, Ta, W, Hf, La, Ce and Y.

18. A heat-resistant metal member comprising:
a metal base material; and
the multilayer alloy film according to claim 1 formed on a surface of the metal base material.

19. The heat-resistant metal member according to claim 18, wherein the heat-resistant metal member is a moving blade, a stationary blade, a burner or a member of a jet engine or a gas turbine, a burner, a combustion nozzle or a heat exchange member of a boiler, a thermocouple casing, or a heating element.

20. A method for producing a multilayer alloy film comprising the steps of:
forming an inner sacrificial barrier layer made of an alloy containing Re on a surface of a base material;
forming an inner stabilizing layer on the inner sacrificial barrier layer;
forming a diffusion barrier layer made of an alloy containing Re on the inner stabilizing layer;
forming an outer stabilizing layer on the diffusion barrier layer;
forming an outer sacrificial barrier layer made of an alloy containing Re on the outer stabilizing layer; and
forming an aluminum reservoir layer made of an alloy containing Al on the outer sacrificial barrier layer.

21. The method for producing the multilayer alloy film according to claim 20, wherein the inner sacrificial barrier layer, the inner stabilizing layer, the diffusion barrier layer, the outer stabilizing layer or the outer sacrificial barrier layer is formed by a method selected from the group consisting of electroplating, electroless plating, thermal spraying, sputtering and electron bean evaporation.

22. The method for producing the multilayer alloy film according to claim 20, further comprising the step of performing Cr infiltration treatment before forming the aluminum reservoir layer.

23. The method for producing the multilayer alloy film according to claim 20, further comprising the step of performing solution treatment and aging treatment after forming the outer sacrificial barrier layer.

24. The method for producing the multilayer alloy film according to claim 23, wherein the solution treatment is performed by heating at 1275 to 1350° C. for 20 minutes to 24 hours, and the aging treatment is performed by heating at 1100 to 1180° C. for 1 to 12 hours after the solution treatment.

* * * * *